US008655897B2

(12) United States Patent
Mineno et al.

(10) Patent No.: US 8,655,897 B2
(45) Date of Patent: Feb. 18, 2014

(54) DATA CONVERTING APPARATUS, METHOD, AND COMPUTER PRODUCT

(71) Applicant: Fujitsu Limited, Kawasaki (JP)

(72) Inventors: Kazuo Mineno, Kawasaki (JP); Takashi Yoshino, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 13/690,197

(22) Filed: Nov. 30, 2012

(65) Prior Publication Data

US 2013/0091155 A1 Apr. 11, 2013

Related U.S. Application Data

(63) Continuation of application No. 12/837,801, filed on Jul. 16, 2010, now Pat. No. 8,326,850.

(30) Foreign Application Priority Data

Jul. 30, 2009 (JP) ................................ 2009-178446

(51) Int. Cl.
*G06F 17/30* (2006.01)

(52) U.S. Cl.
USPC .......................................... 707/756; 707/758

(58) Field of Classification Search
None
See application file for complete search history.

(56) References Cited

U.S. PATENT DOCUMENTS

| | | | | |
|---|---|---|---|---|
| 6,014,670 | A | 1/2000 | Zamanian et al. | |
| 6,339,775 | B1 | 1/2002 | Zamanian et al. | |
| 7,257,594 | B2 | 8/2007 | Tamboli et al. | |
| 7,426,520 | B2 | 9/2008 | Gorelik et al. | |
| 8,082,243 | B2 | 12/2011 | Gorelik et al. | |
| 2005/0144166 | A1 * | 6/2005 | Chapus et al. | 707/6 |
| 2005/0183002 | A1 * | 8/2005 | Chapus | 715/505 |
| 2006/0235811 | A1 | 10/2006 | Fairweather | |
| 2007/0112714 | A1 | 5/2007 | Fairweather | |
| 2007/0260584 | A1 * | 11/2007 | Marti et al. | 707/3 |

OTHER PUBLICATIONS

USPTO, (Badawi) Non-Final Rejection, Jan. 10, 2012, in parent U.S. Appl. No. 12/837,801 [allowed].

USPTO, (Badawi) Notice of Allowance, Jul. 30, 2012, in parent U.S. Appl. No. 12/837,801 [allowed].

USPTO, (Badawi) Non-Final Rejection, Oct. 1, 2012, in related U.S. Appl. No. 13/548,275 [pending].

* cited by examiner

*Primary Examiner* — Sherief Badawi
(74) *Attorney, Agent, or Firm* — Fujitsu Patent Center

(57) ABSTRACT

A data converting apparatus includes a storage unit that stores encoded meta-definition information, a data converting function, a conversion rule table, and a conversion rule; an input unit that receives input of data to be converted; a detecting unit that uses the encoded meta-definition information to detect metadata codes for a conversion source and a conversion destination for which the conversion rule code matches; a determining unit that determines whether the detected metadata codes match; a specifying unit that, by referring to a conversion rule and based on the determination result at the determining unit, specifies the data converting function, according to the combination of the metadata codes for the conversion source and for the conversion destination; and a converting unit that uses the specified data converting function to convert the data of the conversion source to have a property prescribed by metadata for the conversion destination.

7 Claims, 60 Drawing Sheets

| From SIDE DATA TYPE | To SIDE DATA TYPE | TYPE CONVERTING FUNCTION |
|---|---|---|
| Char | Integer | CHARACTER-TO-INTEGER CONVERTING FUNCTION |
| Integer | Char | INTEGER-TO-CHARACTER CONVERTING FUNCTION |

| From SIDE char_code | To SIDE char_code | CLEANSING FUNCTION |
|---|---|---|
| SJIS | JEF | SJIS→JEF CONVERTING FUNCTION |
| SJIS | UTF8 | SJIS→UTF8 CONVERTING FUNCTION |
| JEF | SJIS | JEF→SJIS CONVERTING FUNCTION |
| JEF | UTF8 | JEF→UTF8 CONVERTING FUNCTION |
| UTF8 | JEF | UTF8→JEF CONVERTING FUNCTION |
| UTF8 | SJIS | UTF8→SJIS CONVERTING FUNCTION |

```
<BASE_DEF>
  <!-- Char DATA TYPE DEFINITION -->
  <DATA_TYPE name=" Char">
    <DTCV_RULE to=" Integer">CHARACTER-TO-INTEGER
CONVERSION</DTCV_RULE>
    <DATA_ATTR name="char_code">
       <VALUE>SJIS</VALUE>
       <VALUE>JEF</VALUE>
       <VALUE>UTF8</VALUE>
       <CL_RULE from="*"  to="*">CHARACTER CODE SYSTEM
CONVERSION</CL_RULE>
    </DATA_ATTR>
  </DATA_TYPE>
  <!-- Integer DATA TYPE DEFINITION -->
  <DATA_TYPE name=" Integer">
    <DTCV_RULE to=" Char">INTEGER-TO-CHARACTER CONVERSION
    </DTCV_RULE>
  </DATA_TYPE>
</BASE_DEF>
```

```
<BASE_DEF>

   <!-- Char DATA TYPE DEFINITION -->
   <DATA_TYPE name=" Char">
      <DTCV_RULE to=" Integer">CHARACTER-TO-INTEGER
CONVERSION</DTCV_RULE>
      <DATA_ATTR name="char_code">
          <VALUE>SJIS</VALUE>
          <VALUE>JEF</VALUE>
          <VALUE>UTF8</VALUE>
          <CL_RULE from="*"  to="*">CHARACTER CODE SYSTEM
CONVERSION</CL_RULE>
      </DATA_ATTR>

      <DATA_ATTR name="max_length">
          <CL_RULE from="*"    to="*">length ADJUSTMENT</CL_RULE>
      </DATA_ATTR>

   </DATA_TYPE>
   <!-- Integer DATA TYPE DEFINITION -->
   <DATA_TYPE name=" Integer">
      <DTCV_RULE to=" Char">INTEGER-TO-CHARACTER CONVERSION
      </DTCV_RULE>
   </DATA_TYPE>

</BASE_DEF>
```

```
<META_DATA>

 <R_MODEL name="TABLE_A" >
     <COLUMN name="EMPLOYEE_NUMBER" keytype="MKey">
          <D_TYPE>Integer</D_TYPE>
     </COLUMN>
     <COLUMN name="FULL_NAME">
          <D_TYPE>Char</D_TYPE>
          <D_ATTR name="char_code">JEF</D_ATTR>
          <D_ATTR name="max_length">20</D_ATTR>
     </COLUMN>
     <COLUMN name="TELEPHONE_NUMBER">
          <D_TYPE>Char</D_TYPE>
          <D_ATTR name="char_code">JEF</D_ATTR>
     </COLUMN>
 </R_MODEL>
   <V_MODEL name="TABLE_B">
     <COLUMN name="EMPLOYEE_NUMBER" keytype="MKey">
          <D_TYPE>Integer</D_TYPE>
     </COLUMN>
     <COLUMN name="FULL_NAME">
          <D_TYPE>Char</D_TYPE>
          <D_ATTR name="char_code">SJIS</D_ATTR>
          <D_ATTR name="max_length">14</D_ATTR>
     </COLUMN>
     <COLUMN name="TELEPHONE_NUMBER">
          <D_TYPE>Integer</D_TYPE>
     </COLUMN>

(1)  <MAP_RULE>
          <FROM_COLUMN table="TABLE_A" >EMPLOYEE_NUMBER
          </FROM_COLUMN>
          <TO_COLUMN   table="TABLE_B">EMPLOYEE_NUMBER</TO_COLUMN>
     </MAP_RULE>
(2)  <MAP_RULE>
          <FROM_COLUMN table="TABLE_A" >FULL_NAME</FROM_COLUMN>
          <TO_COLUMN   table="TABLE_B">FULL_NAME</TO_COLUMN>
     </MAP_RULE>
(3)  <MAP_RULE>
          <FROM_COLUMN table="TABLE_A">TELEPHONE_NUMBER
          </FROM_COLUMN>
          <TO_COLUMN   table="TABLE_B">TELEPHONE_NUMBER</TO_COLUMN>
     </MAP_RULE>
   </V_MODEL>

</META_DATA>
```

SPECIFY MAXIMUM LENGTH OF 20 BYTES

SPECIFY MAXIMUM LENGTH OF 14 BYTES

```
<META_DATA>

  <R_MODEL name="TABLE_A" >
     <COLUMN name="EMPLOYEE_NUMBER" keytype="MKey">
          <D_TYPE>Integer</D_TYPE>
     </COLUMN>
     <COLUMN name="FULL_NAME">
          <D_TYPE>PERSONAL NAME</D_TYPE>
          <D_ATTR name="char_code">JEF</D_ATTR>
          <D_ATTR name="name_space">Yes</D_ATTR>
     </COLUMN>
     <COLUMN name="TELEPHONE_NUMBER">
          <D_TYPE>Char</D_TYPE>
          <D_ATTR name="char_code">JEF</D_ATTR>
     </COLUMN>
  </R_MODEL>
  <V_MODEL name="TABLE_B">
     <COLUMN name="EMPLOYEE_NUMBER" keytype="MKey">
          <D_TYPE>Integer</D_TYPE>
     </COLUMN>
     <COLUMN name="FULL_NAME">
          <D_TYPE>PERSONAL NAME</D_TYPE>
          <D_ATTR name="char_code">SJIS</D_ATTR>
          <D_ATTR name="name_space">No</D_ATTR>
     </COLUMN>
     <COLUMN name="TELEPHONE_NUMBER">
          <D_TYPE>Integer</D_TYPE>
     </COLUMN>
(1)  <MAP_RULE>
          <FROM_COLUMN table="TABLE_A" >EMPLOYEE_NUMBER
          </FROM_COLUMN>
          <TO_COLUMN   table="TABLE_B">EMPLOYEE_NUMBER</TO_COLUMN>
     </MAP_RULE>
(2)  <MAP_RULE>
          <FROM_COLUMN table="TABLE_A" >FULL_NAME</FROM_COLUMN>
          <TO_COLUMN   table="TABLE_B">FULL_NAME</TO_COLUMN>
     </MAP_RULE>
(3)  <MAP_RULE>
          <FROM_COLUMN table="TABLE_A">TELEPHONE_NUMBER
          </FROM_COLUMN>
          <TO_COLUMN   table="TABLE_B">TELEPHONE_NUMBER
          </TO_COLUMN>
     </MAP_RULE>
  </V_MODEL>
</META_DATA>
```

```
<BASE_DEF>
   <!-- Char DATA TYPE DEFINITION -->
   <DATA_TYPE name=" Char">
      <DTCV_RULE to=" Integer">CHARACTER-TO-INTEGER
CONVERSION</DTCV_RULE>
      <DATA_ATTR name="char_code" default="JEF">
          <VALUE>SJIS</VALUE>
          <VALUE>JEF</VALUE>
          <VALUE>UTF8</VALUE>
          <CL_RULE from="*"  to="*">CHARACTER CODE SYSTEM
CONVERSION</CL_RULE>
      </DATA_ATTR>
      <DATA_ATTR name="max_length" default="20">
          <CL_RULE from="*"    to="*">length ADJUSTMENT</CL_RULE>
      </DATA_ATTR>
   </DATA_TYPE>
   <!-- PERSONAL NAME DATA TYPE DEFINITION -->
   <DATA_TYPE name="PERSONAL NAME"  super="Char">
      <DATA_ATTR name="name_space" default="Yes" >
          <VALUE>No</VALUE>
          <VALUE>Yes</VALUE>
          <CL_RULE from="*"  to="*">FIRST/SECOND-NAME SPACING
PROCESS</CL_RULE>
      </DATA_ATTR>
   </DATA_TYPE>
   <!-- Integer DATA TYPE DEFINITION -->
   <DATA_TYPE name=" Integer">
      <DTCV_RULE to=" Char">INTEGER-TO-CHARACTER CONVERSION
      </DTCV_RULE>
   </DATA_TYPE>
</BASE_DEF>
```

```
<META_DATA>
 <R_MODEL name="TABLE_A" >
   <COLUMN name="EMPLOYEE_NUMBER" keytype="MKey">
         <D_TYPE>Integer</D_TYPE>                          </COLUMN>
   <COLUMN name="FULL_NAME">
         <D_TYPE>PERSONAL NAME</D_TYPE>
         <D_ATTR name="char_code">JEF</D_ATTR>
         <D_ATTR name="max_length">20</D_ATTR>
         <D_ATTR name="name_space">Yes</D_ATTR>            </COLUMN>
   <COLUMN name="TELEPHONE_NUMBER">
         <D_TYPE>Char</D_TYPE>
         <D_ATTR name="char_code">JEF</D_ATTR>
         <D_ATTR name="max_length">20</D_ATTR>             </COLUMN>
 </R_MODEL>
(OMITTED)
</META_DATA>
```

SIMPLIFICATION OF DEFINITION BY DEFAULT VALUE (DEFINITION OF SAME MEANINGS)

304

```
<META_DATA>
<R_MODEL name="TABLE_A" >
   <COLUMN name="EMPLOYEE_NUMBER" keytype="MKey">
         <D_TYPE>Integer</D_TYPE>                          </COLUMN>
   <COLUMN name="FULL_NAME">
         <D_TYPE>PERSONAL NAME</D_TYPE>                    </COLUMN>
   <COLUMN name="TELEPHONE_NUMBER">
         <D_TYPE>Char</D_TYPE>                             </COLUMN>
</R_MODEL>
(OMITTED)
</META_DATA>
```

```
<BASE_DEF>

  <!-- Char DATA TYPE DEFINITION -->
  <DATA_TYPE name=" Char">
    <DTCV_RULE to=" Integer">CHARACTER-TO-INTEGER CONVERSION
    </DTCV_RULE>

    <DATA_ATTR name="char_code">
        <VALUE>SJIS</VALUE>
        <VALUE>JEF</VALUE>
        <VALUE>UTF8</VALUE>
        <CL_RULE from="*"  to="*">CHARACTER CODE SYSTEM
CONVERSION</CL_RULE>
    </DATA_ATTR>

    <DATA_ATTR name="char_excode">
        <VALUE>EXTERNAL CHARACTER CODE 1</VALUE>
        <VALUE>EXTERNAL CHARACTER CODE 2</VALUE>
        <CL_RULE from="*"  to="*">CHARACTER CODE SYSTEM
CONVERSION</CL_RULE>
    </DATA_ATTR>

    <DATA_ATTR name="max_length">
        <CL_RULE from="*"    to="*">length ADJUSTMENT</CL_RULE>
    </DATA_ATTR>

  </DATA_TYPE>
  <!-- Integer DATA TYPE DEFINITION -->
  <DATA_TYPE name=" Integer">
    <DTCV_RULE to=" Char">INTEGER-TO-CHARACTER CONVERSION
    </DTCV_RULE>
  </DATA_TYPE>

</BASE_DEF>
```

```
<META_DATA>
 <R_MODEL name="TABLE_A" >
     <COLUMN name="EMPLOYEE_NUMBER" keytype="MKey">
          <D_TYPE>Integer</D_TYPE>                          </COLUMN>
     <COLUMN name="FULL_NAME">
          <D_TYPE>PERSONAL NAME</D_TYPE>
          <D_ATTR name="max_length">20</D_ATTR>       </COLUMN>
     <COLUMN name="ADDRESS">
          <D_TYPE>ADDRESS</D_TYPE>
          <D_ATTR name="chou_banchi">No</D_ATTR>     </COLUMN>
     <COLUMN name="TELEPHONE_NUMBER">
          <D_TYPE>Char</D_TYPE>                             </COLUMN>
 </R_MODEL>
 <V_MODEL name="TABLE_B">
     <COLUMN name="EMPLOYEE_NUMBER" keytype="MKey">
          <D_TYPE>Integer</D_TYPE>                          </COLUMN>
     <COLUMN name="FULL_NAME">
          <D_TYPE>Char</D_TYPE>
          <D_ATTR name="char_code">SJIS</D_ATTR>
          <D_ATTR name="char_excode">EXTERNAL CHARACTER CODE 2
          </D_ATTR>
          <D_ATTR name="max_length">14</D_ATTR>
          <D_ATTR name="name_space">No</D_ATTR>      </COLUMN>
     <COLUMN name="ADDRESS">
          <D_TYPE>ADDRESS</D_TYPE>
          <D_ATTR name="char_code">SJIS</D_ATTR>     </COLUMN>
     <COLUMN name="TELEPHONE_NUMBER">
          <D_TYPE>Integer</D_TYPE>                          </COLUMN>
     <MAP_RULE>
          <FROM_COLUMN table="TABLE_A" >EMPLOYEE_NUMBER
          </FROM_COLUMN>
          <TO_COLUMN   table="TABLE_B">EMPLOYEE_NUMBER</TO_COLUMN>
     </MAP_RULE>
     <MAP_RULE>
          <FROM_COLUMN table="TABLE_A" >FULL_NAME</FROM_COLUMN>
          <TO_COLUMN   table="TABLE_B">FULL_NAME</TO_COLUMN>
     </MAP_RULE>
     <MAP_RULE>
          <FROM_COLUMN table="TABLE_A" >ADDRESS</FROM_COLUMN>
          <TO_COLUMN   table="TABLE_B">ADDRESS</TO_COLUMN>
     </MAP_RULE>
     <MAP_RULE>
          <FROM_COLUMN table="TABLE_A">TELEPHONE_NUMBER
          </FROM_COLUMN>
          <TO_COLUMN   table="TABLE_B">TELEPHONE_NUMBER</TO_COLUMN>
     </MAP_RULE>
 </V_MODEL>
</META_DATA>
```

```
<BASE_DEF>
    <!-- Char DATA TYPE DEFINITION -->
    <DATA_TYPE name=" Char">
      <DTCV_RULE to=" Integer">CHARACTER-TO-INTEGER CONVERSION
      </DTCV_RULE>
      <DATA_ATTR name="char_code" default="JEF">
          <VALUE>SJIS</VALUE>
          <VALUE>JEF</VALUE>
          <VALUE>UTF8</VALUE>
          <CL_RULE from="*"  to="*">CHARACTER CODE SYSTEM CONVERSION
          </CL_RULE>
      </DATA_ATTR>
      <DATA_ATTR name="char_excode" default="EXTERNAL CHARACTER CODE 1">
          <VALUE>EXTERNAL CHARACTER CODE 1</VALUE>
          <VALUE>EXTERNAL CHARACTER CODE 2</VALUE>
          <CL_RULE from="*"  to="*">CHARACTER CODE SYSTEM CONVERSION
          </CL_RULE>
      </DATA_ATTR>
      <DATA_ATTR name="max_length">
          <CL_RULE from="*"        to="*">length ADJUSTMENT</CL_RULE>
      </DATA_ATTR>
    </DATA_TYPE>
    <!- PERSONAL NAME DATA TYPE DEFINITION -->
    <DATA_TYPE name="PERSONAL NAME"  super="Char">
      <DATA_ATTR name="name_space" default="Yes">
          <VALUE>No</VALUE>
          <VALUE>Yes</VALUE>
          <CL_RULE from="*"  to="*">FIRST/SECOND-NAME SPACING PROCESS
          </CL_RULE>
      </DATA_ATTR>
    </DATA_TYPE>
    <!- ADDRESS DATA TYPE DEFINITION -->
    <DATA_TYPE name=" ADDRESS"  super="Char">
      <DATA_ATTR name="chou_banchi" default="Yes">
          <VALUE>No</VALUE>
          <VALUE>Yes</VALUE>
          <CL_RULE from="*"  to="*">chou_banchi PROCESS</CL_RULE>
      </DATA_ATTR>
    </DATA_TYPE>
    <!-- Integer DATA TYPE DEFINITION -->
    <DATA_TYPE name=" Integer">
      <DTCV_RULE to=" Char">    INTEGER-TO-CHARACTER CONVERSION
      </DTCV_RULE>
      <DATA_ATTR name="max_digit" default="12" >
          <CL_RULE from="*"        to="*">digit ADJUSTMENT</CL_RULE>
      </DATA_ATTR>
    </DATA_TYPE>
</BASE_DEF>
```

| TYPE ID | DATA TYPE NAME |
|---|---|
| 1 | Char |
| 2 | PERSONAL NAME |
| 3 | ADDRESS |
| 4 | Integer |

| TYPE ATTRIBUTE ID | TYPE ATTRIBUTE NAME | |
|---|---|---|
| 1 | char_code | ⎫ |
| 2 | char_excode | ⎬ Char TYPE |
| 3 | max_length | ⎭ |
| 4 | name_space | PERSONAL NAME TYPE |

| TYPE ATTRIBUTE ID | TYPE ATTRIBUTE NAME | |
|---|---|---|
| 1 | char_code | ⎫ |
| 2 | char_excode | ⎬ Char TYPE |
| 3 | max_length | ⎭ |
| 4 | chou_banchi | ADDRESS TYPE |

| TYPE ATTRIBUTE ID | TYPE ATTRIBUTE NAME | |
|---|---|---|
| 1 | max_digit | Integer TYPE |

FIG.30

323 char_code TYPE ATTRIBUTE

| TYPE ATTRIBUTE VALUE ID | TYPE ATTRIBUTE VALUE NAME |
| --- | --- |
| 0 | SJIS |
| 1 | JEF (*) |
| 2 | UTF8 |

FIG.31

323 char_excode TYPE ATTRIBUTE

| TYPE ATTRIBUTE VALUE ID | TYPE ATTRIBUTE VALUE NAME |
| --- | --- |
| 0 | EXTERNAL CHARACTER CODE 1 (*) |
| 1 | EXTERNAL CHARACTER CODE 2 |

FIG.32

323 name_space TYPE ATTRIBUTE

| TYPE ATTRIBUTE VALUE ID | TYPE ATTRIBUTE VALUE NAME |
| --- | --- |
| 0 | Yes (*) |
| 1 | No |

FIG.33

323 chou_banchi TYPE ATTRIBUTE

| TYPE ATTRIBUTE VALUE ID | TYPE ATTRIBUTE VALUE NAME |
| --- | --- |
| 0 | No |
| 1 | Yes (*) |

FIG.34

323 max_length TYPE ATTRIBUTE

| TYPE ATTRIBUTE VALUE ID | TYPE ATTRIBUTE VALUE NAME |
|---|---|
| USE VALUE AS IS | |

FIG.35

323 max_digit TYPE ATTRIBUTE

| TYPE ATTRIBUTE VALUE ID | TYPE ATTRIBUTE VALUE NAME |
|---|---|
| USE VALUE AS IS | |

DATA TYPE CONVERSION RULE

| From \ To | 0 (UNDEFINED) | 1 (Char) | 2 (PERSONAL NAME) | 3 (ADDRESS) | 4 (Integer) |
|---|---|---|---|---|---|
| 0 (UNDEFINED) | - | Copy | Copy | Copy | Copy |
| 1 (Char) | Copy | - | Copy | Copy | CHARACTER-TO-INTEGER CONVERSION |
| 2 (PERSONAL NAME) | Copy | Copy | - | Copy | CHARACTER-TO-INTEGER CONVERSION |
| 3 (ADDRESS) | Copy | Copy | Copy | - | CHARACTER-TO-INTEGER CONVERSION |
| 4 (Integer) | Copy | INTEGER-TO-CHARACTER CONVERSION | INTEGER-TO-CHARACTER CONVERSION | INTEGER-TO-CHARACTER CONVERSION | - |

CLEANSING RULE FOR char_code

| From \ To | 0 (SJIS) | 1 (JEF) | 2 (UTF8) |
|---|---|---|---|
| 0 (SJIS) | - | CHARACTER CODE SYSTEM CONVERSION | CHARACTER CODE SYSTEM CONVERSION |
| 1 (JEF) | CHARACTER CODE SYSTEM CONVERSION | - | CHARACTER CODE SYSTEM CONVERSION |
| 2 (UTF8) | CHARACTER CODE SYSTEM CONVERSION | CHARACTER CODE SYSTEM CONVERSION | - |

CLEANSING RULE FOR char_excode

| From \ To | 0 (EXTERNAL CHARACTER CODE 1) | 1 (EXTERNAL CHARACTER CODE 2) |
|---|---|---|
| 0 (EXTERNAL CHARACTER CODE 1) | - | CHARACTER CODE SYSTEM CONVERSION |
| 1 (EXTERNAL CHARACTER CODE 2) | CHARACTER CODE SYSTEM CONVERSION | - |

CLEANSING RULE FOR name_space

| From \ To | 0 (Yes) | 1 (No) |
|---|---|---|
| 0 (Yes) | - | FIRST/SECOND-NAME SPACING PROCESS |
| 1 (No) | FIRST/SECOND-NAME SPACING PROCESS | - |

CLEANSING RULE FOR chou_banchi

| To / From | 0 (No) | 1 (Yes) |
|---|---|---|
| 0 (No) | - | chou_banchi PROCESS |
| 1 (Yes) | chou_banchi PROCESS | - |

CLEANSING RULE FOR max_length

| To / From | 0 (No) |
|---|---|
| 0 (No) | length ADJUSTMENT |

CLEANSING RULE FOR max_digit

| To / From | 0 (No) |
|---|---|
| 0 (No) | digit ADJUSTMENT |

EMPLOYEE_NUMBER IN TABLE_A → EMPLOYEE_NUMBER IN TABLE_B

| 0 (DATA TYPE) | 1 (max_digit) |
|---|---|
| 4 (Integer) | 12 (12 DIGITS) |

| 0 (DATA TYPE) | 1 (max_digit) |
|---|---|
| 4 (Integer) | 12 (12 DIGITS) |

(B)

FULL_NAME IN TABLE_A → FULL_NAME IN TABLE_B

| 0 (DATA TYPE) | 1 (char_code) | 2 (char_excode) | 3 (max_length) | 4 (name_space) |
|---|---|---|---|---|
| 2 (PER-SONAL NAME) | 1 (JEF) | 0 (EXTERNAL CHARACTER CODE 1) | 20 (20 BYTES) | 0 (Yes) |

| 0 (DATA TYPE) | 1 (char_code) | 2 (char_excode) | 3 (max_length) | 4 (name_space) |
|---|---|---|---|---|
| 2 (PER-SONAL NAME) | 0 (SJIS) | 1 (EXTERNAL CHARACTER CODE 2) | 14 (14 BYTES) | 1 (No) |

(C)

ADDRESS IN TABLE_A → ADDRESS IN TABLE_B

| 0 (DATA TYPE) | 1 (char_code) | 2 (char_excode) | 3 (max_length) | 4 (chou_banchi) |
|---|---|---|---|---|
| 3 (AD-DRESS) | 1 (JEF) | 0 (EXTERNAL CHARACTER CODE 1) | -1 (UN-DEFINED) | 0 (No) |

| 0 (DATA TYPE) | 1 (char_code) | 2 (char_excode) | 3 (max_length) | 4 (chou_banchi) |
|---|---|---|---|---|
| 3 (AD-DRESS) | 0 (SJIS) | 0 (EXTERNAL CHARACTER CODE 1) | -1 (UN-DEFINED) | 1 (Yes) |

(D)

TELEPHONE_NUMBER IN TABLE_A → TELEPHONE_NUMBER IN TABLE_B

| 0 (DATA TYPE) | 1 (char_code) | 2 (char_excode) | 3 (max_length) |
|---|---|---|---|
| 1 (Char) | 1 (JEF) | 0 (EXTERNAL CHARACTER CODE 1) | -1 (UN-DEFINED) |

| 0 (DATA TYPE) | 1 (max_digit) |
|---|---|
| 4 (Integer) | 12 (12 DIGITS) |

FIG.45

META-DEFINITION FOR FULL_NAME IN TABLE_A [IN, OUT]

| 0 (DATA TYPE) | 1 (char_code) | 2 (char_excode) | 3 (max_length) | 4 (name_space) |
|---|---|---|---|---|
| 2 (PERSONAL NAME) | 1 (JEF) | 0 (EXTERNAL CHARACTER CODE 1) | 20 (20 BYTES) | 0 (Yes) |

META-DEFINITION FOR FULL_NAME IN TABLE_B [IN]

| 0 (DATA TYPE) | 1 (char_code) | 2 (char_excode) | 3 (max_length) | 4 (name_space) |
|---|---|---|---|---|
| 2 (PERSONAL NAME) | 0 (SJIS) | 1 (EXTERNAL CHARACTER CODE 2) | 14 (14 BYTES) | 1 (No) |

VALUE OF FULL_NAME IN TABLE_A [IN]: YAMADA KAZUO

From → To

VALUE OF FULL_NAME IN TABLE_B [OUT]: (empty)

META-DEFINITION FOR FULL_NAME IN TABLE_A [IN, OUT]

| 0 (DATA TYPE) | 1 (char_code) | 2 (char_excode) | 3 (max_length) | 4 (name_space) |
|---|---|---|---|---|
| 2 (PERSONAL NAME) | 0 (SJIS) | 1 (EXTERNAL CHARACTER CODE 2) | 14 (14 BYTES) | 0 (Yes) |

META-DEFINITION FOR FULL_NAME IN TABLE_B [IN]

| 0 (DATA TYPE) | 1 (char_code) | 2 (char_excode) | 3 (max_length) | 4 (name_space) |
|---|---|---|---|---|
| 2 (PERSONAL NAME) | 0 (SJIS) | 1 (EXTERNAL CHARACTER CODE 2) | 14 (14 BYTES) | 1 (No) |

```
<BASE_DEF>
  <!-- Char DATA TYPE DEFINITION -->
  <DATA_TYPE name=" Char">
    <DTCV_RULE to=" Integer">CHARACTER-TO-INTEGER CONVERSION
    </DTCV_RULE>
    <DATA_ATTR name="char_code" default="JEF">
        <VALUE>SJIS</VALUE>
        <VALUE>JEF</VALUE>
        <VALUE>UTF8</VALUE>
        <CL_RULE from="*"  to="*">CHARACTER CODE SYSTEM
CONVERSION</CL_RULE>
    </DATA_ATTR>
    <DATA_ATTR name="char_excode" default="EXTERNAL CHARACTER
CODE 1">
        <VALUE>EXTERNAL CHARACTER CODE 1</VALUE>
        <VALUE>EXTERNAL CHARACTER CODE 2</VALUE>
        <CL_RULE from="*"  to="*">CHARACTER CODE SYSTEM
CONVERSION</CL_RULE>
    </DATA_ATTR>
    <DATA_ATTR name="max_length">
        <CL_RULE from="*"  to="*">length ADJUSTMENT</CL_RULE>
    </DATA_ATTR>
  </DATA_TYPE>
```

5501

```
  <!-- PERSONAL NAME DATA TYPE DEFINITION -->
  <DATA_TYPE name="PERSONAL NAME"  super="Char">
    <DATA_ATTR name="name_space" default="Yes">
        <VALUE>No</VALUE>
        <VALUE>Yes</VALUE>
        <CL_RULE from="*"  to="*"   rule="char_code=SJIS"   >
                FIRST/SECOND-NAME SPACING PROCESS</CL_RULE>
    </DATA_ATTR>
  </DATA_TYPE>

</BASE_DEF>
```

| 0 (DATA TYPE) | 1 (char_code) | 2 (char_excode) | 3 (max_length) | 4 (name_space) |
|---|---|---|---|---|
| 2 (PERSONAL NAME) | 0 (SJIS) | 1 (EXTERNAL CHARACTER CODE 2) | 14 (14 BYTES) | 1 (No) |

| 0 (DATA TYPE) | 1 (char_code) | 2 (char_excode) | 3 (max_length) | 4 (name_space) | 5 (X) |
|---|---|---|---|---|---|
| 2 (PERSONAL NAME) | 0 (SJIS) | 1 (EXTERNAL CHARACTER CODE 2) | 14 (14 BYTES) | 1 (No) | 1 (No) |

| 0 (DATA TYPE) | 1 (char_code) | 2 (char_excode) | 3 (max_length) | 4 (name_space) | 5 (X) |
|---|---|---|---|---|---|
| 2 (PERSONAL NAME) | 0 (SJIS) | 1 (EXTERNAL CHARACTER CODE 2) | 14 (14 BYTES) | 1 (No) | 1 (No) |

FIG.59

```
<!-- PERSONAL NAME DATA TYPE DEFINITION -->
<DATA_TYPE name="PERSONAL NAME" super="Char">
   <DATA_ATTR name="name_space" default="Yes">
        <VALUE>No</VALUE>
        <VALUE>Yes</VALUE>
      <CL_RULE from="*" to="*"   rule="char_code=SJIS" >
                 FIRST/SECOND-NAME SPACING
PROCESS</CL_RULE>
   </DATA_ATTR>
</DATA_TYPE>
```

"char_code=SJIS"

CON-STRAINT

SUB-JECT

| 0 (DATA TYPE) | 1 (char_code) | 2 (char_excode) | 3 (max_length) | 4 (name_space) |
|---|---|---|---|---|
| 2 (PER-SONAL NAME) | 0 (SJIS) | 1 (EXTERNAL CHARACTER CODE 2) | 14 (14 BYTES) | 1 (No) |

| From \ To | 0 (Yes) | 1 (No) |
|---|---|---|
| 0 (Yes) | - | 1(char_code) = 0(SJIS) |
| 1 (No) | 1(char_code) = 0(SJIS) | - |

332

| From \ To | 0 (Yes) | 1 (No) |
|---|---|---|
| 0 (Yes) | - | FIRST/SECOND-NAME SPACING PROCESS |
| 1 (No) | FIRST/SECOND-NAME SPACING PROCESS | - |

FIG.62

META-DEFINITION FOR FULL_NAME IN TABLE_A [IN, OUT]

| 0 (DATA TYPE) | 1 (char_code) | 2 (char_excode) | 3 (max_length) | 4 (name_space) |
|---|---|---|---|---|
| 2 (PER-SONAL NAME) | 1 (JEF) | 0 (EXTERNAL CHARACTER CODE 1) | 20 (20 BYTES) | 0 (Yes) |

META-DEFINITION FOR FULL_NAME IN TABLE_B [IN]

| 0 (DATA TYPE) | 1 (char_code) | 2 (char_excode) | 3 (max_length) | 4 (name_space) |
|---|---|---|---|---|
| 2 (PER-SONAL NAME) | 0 (SJIS) | 1 (EXTERNAL CHARACTER CODE 2) | 14 (14 BYTES) | 1 (No) |

VALUE OF FULL_NAME IN TABLE_A [IN]

YAMADA KAZUO

From → To

VALUE OF FULL_NAME IN TABLE_B [OUT]

DATA CONVERTING APPARATUS, METHOD, AND COMPUTER PRODUCT

CROSS REFERENCE TO RELATED APPLICATIONS

This application is a continuation of application Ser. No. 12/837,801, filed Jul. 16, 2010, is based upon and claims the benefit of priority of the prior Japanese Patent Application No. 2009-178446, filed on Jul. 30, 2009, the entire contents of which are incorporated herein by reference.

FIELD

The embodiments discussed herein are related to data conversion.

BACKGROUND

A process of integrating extracted data is called physical integration (Extract/Transform/Loading (ETL)). In physical integration, data extracted from an information source by an extracting function (Extract) is subjected to physical integration (Transformation). Results of the integration are registered to a user-side by a registering function (Loading). Physical integration is applicable to collective processing executed as batch processing. In physical integration, the recency of information is ensured at the extraction of the information. As a result, overlapping management of the information sources and integrated results is apt to occur.

One method of achieving physical integration is carried out in such a way that functions to be integrated are configured into integration components as integration logic is written preliminarily in an integration process logic description language called Transformation Description Language (TDL) and are registered with a repository. At the time of execution, the integration components are processed sequentially according to the TDL integration processing logic (see, e.g., U.S. Pat. Nos. 6,014,670 and 6,339,775).

A process of collecting and integrating, in real-time, data present in multiple information sources in response to a request from a user-side is called virtual integration (Enterprise Information Integration (EII)). In virtual integration, necessary information is retrieved and collected from information sources in response to a request from the user-side, and the collected data is integrated and returned as integrated data to the user-side to realize virtual information integration. Virtual integration allows the user-side to acquire real-time information from an information source at the point that the user-side needs the information, thus enables use of fresh information. Used information is discarded to make overlapping information management unnecessary.

For information integration such as the physical integration (ETL) and the virtual integration (EII), a function of converting a format of an original value (From value) into a format of an object value (To value) is essential and is generally referred to as a data type converting function or a cleansing function.

However, the conventional cleansing function is premised on preliminarily determining a combination of data type and type attribute specifically indicating a property thereof, and a type converting function and a cleansing function for converting the type and the attribute and has a problem in terms of expandability. Specifically, no unit exists for expanding the data type and type attribute possessed by a system in advance, and a combination with the cleansing function and a specifiable type attribute must be determined in advance, for example, for character code system conversion for a character code system specifying a type attribute (char_code) that identifies a character code system.

Since no unit exists for ensuring the consistency of type attributes and processes in the case of combining and using multiple data types, type attributes, and cleansing functions, it is problematic that consistency is impaired at the time of expansion. For example, when a data type similar to an existing data type is defined, no unit exits for ensuring consistency between the existing data type and the cleansing function, which increases the burden on the developer.

If data types, type attributes, type converting functions, and cleansing functions are increased, the number of combinations thereof increases, thereby increasing the burden on the developer and problematically complicating management. Since no unit has been provided to efficiently select and use necessary cleansing functions for the many combinations that exist, performance problematically deteriorates.

SUMMARY

According to an aspect of an embodiment, a data converting apparatus includes a storage unit that stores encoded meta-definition information that assigns a metadata code as a unique code to an element making up metadata in meta-definition information that defines metadata indicative of a property related to data of a conversion source and a conversion destination, a data converting function that converts conversion source data having a property prescribed by the metadata for the conversion source into conversion destination data having a property prescribed by the metadata for the conversion destination, a conversion rule table that assigns the data converting function according to a combination of metadata codes for the conversion source and the conversion destination, and a conversion rule that correlates with each of the conversion rule tables, a relevant metadata code as a conversion rule code; an input unit that receives input of data to be converted; a detecting unit that refers to the encoded meta-definition information stored in the storage unit and detects the metadata codes for the conversion source and the conversion destination for which the conversion rule code matches between the conversion source and the conversion destination; a determining unit that determines whether the detected metadata codes for the conversion source and for the conversion destination match; a converting function specifying unit that, by referring to a conversion rule stored in the storage unit and based on the determination result obtained by the determining unit, specifies the data converting function according to the combination of the metadata code for the conversion source and the metadata code for the conversion destination; and a converting unit that, by using the data converting function specified by the converting function specifying unit, converts the conversion source data, which is the data to be converted, to have a property prescribed by metadata for the conversion destination.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 3B is a diagram of storage contents of a type converting function library 302.

FIG. 3C is a diagram of a cleansing function library 303.

FIG. 5 is a diagram of an expansion example of the cleansing specification definition file 301 depicted in FIG. 4.

FIG. 6 is a diagram of a type attribute addition/expansion example of the cleansing specification definition file 301.

FIG. 8 is a diagram of one description example of a meta-definition file 304.

FIG. 11 is a diagram of another description example of the meta-definition file 304.

FIG. 16 is a diagram of one description example of the cleansing specification definition file 301 with default values defined as type attributes.

FIG. 17 is an exemplary diagram of the simplification of the meta-definition file 304.

FIG. 22 is a diagram of an example of the cleansing specification definition file 301 that defines the cleansing function corresponding to multiple type attributes.

FIG. 24 is a diagram of an example of the meta-definition file 304.

FIG. 25 is a diagram of an example of the cleansing specification definition file 301.

FIG. 26 is a diagram of a data type code table 321.

FIGS. 27 to 29 are diagrams of a type attribute code table 322.

FIGS. 30 to 35 are diagrams of a type attribute value code table 323

FIG. 36 is a diagram of a data type conversion rule table 331.

FIGS. 37 to 42 are diagrams of a cleansing rule table 332.

FIG. 44 is a diagram of encoded meta-definition information 340 corresponding to FIG. 24.

FIGS. 45 to 49 are diagrams of a first data conversion example using the encoded meta-definition information 340 related to the FULL_NAME in TABLE_A and TABLE_B depicted in FIG. 44.

FIG. 55 is a diagram of an example of the cleansing specification definition file 301 having a constraint set by a function F1.

FIG. 59 is an exemplary diagram of an example of introduction of a constraint.

FIG. 60 is a diagram of an example of a constraint condition table.

FIGS. 62 to 66 are diagrams of a second data conversion example using the encoded meta-definition information 340 related to the FULL_NAME in TABLE_A and TABLE_B depicted in FIG. 44.

DESCRIPTION OF EMBODIMENTS

Preferred embodiments of the present invention will be explained with reference to the accompanying drawings.

A cleansing function according to the embodiments has a type attribute that specifies a data type and the details thereof as meta-definition of values and gives meta-definition of a conversion source (From side) and a conversion destination (To side) along with data to convert a From value (conversion source value) into a To value (conversion destination value).

The meta-definition alone is required and the need for conversion logics and procedures is eliminated. Therefore, expansion is enabled by manipulating the meta-definition, whereby usability is improved. Since the developer is able to manipulate the meta-definition to easily expand and combine functions, developmental burden is reduced. A first embodiment will hereinafter be described.

Figure 1:
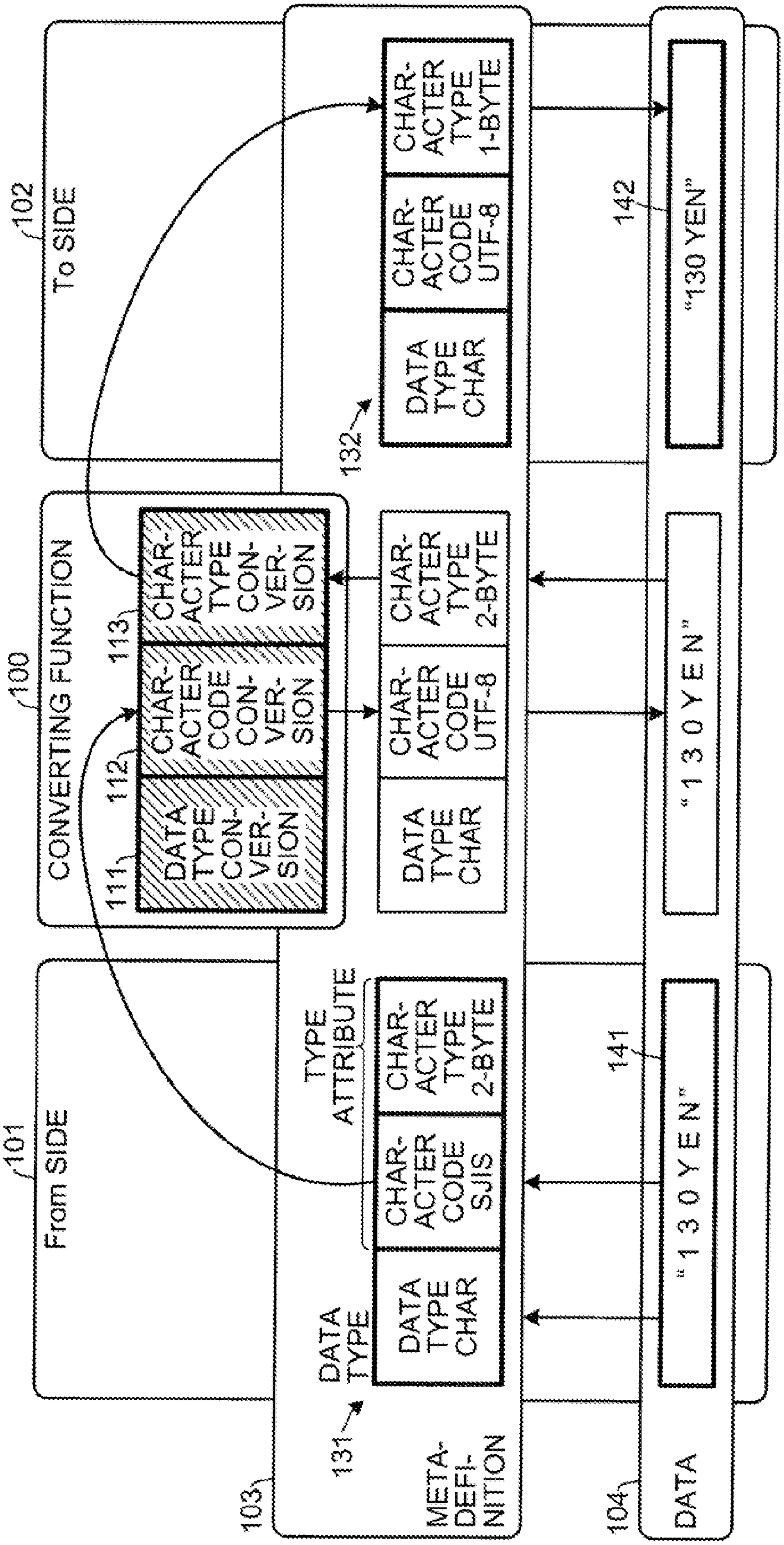
FIG. 1 is a diagram of an example of data conversion according to a first embodiment.

FIG. 1 is a diagram of an example of data conversion according to the first embodiment. Data conversion according to the embodiment implements a function that achieves both process efficiency and flexibility with a definition drive type without the need for logic. Specifically, when data 104 is converted, if meta-definition 131 of a conversion source 101 (From side) is different from meta-definition 132 of a conversion destination 102 (To side), a converting function 100 is activated for performing conversion to achieve consistency with the meta-definition 132 of the conversion destination.

The meta-definition 103 (131, 132) is information that defines data types and type attributes of data at the conversion source 101 and the conversion destination 102. For example, the data types include a character string type (Char) and an integer type (Integer). The type attributes represent more detailed characteristics and include character code systems and character types, for example. The character code systems include, for example, Shift Japanese Industrial Standard (SJIS, Shift JIS), Japanese processing Extended Feature (JEF), and UCS/Unicode Transformation Format 8 (UTF-8). The character types include a two-byte size and a one-byte size.

In FIG. 1, as one example, the meta-definition 131 of the conversion source 101 defines the data type as a character string type, the character code system of the type attribute as Shift JIS, and the character string type as a one-byte size. On the other hand, the meta-definition 132 of the conversion destination 102 defines the data type as a character string type, the character code system of the type attribute as UTF-8, and the character string type as a one-byte size. Data 141 of the conversion source 101 is input to the converting function 100 according to the meta-definition 131 of the conversion source 101. On the other hand, data 142 of the conversion source 102 is input to the converting function 100 according to the meta-definition 132 of the conversion destination 102.

The converting function 100 compares the meta-definition 131 of the conversion source 101 with the meta-definition 132 of the conversion destination 102 and, if a different portion exists, the converting function 100 converts the differing portion to achieve consistency with the meta-definition 132 of the conversion destination 102 and outputs the data. Specifically, the converting function 100 has a data type converting function 111 that converts a data type, a character code converting function 112 that converts a character code system, and a character type converting function 113 that converts a character type.

For example, if the data types are different between the conversion source 101 and the conversion destination 102, the data type converting function 111 is activated to convert the data type of the data 141 of the conversion source 101 into the data type of the conversion destination 102. Similarly, if the character code systems are different between the conversion source 101 and the conversion destination 102, the character code converting function 112 is activated to converts the character code system of the data 141 of the conversion source 101 into the character code system of the conversion destination 102. If the character types are different between the conversion source 101 and the conversion destination 102, the character type converting function 113 is activated to converts the character type of the data 141 of the conversion source 101 into the character type of the conversion destination 102.

In the example of FIG. 1, if a character string of "130 YEN" is input according to the meta-definition 131 of the conversion source 101, the character code system and the character type of the type attribute are different between the conversion source 101 and the conversion destination 102 and therefore, the character code converting function 112 and the character type converting function 113 are sequentially activated. Therefore, "130 YEN" of the data 142 output to the conversion destination 102 is a character string having the character code of UTF-8 and the character type of the one-byte size (portion of numeric characters capable of being converted into one-byte characters).

Figure 2:
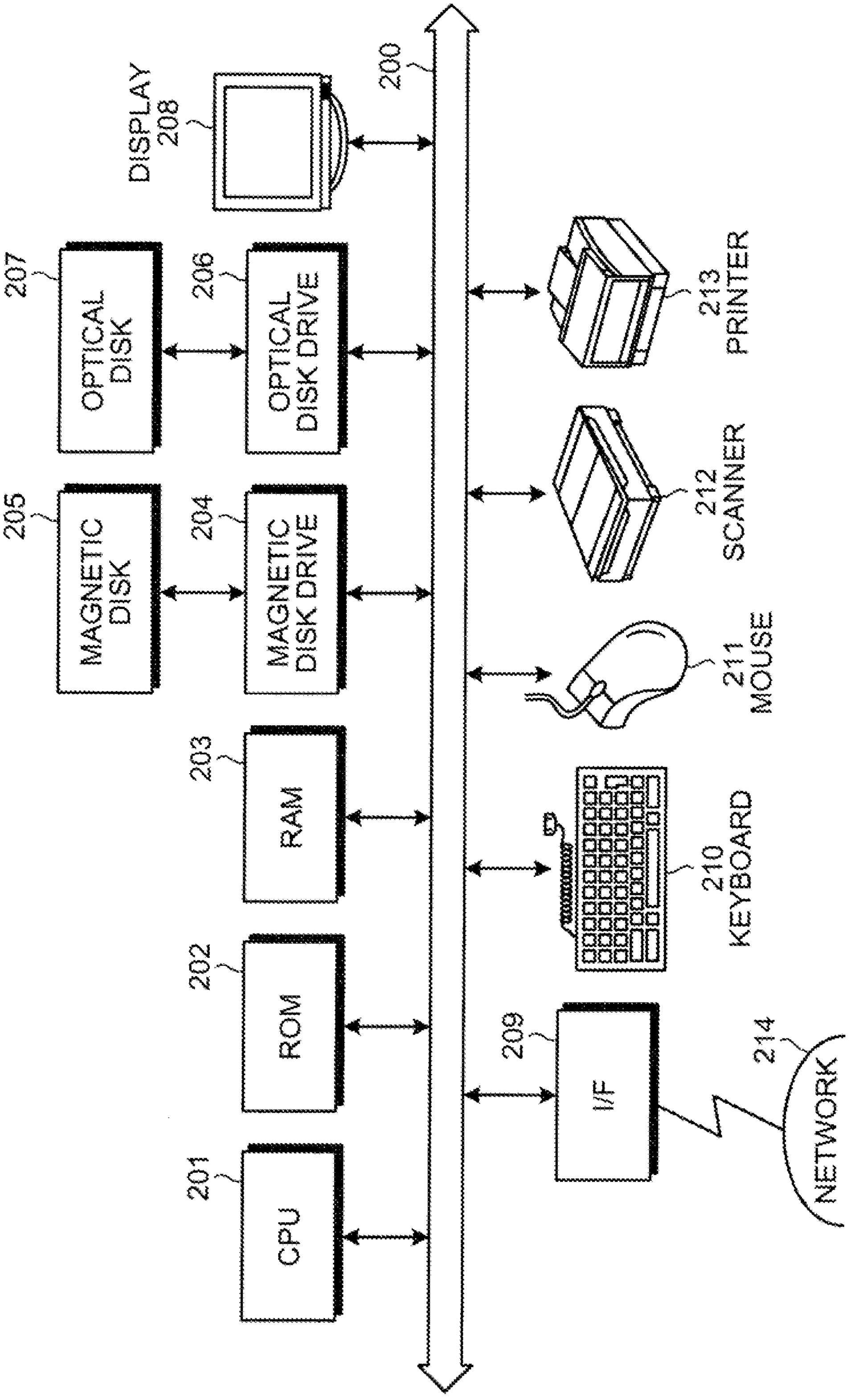
FIG. 2 is a block diagram of a hardware configuration of a data converting apparatus according to the first embodiment.

FIG. 2 is a block diagram of a hardware configuration of a data converting apparatus according to the first embodiment (a second embodiment described hereinafter). As depicted in FIG. 2, the data converting apparatus includes a central processing unit (CPU) 201, a read-only memory (ROM) 202, a random access memory (RAM) 203, a magnetic disk drive 204, a magnetic disk 205, an optical disk drive 206, an optical disk 207, a display 208, an interface (I/F) 209, a keyboard 210, a mouse 211, a scanner 212, and a printer 213, respectively connected by a bus 200.

The CPU 201 governs overall control of the data converting apparatus. The ROM 202 stores therein programs such as a boot program. The RAM 203 is used as a work area of the CPU 201. The magnetic disk drive 204, under the control of the CPU 201, controls the reading and writing of data with respect to the magnetic disk 205. The magnetic disk 205 stores therein data written under control of the magnetic disk drive 204.

The optical disk drive 206, under the control of the CPU 201, controls the reading and writing of data with respect to the optical disk 207. The optical disk 207 stores therein data written under control of the optical disk drive 206, the data being read by a computer.

The display 208 displays, for example, data such as text, images, functional information, etc., in addition to a cursor, icons, and/or tool boxes. A cathode ray tube (CRT), a thin-film-transistor (TFT) liquid crystal display, a plasma display, etc., may be employed as the display 208.

The I/F 209 is connected to a network 214 such as a local area network (LAN), a wide area network (WAN), and the Internet through a communication line and is connected to other apparatuses through the network 214. The I/F 209 administers an internal interface with the network 214 and controls the input/output of data from/to external apparatuses. For example, a modem or a LAN adaptor may be employed as the I/F 209.

The keyboard 210 includes, for example, keys for inputting letters, numerals, and various instructions and performs the input of data. A touch-panel-type input pad or numeric keypad, etc. may be adopted. The mouse 211 is used to move the cursor, select a region, or move and change the size of windows. A track ball or a joy stick may be adopted provided each respectively has a function similar to a pointing device.

The scanner 212 optically reads an image and takes in the image data into the data converting apparatus. The scanner 212 may have an optical character recognition (OCR) function as well. The printer 213 prints image data and text data. The printer 213 may be, for example, a laser printer or an ink jet printer.

Figure 3A:
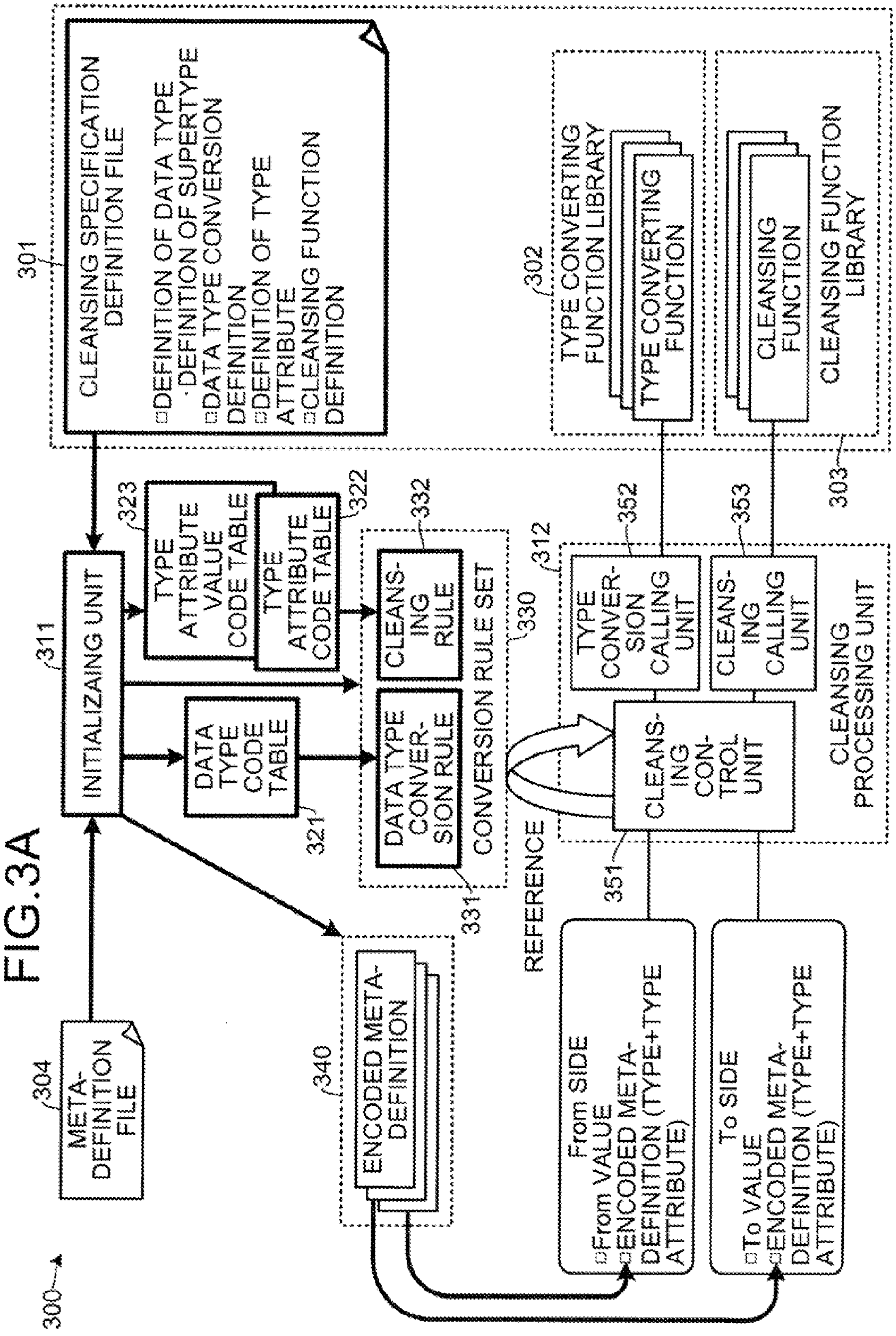
FIG. 3A is a block diagram of a functional configuration of the data converting apparatus.

FIG. 3A is a block diagram of a functional configuration of the data converting apparatus according to the first embodiment (and a second embodiment described hereinafter). As depicted in FIG. 3A, the data converting apparatus 300 includes a cleansing processing unit and an initializing unit. Specifically, the functions of the cleansing processing unit and the initializing unit are implemented by driving the CPU 201 to execute programs stored in a storage device such as the ROM 202, the RAM 203, the magnetic disk 205, and the optical disk 207 depicted in FIG. 2, for example, or through the I/F 209.

The data converting apparatus 300 uses a cleansing specification definition file 301, a type converting function library 302, a cleansing function library 303, and a meta-definition file 304. The cleansing specification definition file 301, the type converting function library 302, the cleansing function library 303, and the meta-definition file 304 are stored in a storage device such as the ROM 202, the RAM 203, the magnetic disk 205, and the optical disk 207 depicted in FIG. 2 or are accessible via the network 214 through the I/F 209.

The cleansing specification definition file 301 defines the properties of the data types handled by the data converting apparatus along with the data type converting function and defines the type attributes defining detailed properties of the data types along with the cleansing function.

The data converting apparatus 300 has an initializing unit 311 and a cleansing processing unit 312. The initializing unit 311 reads the cleansing specification definition file 301 and the meta-definition file 304 to generate a data type code table 321, a type attribute code table 322, and a type attribute value code table 323. The data types, the type attributes, and the type attribute values are encoded.

The meta-definition file 304 describes the meta-definition 103 depicted in FIG. 1. The initializing unit 311 encodes the meta-definition file 304 to generate encoded meta-definition information 340. The encoded meta-definition information 340 is separately generated for the conversion source 101 and the conversion destination 102.

The initializing unit 311 generates a data type conversion rule table 331 from the data type conversion definition of the cleansing specification definition file 301 and the data type code table 321 and generates a cleansing rule table 332 from the cleansing function definition of the cleansing specification definition file 301, the type attribute code table 322, and the type attribute value code table 323. The initializing unit 311 integrates the data type conversion rule table 331 and the cleansing rule table 332 to establish a conversion rule set 330. The conversion rule set 330 is binary data, for example. Thus, data conversion rules are established for conversion from the conversion source into the conversion destination related to the encoded data types, type attributes, and type attribute values.

The cleansing processing unit 312 includes a cleansing control unit 351, a type conversion calling unit 352, and a cleansing calling unit 353. The cleansing control unit 351 reads the From value (original value) 141 of the conversion source 101 and the encoded meta-definition information 340 on the From side and the To value (object value) 142 of the conversion destination 102 and the encoded meta-definition information 340 on the To side and refers to the conversion rule set 330 to control the type conversion calling unit 352 and the cleansing calling unit 353.

Specifically, the cleansing control unit 351 compares the encoded meta-definitions (types) between the From side and the To side to determine which type converting process is to be executed and drives the type conversion calling unit 352 to call from the type converting function library 302 and execute the type converting function for executing the determined type converting process. Similarly, the cleansing control unit 351 compares the encoded meta-definitions (type attributes) between the From side and the To side to determine which cleansing process is to be executed and drives the cleansing calling unit 353 to call from the cleansing function library 303 and execute the cleansing function for executing the determined cleansing process.

FIG. 3B is a diagram of storage contents of the type converting function library 302. As depicted in FIG. 3B, the type converting function library 302 stores type converting functions. The type converting functions are specified by a combination of the data type of the converting source 101 (From side) and the data type of the conversion destination 102 (To side). The type converting function uses a function prepared in advance.

FIG. 3C is a diagram of the cleansing function library 303. FIG. 3C depicts the cleansing function library 303 of the character code system conversion. The cleansing function library 303 stores the cleansing function when the type attribute is the character code system. The cleansing function is specified by a combination of the type attribute value of the From side and the type attribute value of the To side. The cleansing function also uses a function prepared in advance.

Details of various types of data (the cleansing specification definition file 301, the type converting function library 302, the cleansing function library 303, and the meta-definition file 304) used in the data converting apparatus 300 will be described with examples.

Figure 4:
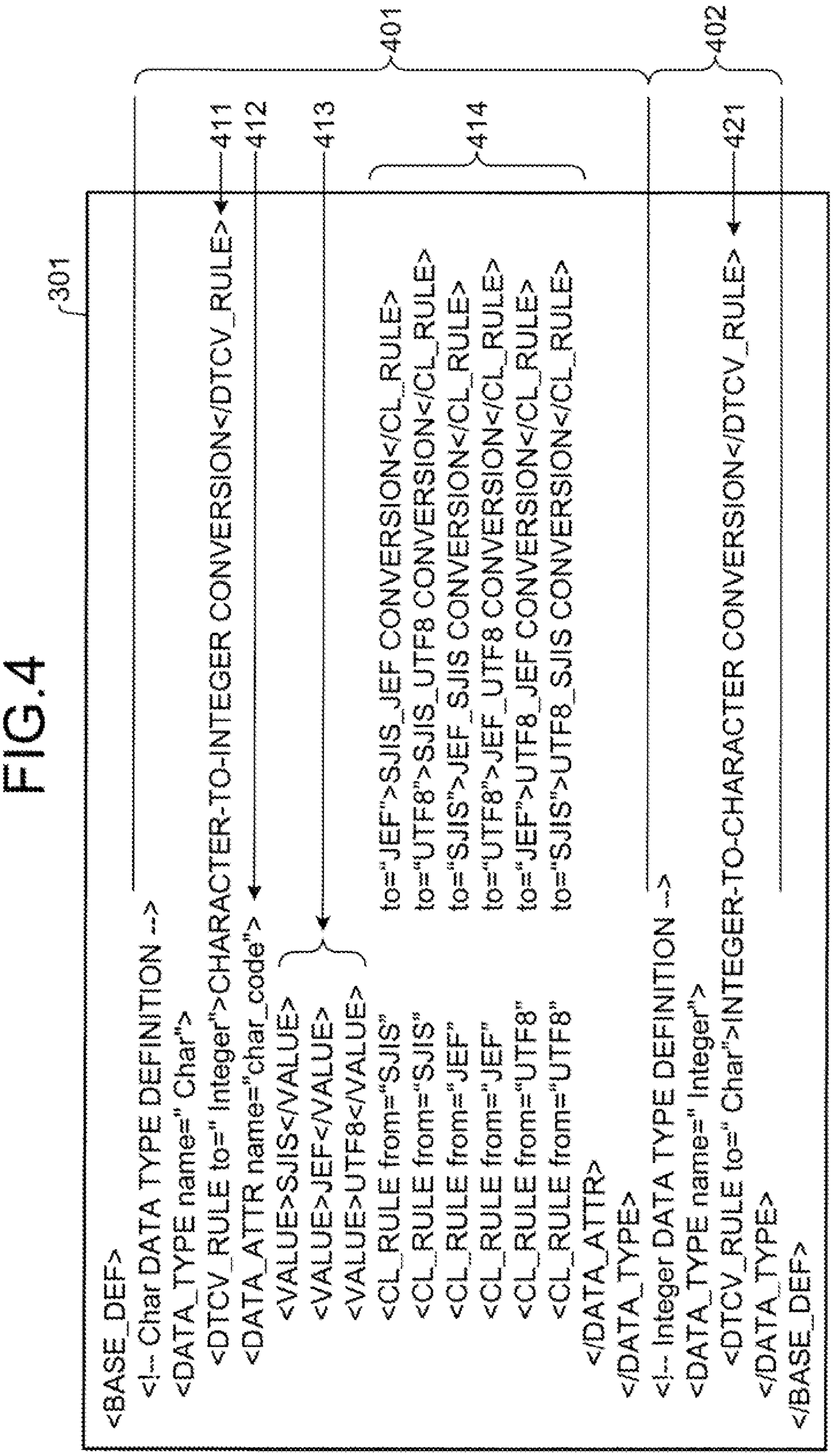
FIG. 4 is a diagram of one description example of a cleansing specification definition file 301.

FIG. 4 is a diagram of one description example of the cleansing specification definition file 301. The cleansing specification definition file 301 depicted in FIG. 4 defines the character string type (Char type) and the integer type (Integer type) as data types. Reference numeral 401 denotes the definition description of the character string type and reference numeral 402 denotes the definition description of the integer type.

In the definition description 401 of the character string type, reference numeral 411 denotes the description of the type converting function. The description 411 of the type converting function is defined by a DTCV_RULE tag that defines the type conversion. The data type of the conversion source 101 (From side) is the character string type and therefore is not described, and the data type of the conversion destination 102 is described by an integer type "to ="Integer"" as a to-attribute. A function name called as the type converting function ("character-to-integer conversion" in this example) is assigned as a value of the DTCV_RULE tag. The function name assigned at this point acts as a pointer to call the corresponding type converting function.

In the definition description 401 of the character string type, reference numeral 412 denotes a tag that defines a type attribute. In the "DATA_ATTR" tag 412 defining a type attribute, a character code system (char_code) is described as a type attribute name. A "VALUE" tag 413 defining a type attribute value usable as a value of a type attribute is described as a child tag of the tag 412 defining the type attribute. Three type attribute values of "SJIS", "JEF", and "UTF8" are defined in this example.

Following the tag 413 defining a type attribute value, a cleansing rule definition tag "CL_RULE" 414 is described. In the cleansing rule definition tag 414, the type attribute value of the conversion source 101 (From side) and the type attribute value of the conversion destination 102 (To side) are described. For example, if the type attribute value of the conversion source 101 is Shift JIS and the type attribute value of the conversion destination 102 is JEF, "from="SJIS" to ="JEF"" is described in the start tag of the cleansing rule definition tag 414. A function name "SJIS_JEF conversion" executing the cleansing function from Shift JIS to JEF (character code system conversion) is described as a value of the tag. The function name assigned at this point acts as a pointer to call the corresponding cleansing function.

In the definition description 402 of the integer type, reference numeral 421 denotes the description of the type converting function. In the description 421 of the type converting function, the data type of the conversion source 101 (From side) is the integer type and therefore is not described, and the data type of the conversion destination 102 is described by a character string type "to="Char"" as a value of "to" attribute of the DTCV_RULE tag that defines the type conversion. A function name for calling the type converting function ("integer-to-character conversion" in this example) is described as a value of the DTCV_RULE tag. The function name assigned at this point acts as a pointer to call the corresponding type converting function.

This cleansing specification definition file 301 is able to define one or more data types and defines zero or more type attributes and type attribute values usable as the values of the type attributes for one data type, as the property of each data type. By using the data types, the type attributes, and the type attribute values usable at the conversion source 101 (From side) and the conversion destination 102 (To side) defined in this file to describe the property (meta-definition) of each value, as the meta-definition file, the meta-definition 131 corresponding to the data value 141 of the From side 101 is specified and the meta-definition 132 corresponding to the data value 142 of the To side 102 is specified. As a result, when the meta-definition of the conversion source 101 and the meta-definition of the conversion destination 102 are delivered to the cleansing processing unit 312 depicted in FIG. 3A along with the data of the transform source 101, the cleansing processing unit 312 refers to the conversion rule set 330 to execute cleansing, such as type conversion and character code system conversion according to a combination of the types and the type attributes of the conversion source 101 and the conversion destination 102.

By symmetrically defining the conversion source 101 (From side) and the conversion destination 102 (To side) in the cleansing specification definition file 301 (allowing usage in both the From side and To side directions), it is not necessary to differentiate the data types, the type attributes, and the type attribute values usable on the From side and the To side when the meta-definition file is described. In the virtual integration (EII), since the data converting function is used in both the inquiry deconstructing process and the result integrating process, and the From side and the To side are reversed in this case, it is essential to symmetrically define the From side and the To side.

FIG. 5 is a diagram of an expansion example of the cleansing specification definition file 301 depicted in FIG. 4. Although a function name for calling the type attribute converting function is described for each combination of type attribute values as a cleansing rule in FIG. 4, functions implementing the cleansing function include a function capable of supporting any combination of type attribute values by itself. In FIG. 5, when using a cleansing function capable of supporting all the combinations of the relevant type attributes with single function, "*" is used as a value of the "from" attribute and the "to" attribute of the cleansing rule definition tag 414. "*" is a wildcard representative of all the type attribute values usable in the corresponding type attributes.

For example, in an underscored line in FIG. 5, the start tag of the cleansing rule definition tag 414 is described as <CL_RULE from="*" to ="*">. As a result, if the type attribute of the "char_code" type attribute of the conversion source 101 is different from the same type attribute value of the conversion destination 102, the cleansing function "CHARACTER CODE SYSTEM CONVERSION" is executed by a function sandwiched by the start tag and the end tag of the cleansing rule definition tag 414.

If described as <CL_RULE from="A" to ="*">, when the type attribute value of the corresponding type attribute of the conversion source 101 is "A" and the same attribute value of the conversion destination 102 is other than "A", the cleansing function is executed by a function sandwiched by the start tag and the end tag of the cleansing rule definition tag 414.

If described as <CL_RULE from="*" to ="A">, when the type attribute value of the corresponding type attribute of the conversion source 101 is other than "A" and the same attribute value of the conversion destination 102 is "A", the cleansing function is executed by a function sandwiched by the start tag and the end tag of the cleansing rule definition tag 414.

FIG. 6 is a diagram of a type attribute addition/expansion example of the cleansing specification definition file 301. The cleansing specification definition file 301 depicted in FIG. 6 is an example of adding a type attribute of "max_length" that specifies the maximum length (byte length) of character to the cleansing specification definition file 301 depicted in FIG. 5 after the type attribute: character code system ("char_code"). By adding the type attribute definition tag <DATA_ATTR>, a type attribute and a cleansing function able to cope with given data types can be added. In this example, a length adjusting process for a character string can be executed.

The order of the type attribute definitions may be controlled such that a type attribute definition of an important (basic) property is placed earlier to be preferentially executed. In principle, by adding a new type attribute definition to the tail end, the effect on the existing function may be minimized. In this example, "char_code" is a type attribute that is more important than the type attribute, "max_length".

The type attribute value may be expanded to make any type attribute values available by using the type attribute definition <DATA_ATTR> not having a <VALUE> tag that defines a type attribute value. For example, by using the type attribute definition not defining a type attribute value with the <VALUE> tag as depicted within an area demarcated by a dashed line in FIG. 6, the type attribute: max_length may take any value as the type attribute value. This is convenient when it is difficult to limit a value of the type attribute in advance as in the case of max_length that specifies the maximum length (byte length of a character string). If the type attribute value is not defined by the <VALUE> tag, since it is difficult to presuppose the value in advance, the cleansing rule definition tag must describe a rule using "*" such as <CL_RULE from="*" to ="*">. In this case, if the type attribute:max_length is different between the conversion source 101 and the conversion destination 102, the cleansing function "length ADJUSTMENT" is unconditionally executed.

The meta-definition based on the cleansing specification definition file 301 will be described. The cleansing specification definition file 301 depicted in FIG. 6 is taken as an example.

Figure 7:
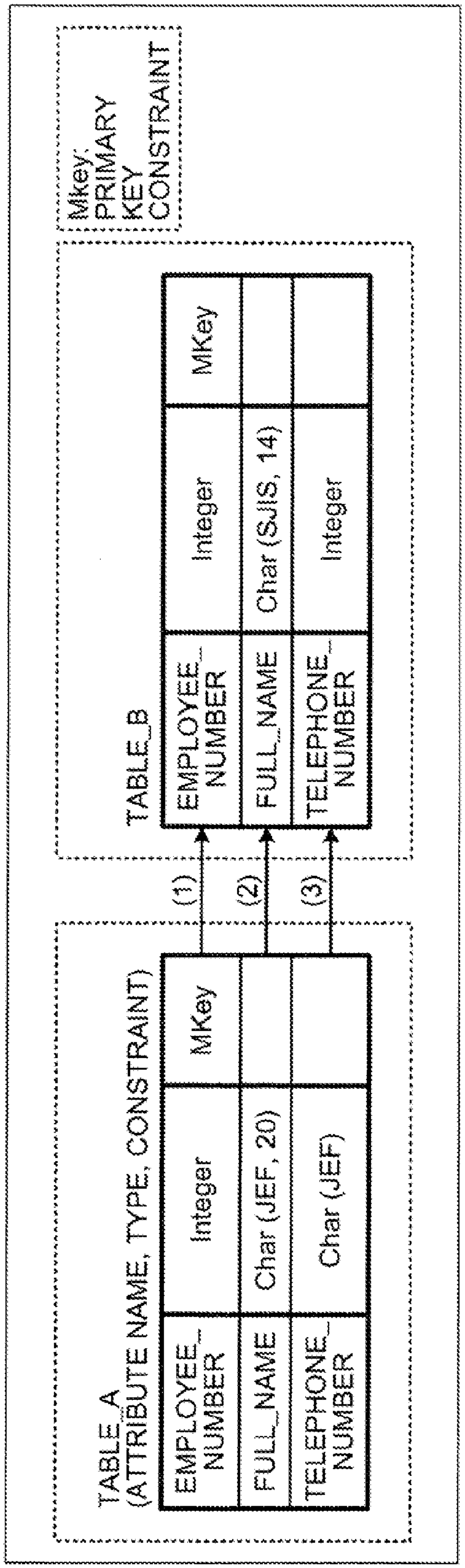
FIG. 7 is a diagram of a TABLE_A used at a conversion source 101 and a TABLE_B used at a conversion destination 102.

FIG. 7 is a diagram of a TABLE_A used at the conversion source 101 and a TABLE_B used at the conversion destination 102. The TABLE_A and the TABLE_B are models of tables defined in the meta-definition file 304. Both the TABLE_A and the TABLE_B define a data type, a type attribute, and a primary key constraint for each column. In the TABLE_A, the data type of "EMPLOYEE_NUMBER" is the integer type and a primary key constraint exists. The data type of "FULL_NAME" is the character string type and the character code system of the type attribute is JEF. The maximum character string length of the type attribute is 20 bytes. The data type of "TELEPHONE_NUMBER" is the character string type and the character code system of the type attribute is JEF.

In the TABLE_B, the data type of "EMPLOYEE_NUMBER" is the integer type and the primary key constraint exists. The data type of "FULL_NAME" is the character string type and the character code system of the type attribute is SJIS. The maximum character string length of the type attribute is 14 bytes. The data type of "TELEPHONE_NUMBER" is the integer type. The columns of the TABLE_A correspond to the columns of the same names in the TABLE_B through (1) to (3).

Although the TABLE_A and the TABLE_B are described as the conversion source 101 and the conversion destination 102, respectively, the direction of data conversion generally varies depending on the objective of the process. For example, in physical integration (ETL), when the data model on the information source side and the data model on the target side are the TABLE_A and the TABLE_B, respectively, the data conversion is performed by using columns in the TABLE_A and the corresponding columns in the TABLE_B as the conversion source 101 and the conversion destination 102, respectively. In virtual integration (EII), when the physical model on the information source side and the logic model on the utilization side are the TABLE_A and the TABLE_B, respectively, the data conversion is performed in a process of converting a search condition input to the TABLE_B into a search condition for the TABLE_A by using a search condition for an object column of the TABLE_B that is the logic model as the conversion source 101 and using a search condition for a corresponding column of the TABLE_A that is the physical model as the conversion destination 102, and the data conversion is performed in a process of converting search result data (physical model) on the information source side into data of the logic model on the utilization side by using the columns of the TABLE_A as the transition source 101 and using the corresponding columns of the TABLE_B as the conversion destination. In the following descriptions, since the data converting process for converting the physical model data (TABLE_A) into the logic model data (TABLE_B) in the virtual integration (EII) is used as an example, it is assumed that the conversion source 101 and the conversion destination 102 are the TABLE_A and the TABLE_B, respectively.

FIG. 8 is a diagram of one description example of the meta-definition file 304. The meta-definition file 304 depicted in FIG. 8 is a file that defines the physical model TABLE_A and the logic model TABLE_B and the correspondence relationship between the TABLE_A and the TABLE_B.

In this example, the physical model TABLE_A and the logic model TABLE_B are defined as <R_MODEL> and <V_MODEL>, respectively, and a table name and a key specification are specified for a name attribute and a keytype attribute, respectively. The columns making up the tables are defined by <COLUMN> (specifying a column name for the name attribute) and the data type and the type attribute are defined by <D_TYPE> and <D_ATTR> (specifying a name of the type attribute for the name attribute), respectively, as the properties of the columns. The correspondence relationship between the columns is defined by <MAP_RULE> to indicate that the column specified by <FROM_COLUMN> (specifying a table name for the table attribute) corresponds to <TO COLUMN> (specifying a table name for the table attribute). <META_DATA> is a root tag that organizes the entire meta-definition.

If the data of the conversion source 101 (physical model TABLE_A) is subjected to the data conversion and output to the conversion destination 102 (logic model TABLE_B), since "FULL_NAME" is different in the type attribute value of the character code system that is the type attribute, the cleansing from JEF to SJIS is performed. Since the type attribute regulating the maximum character string length is specified on the TABLE_B, if the character string length is greater than 14 bytes, a copy is made for 14 bytes and subsequent characters are deleted. Since "TELEPHONE_NUMBER" is different in the data type, type conversion is performed from the character string type (JEF) to the integer type.

The inheritance of the data type will be described. In the cleansing specification definition file 301, the cleansing specification may be expanded by adding description of a data type inheriting an existing data type. The existing data type is referred to as an Supertype and the new data type inheriting properties of the Supertype is referred to as an Subtype. This concept is application of the idea similar to the succession between classes in object-oriented to the data type. As for each concept, the data type, Supertype, and Subtype correspond to the class, Superclass, and Subclass.

The inheritance may be defined by describing "super="type name of Supertype"" to specify the Supertype in the definition of the new data type that is the Subtype. If the inheritance is defined, the data type of the Subtype inherits all properties such as the type attribute and the cleansing function possessed by the data type of the Supertype.

An example of addition of the description of the inheritance will hereinafter be described. It is assumed that the data type of the Supertype is the character string type and that the cleansing rule of the type attribute: character code system (char_code) is the character code system conversion. On the other hand, it is assumed that the data type of the Subtype is a personal name type and that the cleansing rule of the type attribute: name_space is a first/second-name spacing process.

Figure 9:
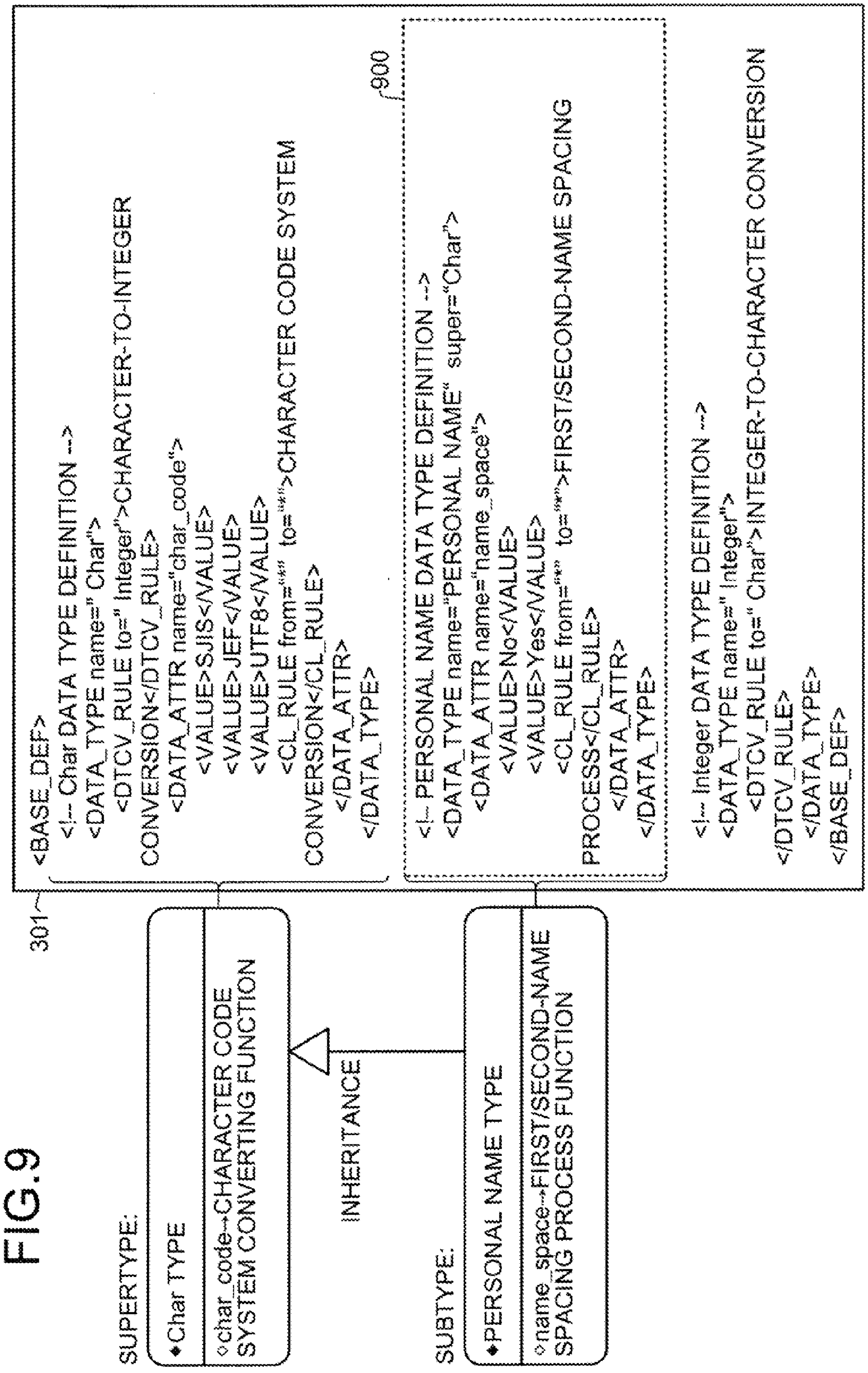
FIG. 9 is a diagram of one description example of the cleansing specification definition file 301 with inheritance added.

FIG. 9 is a diagram of one description example of the cleansing specification definition file 301 with the inheritance added. The cleansing specification definition file 301 of FIG. 9 is an example of adding a personal name data type definition description 900 (within an area demarcated by a dashed line in FIG. 9) to the cleansing specification definition file 301 depicted in FIG. 4 to enable the usage of the new "personal name type" data and the corresponding cleansing function.

In the personal name data type definition description 900, "super="Char"" is added to the data type: personal name type, as description specifying the Supertype. The data type: personal name is capable of inheriting all the properties such as the type attribute: character code system (char_code) (including the three type attribute values of SJIS, JEF, and UTF8) and the cleansing function: character code system conversion possessed by the character string type specified by the description specifying the Subclass.

The Subtype is able to possess name_space (including two type attribute values of Yes and No) as a unique type attribute independent of the Supertype and the cleansing function: first/second-name spacing function. The type attribute: name_space represents the presence of space between the first and second names. If the type attribute value is Yes, a space is provided, and if No, no space is provided between the first and second names.

The type attribute added to the Subtype is added after the type attribute of the Supertype. Therefore, the type attribute of the Supertype is always handled as a more basic type attribute than the type attribute of the Subtype.

Figure 10:
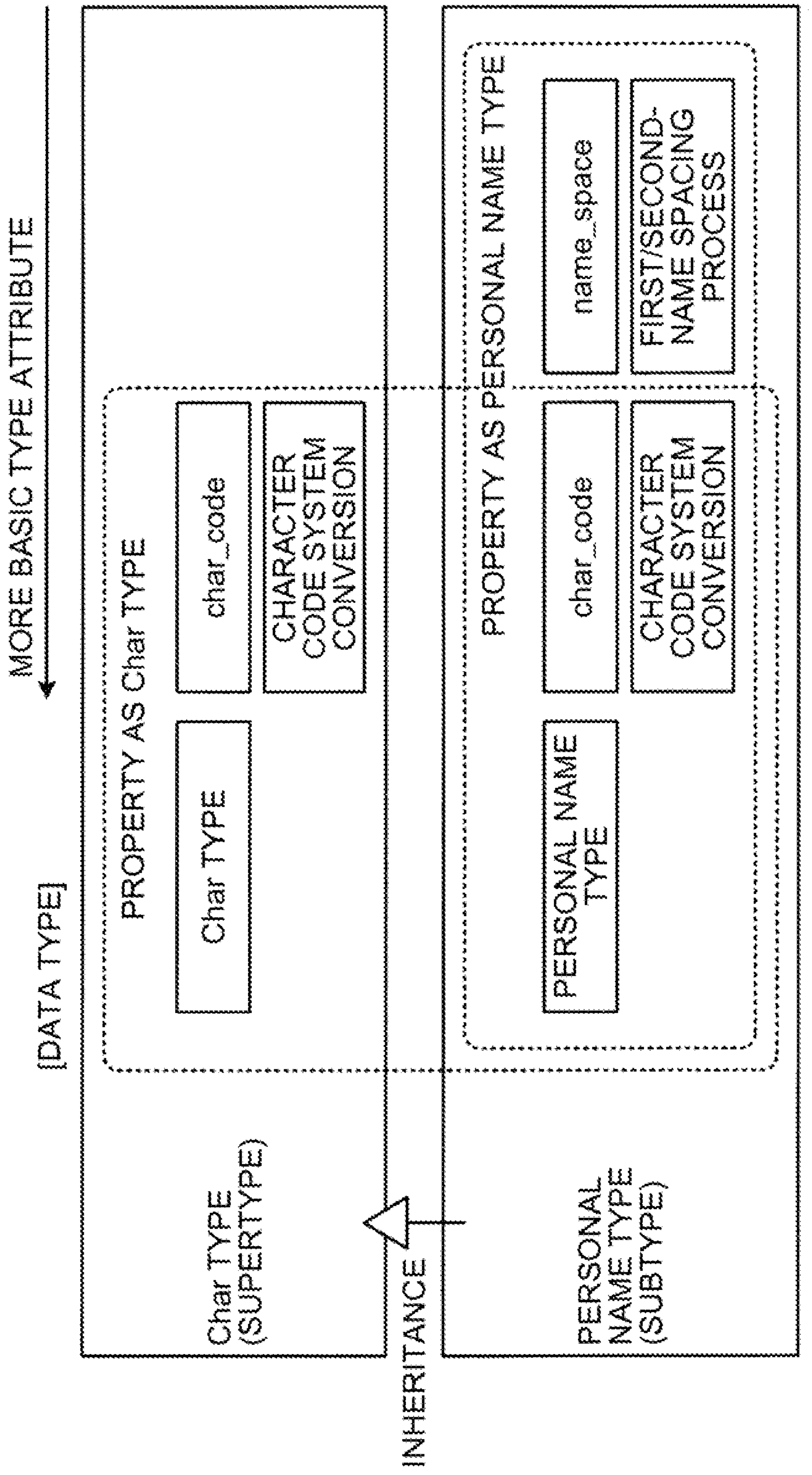
FIG. 10 is a diagram of the inheritance relationship between the Supertype and the Subtype.

FIG. 10 is a diagram of the inheritance relationship between the Supertype and the Subtype. FIG. 10 depicts the inheritance relationship between the Supertype and the Subtype in the cleansing specification definition file 301 depicted in FIG. 9. The data type: personal name in the Subtype inheriting the data type: character string type (Char) of the Supertype is able to use the type attribute: character code system (char_code) possessed by the data type: character string type (Char) of the Supertype and the type attribute: name_space expanded by the data type: personal name of the Subtype. The personal name type, i.e., the Subtype inherits all the properties for the character string type (Char), i.e., the Supertype and may be handled as the character string type and is additionally defined to be capable of handling "a space between the first and second names", which is a unique property for the personal name type.

FIG. 11 is a diagram of another description example of the meta-definition file 304. In the meta-definition file 304 depicted in FIG. 11, the definition of the "FULL_NAME" column (Char type) is replaced with the "personal name" type, which is the data type added in FIG. 9, in the TABLE_A and the TABLE_B of the meta-definition file 304 depicted in FIG. 8. Therefore, the type attribute "name_space" specific to the personal name type is newly defined; the "FULL_NAME" column of the TABLE_A is defined by "name_space="Yes"" and includes a space; and the "FULL_NAME" column of the TABLE_B is defined by "name_space="No"" and includes no space. The description of the underline of FIG. 8 (type attribute: maximum character string length) is deleted in this example for the simplicity of description.

Figure 12:
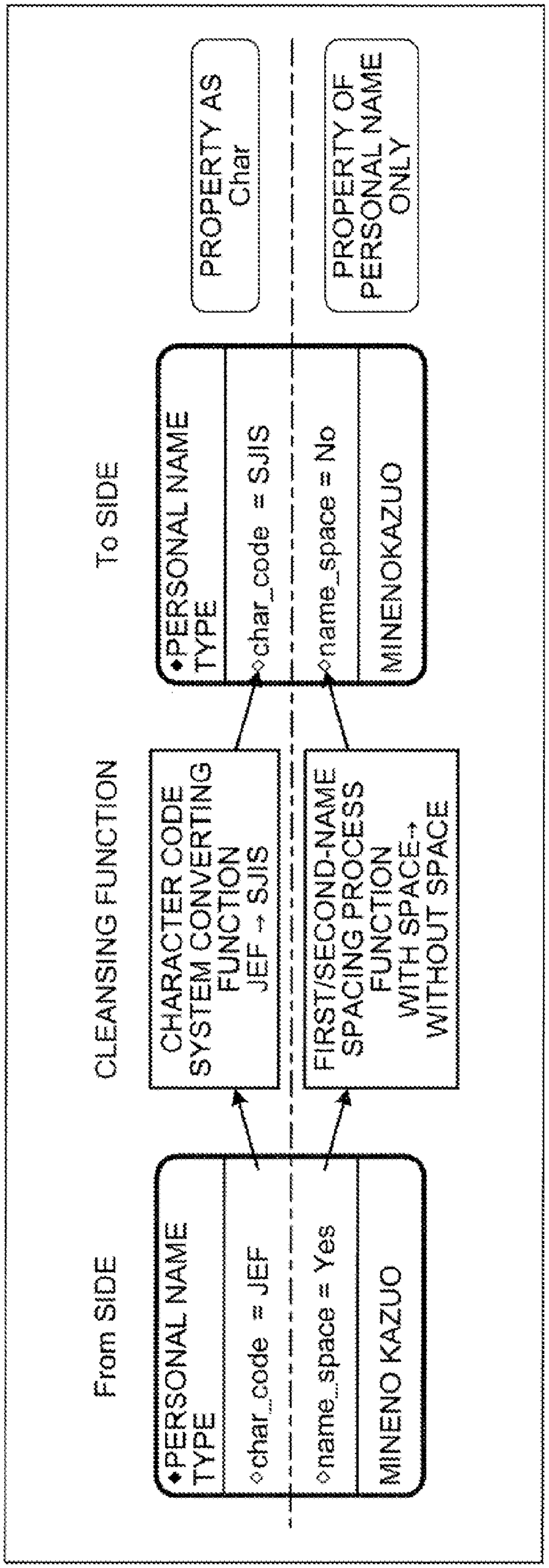
FIG. 12 is a diagram of a cleansing process when the cleansing specification definition file 301 depicted in FIG. 9 and the meta-definition file 304 depicted in FIG. 11 are used.

FIG. 12 is a diagram of the cleansing process when the cleansing specification definition file 301 depicted in FIG. 9 and the meta-definition file 304 depicted in FIG. 11 are used. For the "FULL_NAME" column, a personal name "MINENO KAZUO" defined in the data type: personal name type in the conversion source 101 (From side) is subjected to the cleansing process into the conversion destination 102 (To side) in the depicted example. In FIG. 12, the upper side of the dashed-dotted line depicts the cleansing process according to the property of the data type: character string type and the lower side of the dashed-dotted line depicts the cleansing process according to the properties specific to the data type: personal name type.

Referring to FIG. 11, for the data type: personal name type in the "FULL_NAME" column of the TABLE_A defined in the conversion source 101, the character code system is JEF and name_space is Yes (including space). For the data type: personal name type in the "FULL_NAME" column of the TABLE_B defined in the corresponding conversion source 102, the character code system is SJIS and name_space is No (not including space). Therefore, in FIG. 12, the character code system of the personal name "MINENO KAZUO" is converted from JEF to SJIS by executing the character code system converting function.

On the other hand, name_space of the personal name "MINENO KAZUO" is converted from Yes (including space) to No (not including space) by executing the first/second-name spacing process function. Therefore, in the conversion destination 102 (To side), the character code system is set to Shift JIS and the space between the second name "MINENO" and the first name "KAZUO" is deleted, resulting in the personal name "MINENOKAZUO" (described in Shift JIS).

The data type conversion of the Subtype may inherit properties of the Supertype. Specifically, in the case of a combination with a data type not requiring a data type conversion unique to the Subtype, the data type converting process is not defined for the conversion source to inherit the data type converting process of the corresponding data type defined in the Supertype. If a data type converting process unique to the Subtype is required, the data type converting process unique to the Subtype is additionally defined to be applied with preference to the data type converting process defined in the Supertype.

Figure 13:
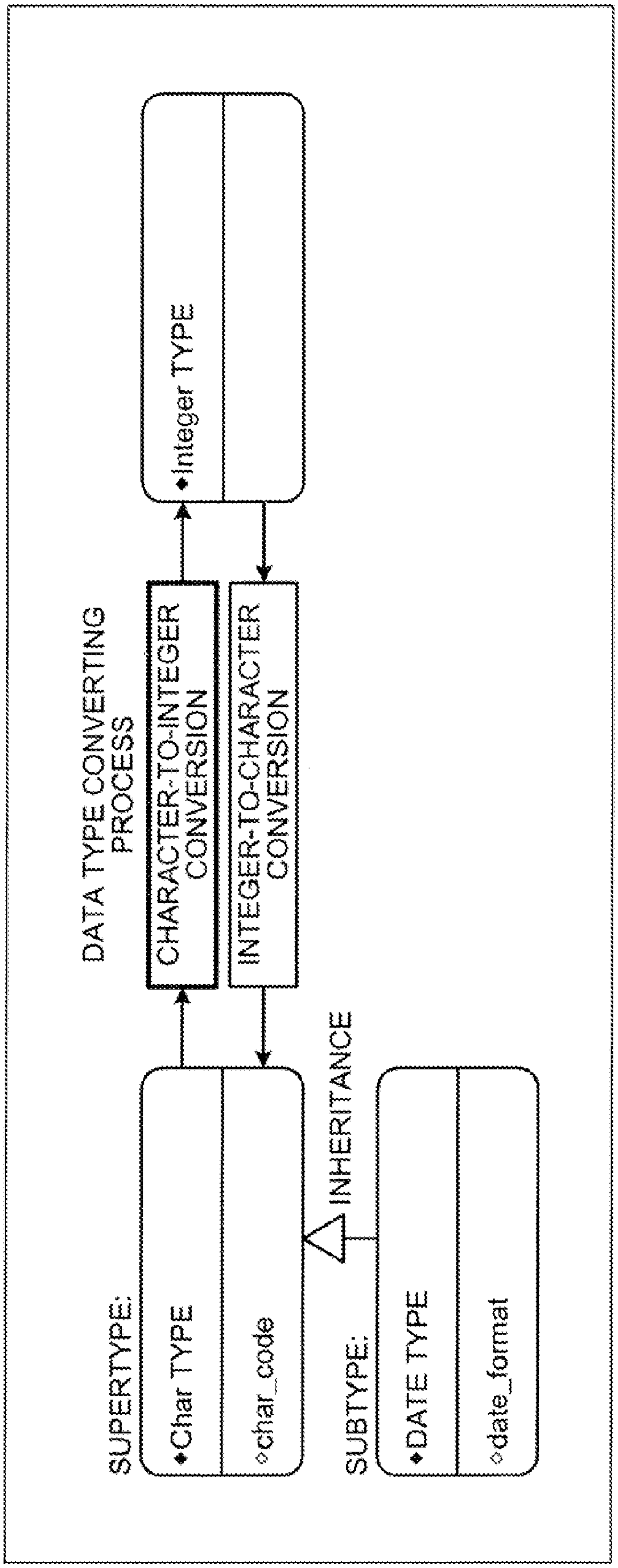
FIG. 13 is a diagram of the inheritance relationship when the data type: date type is added as the Subtype.

FIG. 13 is a diagram of the inheritance relationship when the data type: date type is added as the Subtype. Focusing attention on the combination of the data type: character string type (Char) and the data type: integer type (Integer) defined before the addition of the data type: date type in FIG. 13, it is indicated that the mutual data type conversion is enabled by the data converting processes of "character-to-integer conversion" and "integer-to-character conversion". On the other hand, focusing attention on the combination of the data type: date type of the Subtype and the existing data type: integer type, the data type conversion is not explicitly defined between the Subtype and the data type: integer type. Therefore, the data type conversion with the integer type defined for the character string type of the Supertype is inherited. Since this means that the data type converting process is executed in the Subtype with the assumption that the data has the data type of the Supertype, the operation is performed according to the concept of the inheritance, which is that "the Subtype inherits the properties of the Supertype", and no contradiction occurs.

Figure 14:
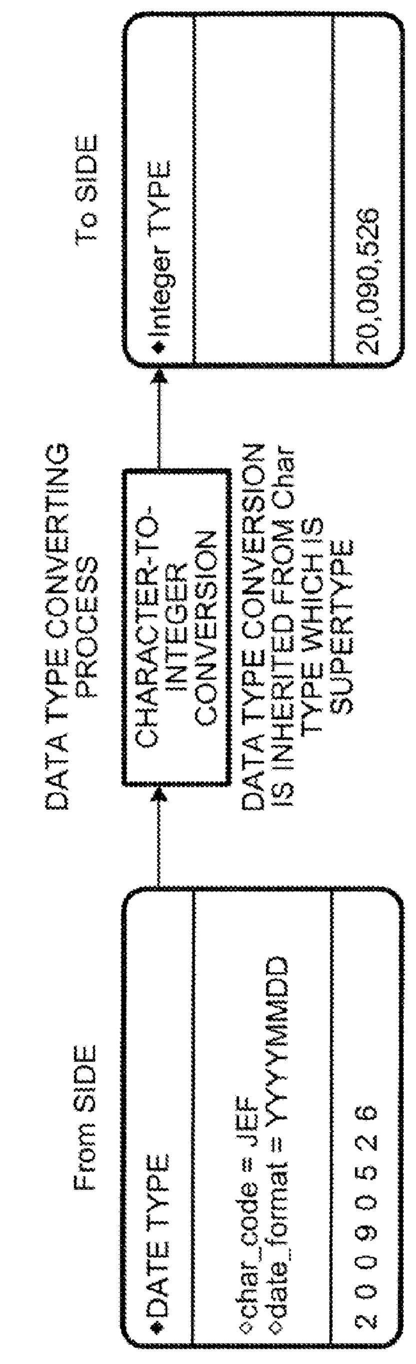
FIG. 14 is a diagram of an example of the data type conversion through the inheritance depicted in FIG. 13.

FIG. 14 is a diagram of an example of the data type conversion through the inheritance depicted in FIG. 13. In FIG. 14, date-type data "20090526" defined in the conversion source 101 (From side) is converted into an integer "20,090,526" by the data type converting process (character→integer conversion) "character-to-integer conversion" inherited from the character string type of the Supertype.

Figure 15:
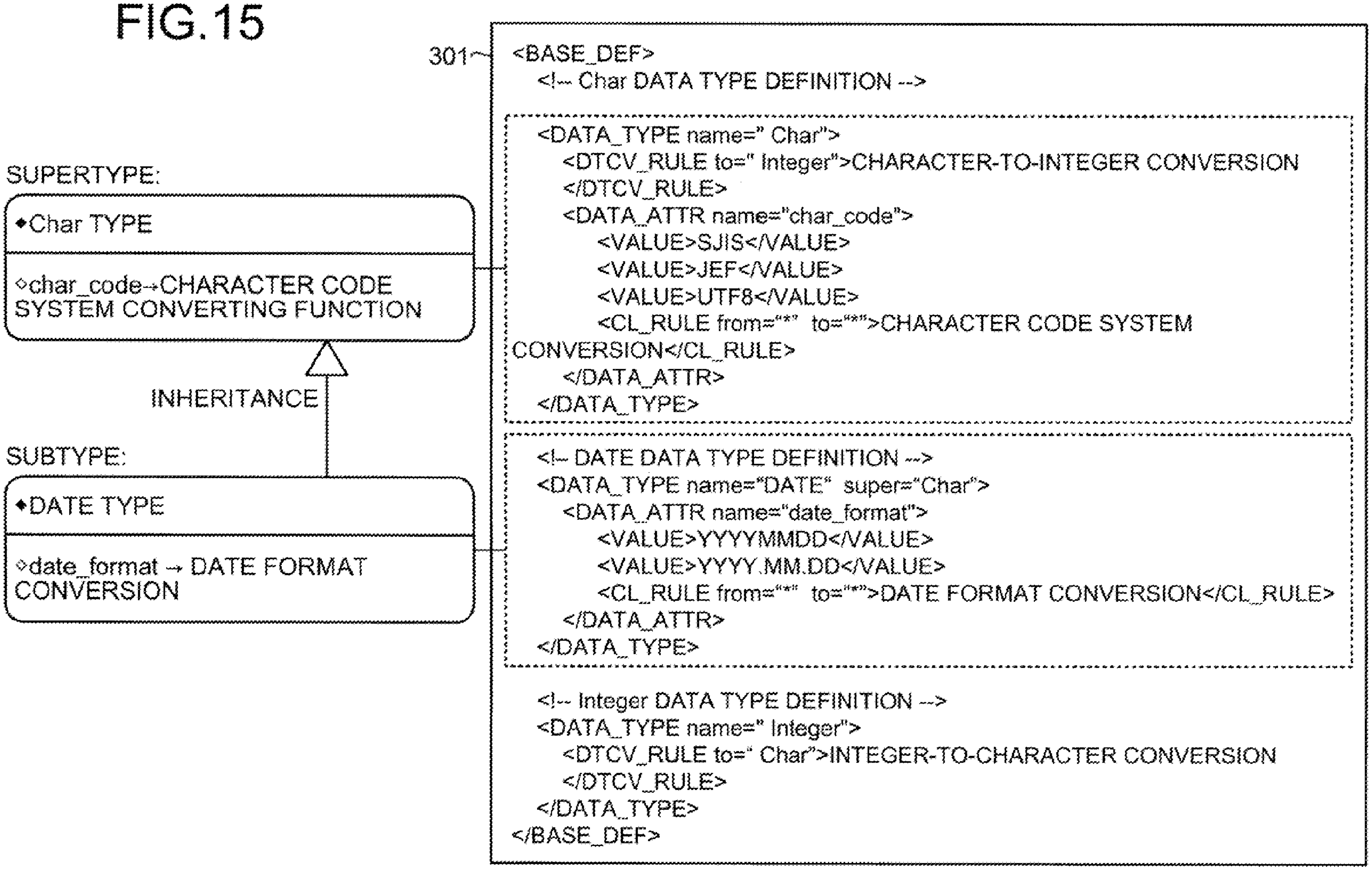
FIG. 15 is a diagram of an example of the cleansing specification definition file 301 that describes the inheritance relationship between the Supertype (Char type) and the Subtype (date type) depicted in FIG. 13.

FIG. 15 is a diagram of an example of the cleansing specification definition file 301 that describes the inheritance relationship between the Supertype (Char type) and the Subtype (date type) depicted in FIG. 13. Since <DTCV_RULE> tag indicative of the data type conversion is not defined for the date type, the next data type converting function defined for the character string type (Char) of the Supertype is inherit and applied. Specifically, the data of the date type is handled as that of the Char type to apply the data type converting function: character-to-integer conversion defined for the Char type to the data type conversion from the date type to the Integer type and to apply the data type converting function: integer-to-character conversion defined for the Integer type to the data type conversion from the Integer type to the date type.

As a result, the data type conversion with the existing data type necessitated by the addition of data type may be reduced to the requisite minimum. Therefore, the cost of the addition of data type is reduced and the prevention of the contradiction to the data type conversion may be achieved at the same time.

Description will be made of an example of defining a default value for a type attribute value to simplify the meta-definition file 304. If the number of the type attributes increases, the operation of specifying all the type attributes defined for all the items of the meta-definition file 304 becomes problematic. By specifying a default value through a default attribute in the definition of the type attributes in the cleansing specification definition file 301, it may be considered that a default value is set as a value of a type attribute not defined as an item of the meta-definition file 304. This enables the simplification of the meta-definition file 304.

FIG. 16 is a diagram of one description example of the cleansing specification definition file 301 with default values defined as type attributes. In FIG. 16, as indicated by an underscored portion, default type attribute values are described as the definitions of the type attributes in such a way as "default="JEF"", "default="20"", and "default="Yes"".

FIG. 17 is an exemplary diagram of the simplification of the meta-definition file 304. In FIG. 17, the upper meta-definition file 304 is a description example before the simplification and the lower meta-definition file 304 is a description example after the simplification of the meta-definition file 304 based on the cleansing specification definition file 301 depicted in FIG. 16.

Referring to the meta-definition file 304 before the simplification of FIG. 17, the type attributes of the data type: personal name type for the column name "FULL_NAME" include the type attribute: character code system (char_code) and "JEF" is defined as the type attribute value thereof. The type attributes of the data type: character string type for the column name "TELEPHONE_NUMBER" include the type attribute: character code system and "JEF" is defined as the type attribute value thereof. Since "JEF" is defined as the default type attribute value of the type attribute: character code system in FIG. 16, the description of the type attribute: character code system may be skipped in the meta-definition file 304.

Referring to the meta-definition file 304 before the simplification of FIG. 17, the type attributes of the data type: personal name type for the column name "FULL_NAME" include the type attribute: maximum character string length (max_length) and "20" is defined as the type attribute value thereof. The type attributes of the data type: character string type for the column name "TELEPHONE_NUMBER" include the type attribute: maximum character string length and "20" is defined as the type attribute value thereof. Since "20" is defined as the default type attribute value of the type attribute: maximum character string length in FIG. 16, the description of the type attribute: maximum character string length may be skipped in the meta-definition file 304.

Referring to the meta-definition file 304 before the simplification of FIG. 17, the type attributes of the data type: personal name type for the column name "FULL_NAME" include the type attribute: first/second-name space (name_space) and "Yes" is defined as the type attribute value thereof. Since "Yes" is defined as the default type attribute value of the type attribute: first/second-name_space in FIG. 16, the description of the type attribute: first/second-name_space may be skipped in the meta-definition file 304.

A function of the cleansing processing unit 312 depicted in FIG. 3A will be described in detail. As described above, the cleansing processing unit 312 refers to the conversion rule set 330 through the cleansing control unit 351 to control the type conversion calling unit 352 and the cleansing calling unit 353. Specifically, the cleansing control unit 351 determines which type converting process is to be executed and drives the type conversion calling unit 352 to call the determined type converting process from the type converting function library 302. Similarly, the cleansing control unit 351 determines which cleansing process is to be executed and drives the cleansing calling unit 353 to call the determined cleansing process from the cleansing function library 303. The expansion of the cleansing interface for the cleansing calling unit 353 and the cleansing function will first be described.

Figure 18:
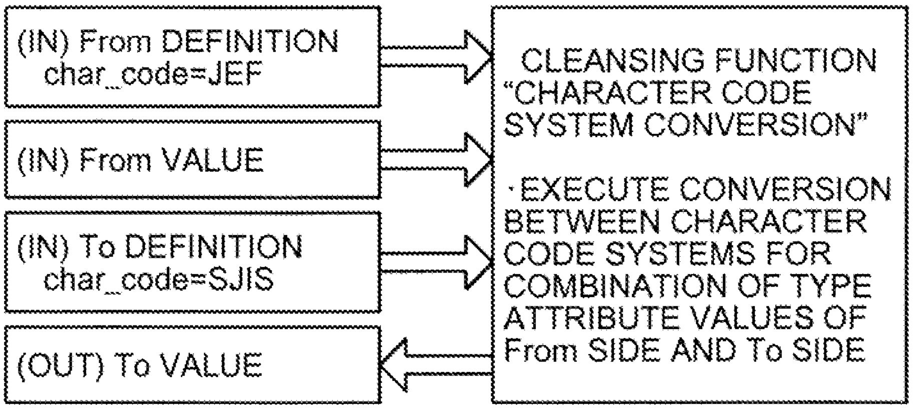
FIGS. 18 to 20 are diagrams of an exemplary cleansing function.

FIG. 18 is a diagram of an exemplary cleansing function. The cleansing function is a function of converting an input From value to output the value as a To value and the cleansing function is uniquely determined based on the cleansing rule table 332 and called by the cleansing calling unit 353 under the control of the cleansing control unit 351.

For example, in the cleansing specification definition file 301 depicted in FIG. 5, the type attribute: character code system (char_code) is defined for the data type: character string type (Char) as the data type and "SJIS", "JEF", and "UTF8" (JEF) are usable as the type attribute value thereof. The character code system converting function is specified as the cleansing rule (CL_RULE). The character code system conversion in this case is prescribed with "from="*"", which is the operation condition on the From side (the conversion source 101), and "to ="*"", which is the operation condition on the To side (the conversion destination 102), and is defined as a function of executing the necessary conversion between the character code systems according to a combination of arbitrary type attribute values of the char_code type attribute defined in advance.

The cleansing interface is configured to input the type attribute values of the From side and the To side as "From definition" and "To definition" to the cleansing function as depicted in FIG. 18 so as to support such a cleansing function having multiple conversion patterns.

For example, in regard to the character code system cleansing process in the mapping definition of (1), which correlates the item of "EMPLOYEE_NUMBER" of the TABLE_A with "EMPLOYEE_NUMBER" of the TABLE_B in the meta-definition file 304 depicted in FIG. 8, "JEF" is delivered as the character code system of the item "EMPLOYEE_NUMBER" of the TABLE_A, which is the conversion source, for the "From definition" along with the From value from the cleansing control unit 351, and "SJIS" is delivered as the character code system of the item "EMPLOYEE_NUMBER" of the TABLE_B, which is the conversion destination, for the "To definition" from the cleansing control unit 351 to the cleansing function as depicted in FIG. 18.

When receiving the "From definition", the "From value", and the "To definition", the cleansing function recognizes from the "From definition" and the "To definition" that the character code system conversion from "JEF" to "SJIS" is necessary, considers a value of the "From value" as a JEF character string to execute the conversion to a character string of Shift JIS (SJIS), and outputs the conversion result to the "To value". This arrangement is able to implement the cleansing function supporting multiple conversion patterns determined according to the combination of the "From definition" and the "To definition".

Description will be made of an example of making the implementation of the cleansing function easier or enabling an advanced cleansing function to be implemented by delivering the data type and all the type attribute values defined for the data item to be converted as the from definition and the To definition to the cleansing function in addition to the specification expansion depicted in FIG. 18 with reference to FIG. 19.

Figure 19:
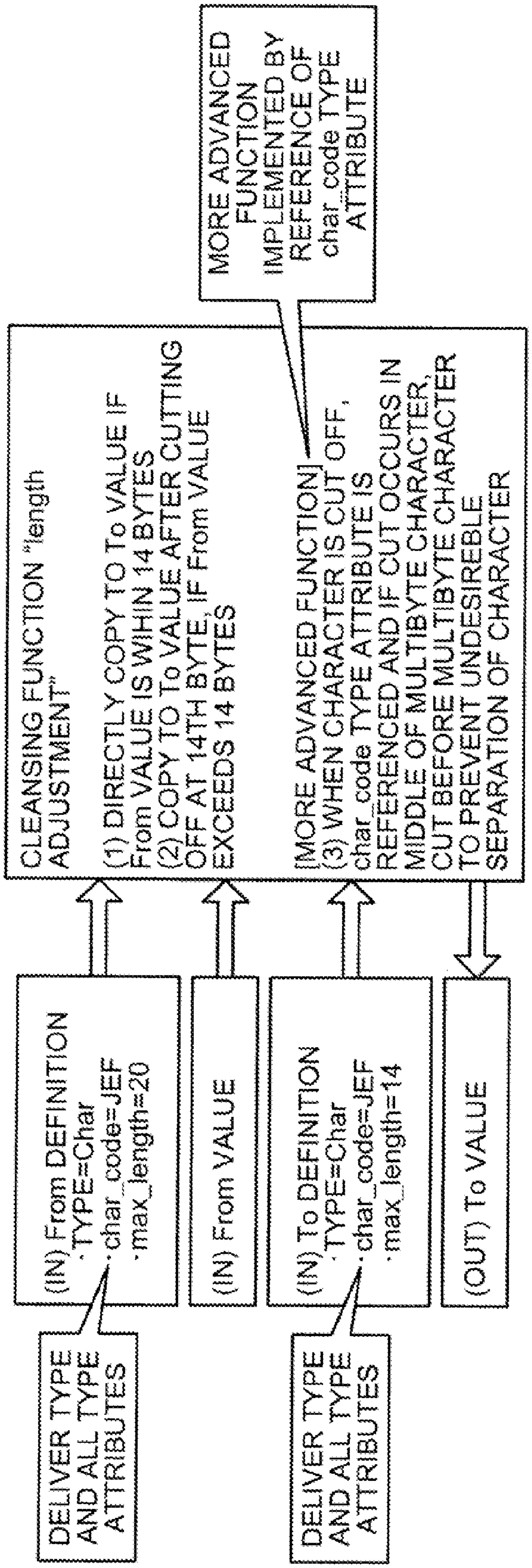

FIG. 19 is another explanatory diagram of an exemplary cleansing function. FIG. 19 depicts an example of executing a length adjusting function that is a function of adjusting a total length of a character string as the next cleansing function after the character code system converting process depicted in FIG. 18 is completed for the mapping definition of (1) defined in the meta-definition file 304 depicted in FIG. 8. The cleansing control unit 351 delivers the data type: character string type (Char), the type attribute: character code system (char_code) and the type attribute value: JEF, and the type attribute: maximum character string length (max_length) and the type attribute value: 20 as the From definition. In this way, the data type and all the type attributes and the type attribute values are delivered.

Similarly, for the To definition, the cleansing control unit 351 delivers the data type: character string type (Char), the type attribute: character code system (char_code) and the type attribute value: JEF, and the type attribute: maximum character string length (max_length) and the type attribute value: 14 as the To definition. In this way, the data type and all the type attributes and the type attribute values are delivered.

Therefore, if the character string of the From value concurrently delivered from the cleansing control unit 351 is within 14 bytes, the value is directly copied to the To value in the length adjusting function. On the other hand, if the character string of the From value exceeds 14 bytes, the value is copied to the To value with a portion after the 14th byte cut off. When a character string is cut off, the char_code type attribute is referenced and if the value is cut at the middle of a mutibyte character, the cutting may be made before the mutibyte character to prevent undesirable separation of a character. Alternatively, the correct number of characters may be measured by referring to the char_code type attribute to implement the length adjusting function for management using the number of characters.

Description will be made of an example of reflecting a state of a process result on the From definition by the cleansing function in addition to the specification expansion depicted in FIG. 19 with reference to FIG. 20.

Figure 20:
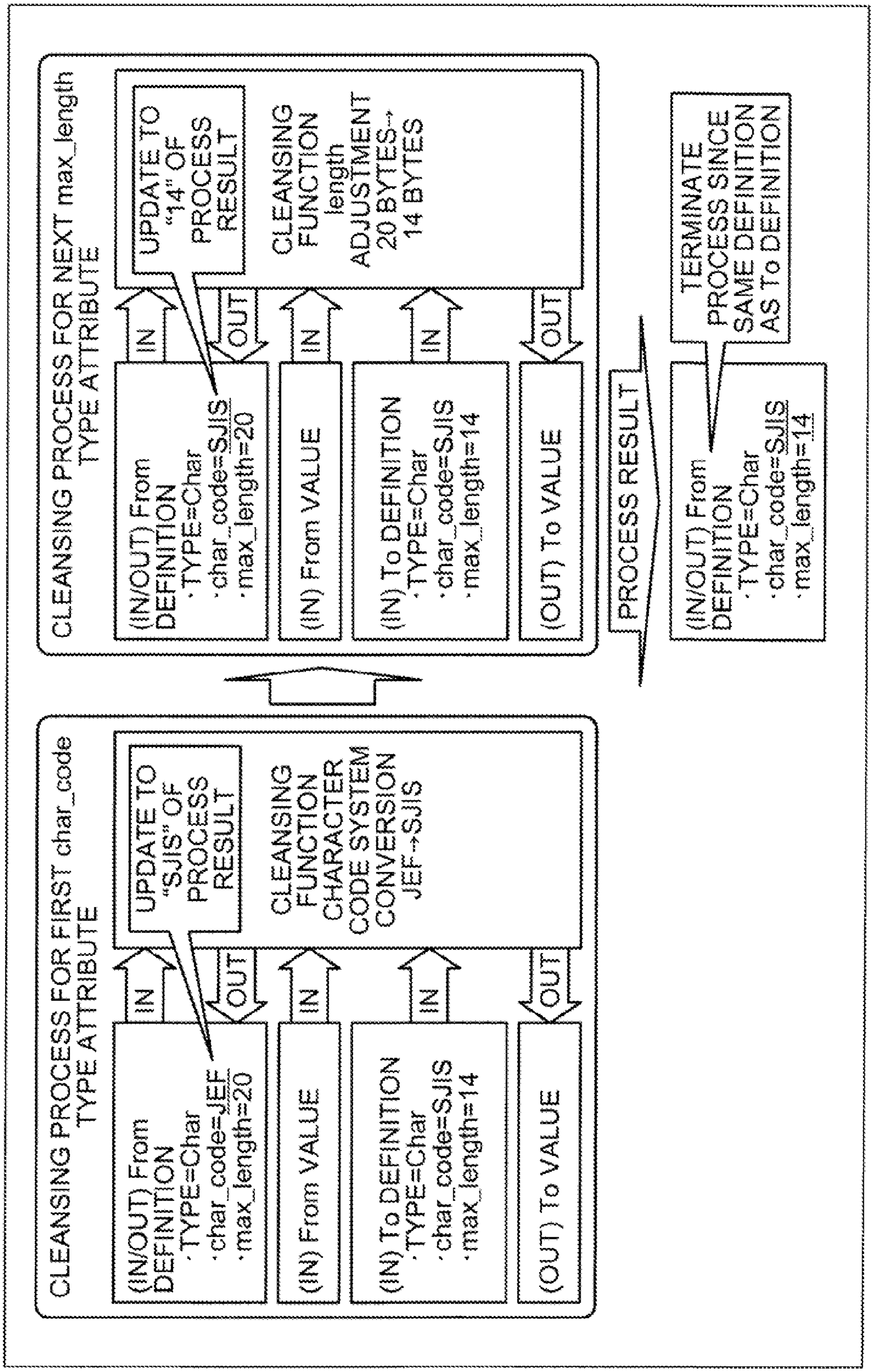

FIG. 20 is another explanatory diagram of an exemplary cleansing function. FIG. 20 depicts an example of executing the character code system converting process depicted in FIG. 18 and the length adjusting function depicted in FIG. 19 by using a mode with specification expanded so as to enable more efficient cleansing control for the mapping definition of (1) defined in the meta-definition file 304 depicted in FIG. 8. On the left side of FIG. 20, the cleansing process for the char_code type attribute is executed. The data type: character string type (Char), the type attribute: character code system (char_code) and the type attribute value: JEF, and the type attribute: maximum character string length (max_length) and the type attribute value: 20 are given to the cleansing function: character code system conversion as the From definition. Similarly, the data type: character string type (Char), the type attribute: character code system (char_code) and the type attribute value: SJIS, and the type attribute: maximum character string length (max_length) and the type attribute value: 14 are given as the To definition.

If the From value conforming to the From definition is given to the cleansing function in this state, the character code system of the From value is converted from JEF to SJIS. The cleansing function copies the conversion result to the To value and updates the type attribute value: JEF of the From definition to the process result, i.e., SJIS of the To definition.

On the right side of FIG. 20, the cleansing process for the max_length type attribute is executed as the process of the next stage. The From definition updated in the process of the preceding stage (the left side of FIG. 20) is directly given as the From definition to the cleansing function: length adjusting function. Similarly, the data type: character string type (Char), the type attribute: character code system (char_code) and the type attribute value: SJIS, and the type attribute: maximum character string length (max_length) and the type attribute value: 14 are given as the To definition.

If the From value conforming to the From definition is given to the cleansing function in this state, the maximum character string length of the From value is adjusted from 20 bytes to 14 bytes. The cleansing function copies the conversion result to the To value and updates the type attribute value: 20 (bytes) of the From definition to the process result, i.e., 14 (bytes) of the To definition. Since this causes the From definition to have the same contents as the To definition, the process is terminated.

By reflecting the state of the process result on the From definition, the From definition may directly be input to the next cleansing process (the process on the next stage) that processes the same value to deliver the state of the value to be input and, therefore, the overall process efficiency is increased and the process on the next stage becomes more accurate since the From definition accurately reflects the state of the From value. Although the To definition may directly be delivered to the next stage, the To value of the preceding stage must be delivered as the From value of the next stage.

The execution order of the cleansing function will be described. In this embodiment, the execution order of the cleansing function is set to a defined order such that the function is executed in the order from more important type attributes. Specifically, if the cleansing function corresponding to multiple type attributes is executed for one value, the function is executed in the order from the type attributes defined previously. As a result, since the cleansing is executed in the order from a more important type attribute, the occurrence of useless processes may be prevented and the cleansing process may be simplified.

Figure 21:
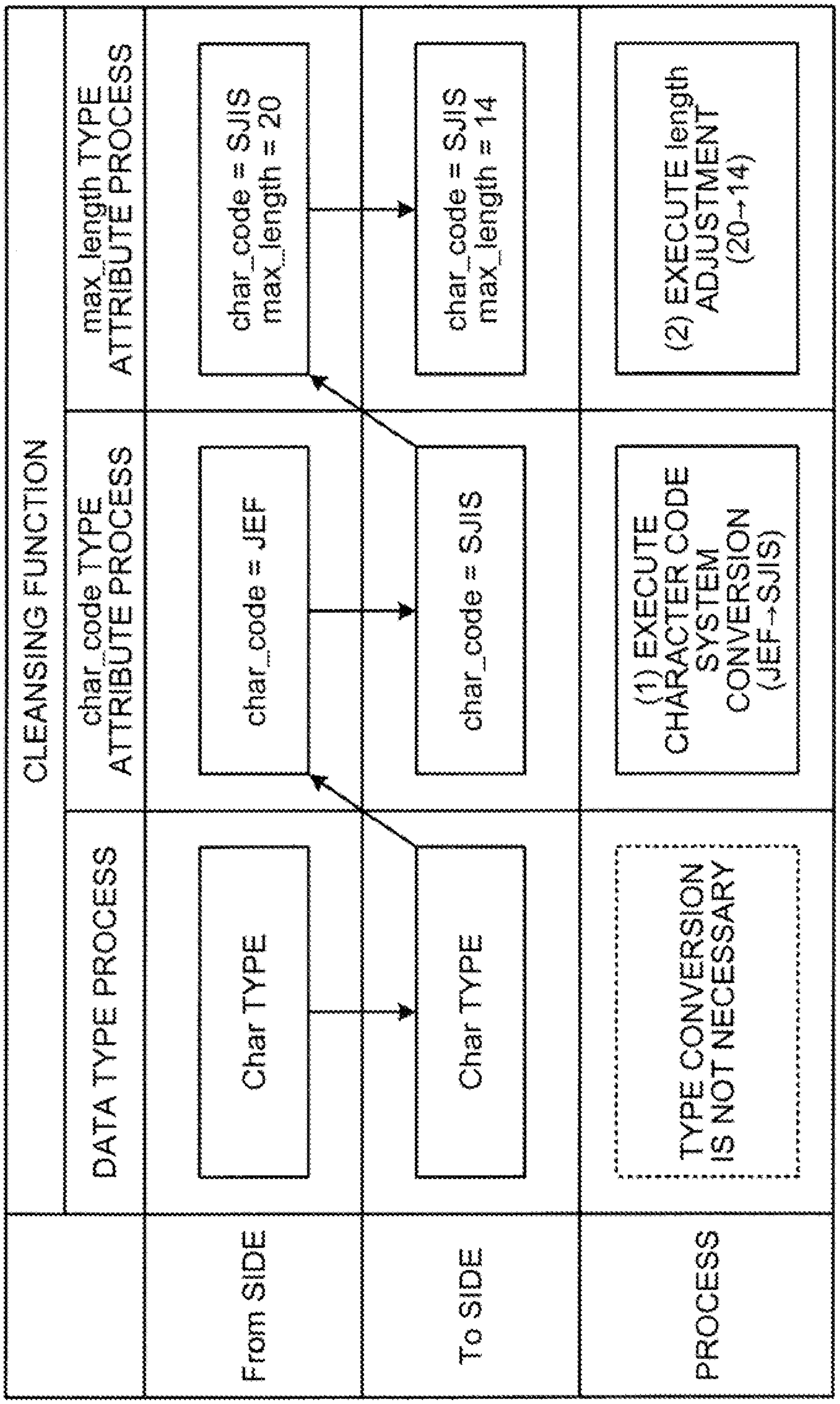
FIG. 21 is a chart of the execution order of the cleansing function.

FIG. 21 is a chart of the execution order of the cleansing function. FIG. 21 depicts the execution order in an example of cleansing of a FULL_NAME that is the mapping definition (2) of the meta-definition file 304 depicted in FIG. 8 based on the cleansing specification definition file 301 depicted in FIG. 6. In the cleansing of the FULL_NAME of FIG. 8, the char_code type attribute is defined before the max_length type attribute in the cleansing specification definition file 301 of FIG. 6.

In the process of the data type, the type conversion is not necessary since both the From side and the To side are the character string type (Char type). Since the data type conversion is performed before the cleansing process, the data types are the same in the cleansing process.

In the process of the type attribute: character code system (char_code), the character code system of the meta-defined FULL_NAME is subjected to the character code system conversion from the type attribute value: JEF of the From side into the type attribute value: SJIS of the To side. The length adjustment is performed by setting the maximum character string length from 20 to 14 for the FULL_NAME having the type attribute value SJIS after the process of the character code system (char_code). As described, the type attributes of important (basic) property are defined and executed earlier.

Therefore, the process may be executed on the basis that the type attributes that are more important (higher) than the type attribute of interest are identical. It is not necessary to give consideration to the type attribute lower than the type attribute of interest. The order of the process is maintained constant and the process is simplified.

An exemplary implementation of the cleansing function corresponding to multiple type attributes will be described. By implementing the cleansing function capable of supporting multiple type attributes, a combination of the type attributes and the cleansing function becomes flexible. Therefore, a more advanced cleansing function may be realized and the number of times of execution of the cleansing process may be reduced, contributing to performance improvement.

FIG. 22 is a diagram of an example of the cleansing specification definition file 301 that defines the cleansing function corresponding to multiple type attributes. In FIG. 22, a cleansing function "character code system conversion" is defined with two type attributes of a character code system (char_code) and an external character code system (char_excode), which forms the cleansing function corresponding to the both type attributes. The external character code system is a system that specifies external character systems when multiple external character systems (external character code 1, external character code 2) are handled, and is a type attribute added as the expansion specification of the character code system.

Figure 23:
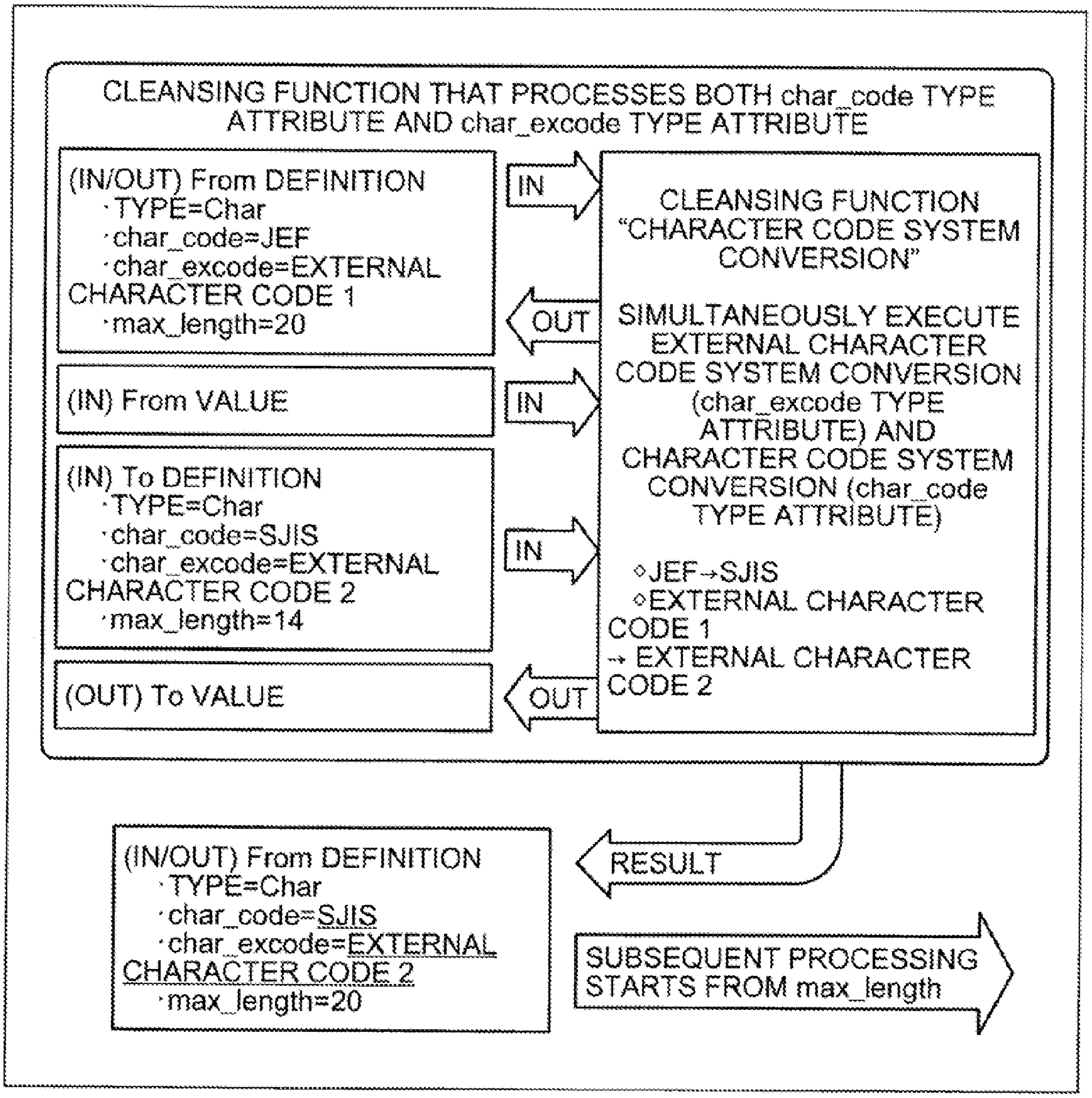
FIG. 23 is a diagram of a cleansing function that executes both processes for the character code system (char_code) and the external character code system (char_excode) defined in FIG. 22.

FIG. 23 is a diagram of the cleansing function that executes both processes for the character code system (char_code) and the external character code system (char_excode) defined in FIG. 22. In FIG. 23, the cleansing function executes the character code system conversion. In the character code system conversion, the cleansing process for the char_excode type attribute is executed along with the cleansing process for the char_code type attribute.

Specifically, the data type: character string type (Char), the type attribute: character code system (char_code) and the type attribute value: JEF, and the external character code system (char_excode) and the type attribute value: external character code 1, and the type attribute: maximum character string length (max_length) and the type attribute value: 20 are given as the From definition. Similarly, the data type: character string type (Char), the type attribute: character code system (char_code) and the type attribute value: SJIS, and the external character code system (char_excode) and the type attribute value: external character code 2, and the type attribute: maximum character string length (max_length) and the type attribute value: 14 are given as the To definition.

If the From value conforming to the From definition is given to the cleansing function: character code system conversion in this state, the cleansing function: character code system conversion converts the character code system of the From value from JEF to SJIS. The cleansing function: character code system conversion also converts the external code system of the From value from external character code 1 to external character code 2.

By executing the conversions corresponding to different type attributes, i.e., the character code system conversion and the external character code system conversion in one type attribute conversion with one cleansing function as above, the number of times of execution may be reduced (from two times to one time in this example). In this case, the length adjustment is executed as the cleansing function in the process of the next stage.

The higher-speed processing in the cleansing processing unit 312 will be described. In this description, the data converting process will be described with reference to the cleansing specification definition file 301 of FIG. 25 and the meta-definition file 304 of FIG. 24.

FIG. 24 is a diagram of an example of the meta-definition file 304. In the higher-speed processing, the meta-definition file 304 is optimized before the start of the integration process (at the time of initialization) to a state that enables a higher-speed process and deployed on the RAM 203 or the ROM 202 as the encoded meta-definition information 340 as described later in FIG. 44.

FIG. 25 is a diagram of an example of the cleansing specification definition file 301. The data types defined in FIG. 25 are described in the order of definition of the Char type (character string type), the personal name type, an address type, and the integer type (integer type). The cleansing specification definition file 301 is put into the optimized state by assigning type IDs unique in the entire data converting apparatus 300 before the initialization of the meta-definition file 304 and is deployed on the RAM 203 or the ROM 202 as the conversion rule set 330 as described later in FIGS. 26 to 46.

FIG. 26 is a diagram of the data type code table 321. In the data type code table 321, the type IDs are those transforming the data types into IDs and are consecutive integers starting from one in the order of definition of the data types defined in the cleansing specification definition file 301.

Similarly, the type attributes defined in the cleansing specification definition file 301 are transformed into IDs by assigning type attribute IDs that are unique in their respective data types and that are the same for the inherited type attributes between the data types in the inheritance relationship. Although the type attribute code table 322 of the Char type is included in the data types of the Supertype in this description, the table may be configured as the independent type attribute code table 322.

FIGS. 27 to 29 are explanatory diagrams of the type attribute code tables 322. FIG. 27 is the type attribute code table 322 of the Char (character string type) and the personal name type; FIG. 28 is the type attribute code table 322 of the Char (character string type) and the address type; and FIG. 29 is the type attribute code table 322 of the Integer (integer type).

In the type attribute code tables 322 depicted in FIGS. 27 to 29, the type IDs are consecutive integers for the data types starting from one in the order of definition of the data types described in the cleansing specification definition file 301. To the type attributes of the data type having the inheritance relationship, the IDs are assigned in sequence from the type attribute of the data type having the oldest ancestor. Therefore, the type attribute IDs having a common ancestor are matched.

For example, since the personal name type inherits the Char type in FIG. 27, the type attribute IDs: 1 to 3 of the Char type, i.e., the ancestor of the personal name type are matched. Similarly, since the address type inherits the Char type in FIG. 28, the type attribute IDs: 1 to 3 of the Char type, i.e., the ancestor of the address type are matched.

Similarly, the type attribute values defined in the cleansing specification definition file 301 are assigned with the type attribute value IDs unique in respective type attributes.

FIGS. 30 to 35 are explanatory diagrams of the type attribute value code tables 323. FIG. 30 is the type attribute value code table 323 with the type attribute IDs assigned to the type attribute values of the char_code type attribute. FIG. 31 is the type attribute value code table 323 with the type attribute IDs assigned to the type attribute values of the char_excode type attribute. FIG. 32 is the type attribute value code table 323 with the type attribute IDs assigned to the type attribute values of the name_space type attribute. FIG. 33 is the type attribute value code table 323 with the type attribute IDs assigned to the type attribute values of the chow_banchi type attribute.

In the type attribute value code tables 323 depicted in FIGS. 30 to 33, the type attribute value IDs are assigned to the type attributes and are consecutive integers starting from zero in the order of definition of the type attributes. An undefined type attribute value is assigned with "−1" as the type attribute value. In FIGS. 30 to 33, a type attribute value having "*" is a type attribute value under the declaration of default (default value).

FIG. 34 depicts the type attribute value code table 323 of the max_length type attribute. FIG. 35 depicts the type attribute value code table 323 of the max_digit type attribute. As depicted in FIGS. 34 and 35, in the case of the type attribute having no type attribute value defined in the cleansing specification definition file 301 and having an arbitrary type attribute value, the type attribute value defined in the meta-definition file 304 is directly used as the type attribute value ID.

A data type conversion rule will be described. A data type conversion rule is a conversion rule table that determines the execution patterns of the function of converting data to be converted from the data type of the From side (the conversion source 101) to the data type of the To side (the conversion destination 102).

FIG. 36 is a diagram of the data type conversion rule table 331. In FIG. 36, the data type conversion rule table 331 is configured with the data type IDs arranged at From/To to determine the converting function to be executed according to the combinations thereof. Specifically, a link to a type converting function existing in the type converting function library 302 (a calling pointer to a type converting function) is set as a value of the data type conversion rule table at a position of the combination of the corresponding data type IDs.

A copy function of simply duplicating a value is set for the combination of From/To without the need for conversion (described as "Copy" in the corresponding columns of FIG. 36). For the inherited data type converting function, the function defined in the data type of the most recent ancestor is employed. "0" at From/To is used as the meaning of "data type ID undefined", and a combination of the same data type IDs at From/To is not used and is left blank.

Similarly, for the type attribute values, a conversion rule is defined for each type attribute as a cleansing rule. The cleansing rule is a conversion rule table that determines the execution patterns of the function of converting data to be converted from the type attribute of the From side (the conversion source 101) to the type attribute of the To side (the conversion destination 102).

FIGS. 37 to 42 are explanatory diagrams of cleansing rule tables 332. The cleansing rule table 332 of FIG. 37 is a cleansing rule for the char_code type attribute. The cleansing rule table 332 of FIG. 38 is a cleansing rule for the char_excode type attribute. The cleansing rule table 332 of FIG. 39 is a cleansing rule for the name_space type attribute.

The cleansing rule table 332 of FIG. 40 is a cleansing rule for the chow_banchi type attribute. The cleansing rule table 332 of FIG. 41 is a cleansing rule for the max_length type attribute. The cleansing rule table 332 of FIG. 42 is a cleansing rule for the max_digit type attribute.

In FIGS. 37 to 40, the cleansing rule table 332 is configured with the type attribute value IDs arranged at From/To to determine the cleansing function to be executed according to the combinations thereof. Specifically, a link to a cleansing function existing in the cleansing function library 303 (a calling pointer to a cleansing function) is set as a value of the cleansing rule table 332 at a position of the combination of the corresponding type attribute value IDs.

A copy function of simply duplicating a value is set for the combination of From/To without the need for conversion. A combination of the same type attribute value IDs at From/To is not used and is left blank. Different cleansing functions may be defined according to the combinations of From/To.

As depicted in FIGS. 41 and 42, a type attribute having an arbitrary value does not selectively use the cleansing functions and therefore has one cleansing function. Therefore, a link is set to the cleansing function corresponding to the coordinates 0:0 of From/To.

A process of organizing the data type conversion rule table 331 and the cleansing rule table 332 is then executed. Specifically, for example, the conversion rule set 330 is established that may directly be referenced from the data type IDs, the type attribute IDs, and the type attribute value IDs.

FIG. 45 is a diagram of the conversion rule set 330. The conversion rule set 330 is made up of a conversion rule table 4300 and conversion rule tables for data type 4301 to 4304. The conversion rule table 4300 is a table for referencing the data type conversion rule table corresponding to the relevant data type by referencing a data type ID as the sequence number.

Specifically, the sequence number [0] is left blank and the sequence number [1 and thereafter] is matched with the data type ID. The data types described in the conversion rule table 4300 are actually linked by assigning respective conversion rule tables for data type 4301 to 4304 (entering the calling pointers to the corresponding tables).

The conversion rule tables for data type 4301 to 4304 are generated for the respective data types and are tables for referring to the data type conversion rule table including the corresponding data type as the conversion source through the sequence number [0] and for referring to a type attribute ID as the sequence number to refer to the cleansing rule table corresponding to the relevant type attribute.

Specifically, the sequence number [0] of the conversion rule tables for data type is assigned with the data type conversion rule table 331 and the sequence number [1 and thereafter] is assigned with the cleansing rule table 332 corresponding to the matching type attribute ID.

For example, for the Char type of the data type ID: 1, the conversion rule table for the Char type 4301 is set at the sequence number [1] of the conversion rule 4300. In the conversion rule table for the Char type 4301, a pointer is set at the sequence number [0] to the data type conversion rule table 331 depicted in FIG. 36; a pointer is set at the sequence number [1] to the cleansing rule table 332 (FIG. 37) for the char_code type attribute having the type attribute ID: 1; a pointer is set at the sequence number [2] to the cleansing rule table 332 (FIG. 38) for the char_excode attribute having the type attribute ID: 2; and a pointer is set at the sequence number [3] to the cleansing rule table 332 (FIG. 34) for the max_length type attribute having the type attribute ID: 3.

A process of encoding the meta-definition file 304 to create the encoded meta-definition 340 will be described. In this description, the meta-definition file 304 depicted in FIG. 24 is taken as an example. The item definitions in the meta-definition file 304 are encoded by using the IDs (the data type IDs, the type attribute IDs, and the type attribute value IDs) assigned through the initialization of the cleansing specification definition file 301. In the meta-definition file 304 of FIG. 4, employee numbers, full names, addresses, and telephone numbers are defined in the TABLE_A (physical model) and the TABLE_B (logic model) as the item definitions. Therefore, each item definition is encoded for each table.

FIG. 44 is a diagram of the encoded meta-definition information 340 corresponding to FIG. 24. The encoded meta-definition information 340 is configured to simplify the reference to the conversion rule tables for data type by creating an item meta-definition table corresponding to the item definitions defined by <COLUMN> tags in the meta-definition file 304 and giving the same structure to the property of each item as the conversion rule tables for data type in the conversion rule set 330. Specifically, the sequence number [0] of the item meta-definition table is configured to be the data type ID and the sequence number [1 and thereafter] is configured to be the type attribute value ID when the sequence number is assumed to be the type attribute ID. An arrow between the item meta-definition tables represents the mapping definition defined by the <MAP_RULE> tag in the meta-definition file 304 and, if the data conversion is performed from the TABLE_A to the TABLE_B, the start end of the arrow indicates the From side (conversion source) and the terminal end indicates the To side (conversion destination).

In FIG. 44, (A) depicts the encoded meta-definition information 340 of the TABLE_A that is the data model on the From side and the TABLE_B that is the data model on the To side for EMPLOYEE_NUMBER. (B) in FIG. 44 depicts the encoded meta-definition information 340 of the TABLE_A that is the data model on the From side and the TABLE_B that is the data model on the To side for the FULL_NAME. (C) in FIG. 44 depicts the encoded meta-definition information 340 of the TABLE_A that is the data model on the From side and the TABLE_B that is the data model on the To side for the addresses. (D) in FIG. 44 depicts the encoded meta-definition information 340 of the TABLE_A that is the data model on the From side and the TABLE_B that is the data model on the To side for TELEPHONE_NUMBER.

For example, taking the FULL_NAME in the TABLE_A depicted in FIG. 44B as an example, the sequence number [0] is set for the data type ID: 2 of the personal name type (see FIG. 26) defined as the data type of the FULL_NAME item of the TABLE_A. The sequence number [1] is set for the type attribute value ID: 1 of the type attribute value: JEF (see FIG. 30) of the char_code type attribute (see FIG. 27) having the sequence number [1] as the type attribute ID for the type attribute defined for the FULL_NAME item of the TABLE_A. Similarly, the sequence number [2] is set for the type attribute value ID: 0 of the type attribute value: external character code 1 (see FIG. 31) of the char_excode type attribute (see FIG. 27) having the type attribute ID: 2. Similarly, the sequence number [3] is set for the type attribute value: 20 (see FIG. 41) of the max_length type attribute (see FIG. 27) having the type attribute ID: 3. Similarly, the sequence number [4] is set for the type attribute value ID: 0 of the type attribute value: Yes (see FIG. 32) of the name_space type attribute (see FIG. 27) having the type attribute ID: 4. As in the case of the max_length type attribute in the TELEPHONE_NUMBER item of the TABLE_A, if the type attribute value is not defined in the meta-definition file 304 and the default value is not defined in the cleansing specification definition file 301, "−1" is set.

As described, in the encoded meta-definition information 340, the data type ID of the item is set for the item number [0] of the item meta-definition table, and the type attribute value IDs having the item numbers as the type attribute ID are sequentially set from the item number [1]. This enables efficient checking of the conversion rule set 330 deployed based on the cleansing specification definition file 301. A data conversion example using the encoded meta-definition information 340 related to a FULL_NAME in the TABLE_A and the TABLE_B depicted in FIG. 44B will be described. It is assumed that "YAMADA KAZUO" is the data to be converted that is a value of the FULL_NAME in the TABLE_A.

FIGS. 45 to 49 are explanatory diagrams of a first data conversion example using the encoded meta-definition information 340 related to the FULL_NAME in the TABLE_A and the TABLE_B depicted in FIG. 44. Encoding consistent in the entire system is performed as described above in advance through the initializing process and the processes may be executed by using the codes (which means that the meanings are recognized in the processes). In the data converting process of the cleansing processing unit, the cleansing control unit 351 is given an item meta-definition table and a value related to the item to be converted depicted in FIG. 45 to start the converting process.

In the converting process, the data types are compared between the From side and the To side. The values of the sequence number [0] is compared between the encoded meta-definition information 340 of the From side and the encoded meta-definition information 340 of the To side. In this case, the both values are "2" indicative of the data type ID: 2 (personal name type) and recognized as the same data type.

Since the data types are the same, the type attributes are then compared between the From side and the To side. A comparison is made between the values of the sequence number [1], which is the type attribute at the head. Since the values are "1" (JEF) on the From side and "0" (SJIS) on the To side in FIG. 45, the converting process is specified according to the conversion rule set 330 of FIG. 43.

Specifically, the conversion rule table 4300 is referenced according to the sequence number [2] because of the data type ID: 2 (personal name type) to make a reference to the conversion rule table for personal name type 4302.

A reference is then made to the cleansing rule table for char_code 332 (FIG. 37) of the sequence number [1] currently compared in the conversion rule table for personal name type 4302. Since the type attribute value ID of the From side is "1" (JEF) and the type attribute value ID of the To side is "0" (SJIS), the IDs are used as the sequence numbers to make a reference to the cleansing rule table for char_code 332 of FIG. 37 to specify the calling pointer to the "character code system conversion". These processes may be processed at one time with a programming language (e.g., C language) to achieve high-speed operation as follows.

converting process=conversion rule [data type ID]->rule [type attribute ID]->cleansing rule [type attribute value ID of From side] [type attribute value ID of To side]

Figure 46:
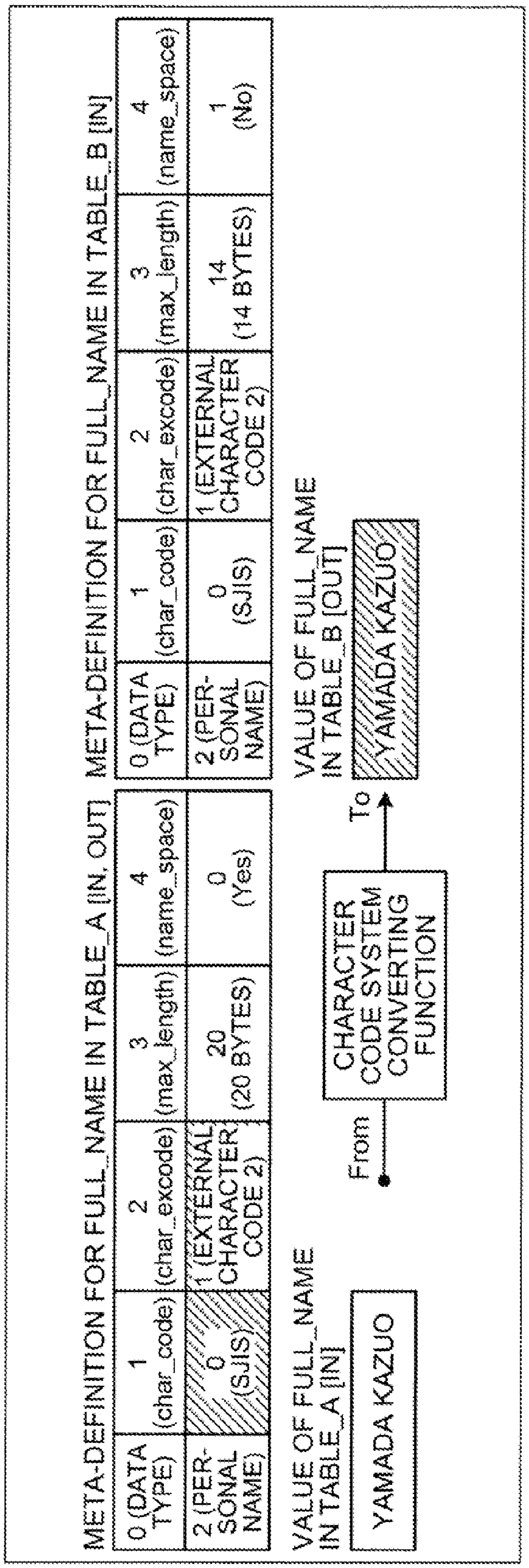

Since the "character code system conversion" is specified as the cleansing function as above, the "character code system conversion" described with reference to FIG. 23 is executed to convert the character code system (char_code) and the external character code system (char_excode) at the same time and the conversion result is set in the From definition and the To value. As a result, the values of the sequence numbers [1] and [2] of the encoded meta-definition information 340 related to the FULL_NAME in the TABLE_A are updated with "0" (SJIS) and "1" (external character code 2) as depicted in FIG. 46. The value of the FULL_NAME in the TABLE_B is correspondingly set to "YAMADA KAZUO" as a value using the external character code 2 in SJIS.

The type attribute value IDs set for the next sequence number [2] is similarly compared for the meta-definition of FIG. 46. Since the both type attribute value IDs are "1" (external character code 2), a shift is made to the next sequence number [3].

In comparison of the type attribute value IDs of the sequence number [3], the FULL_NAME in the TABLE_A has "20" and the FULL_NAME in the TABLE_B has "14". Since the values are different from each other, a converting process is specified.

Figure 47:
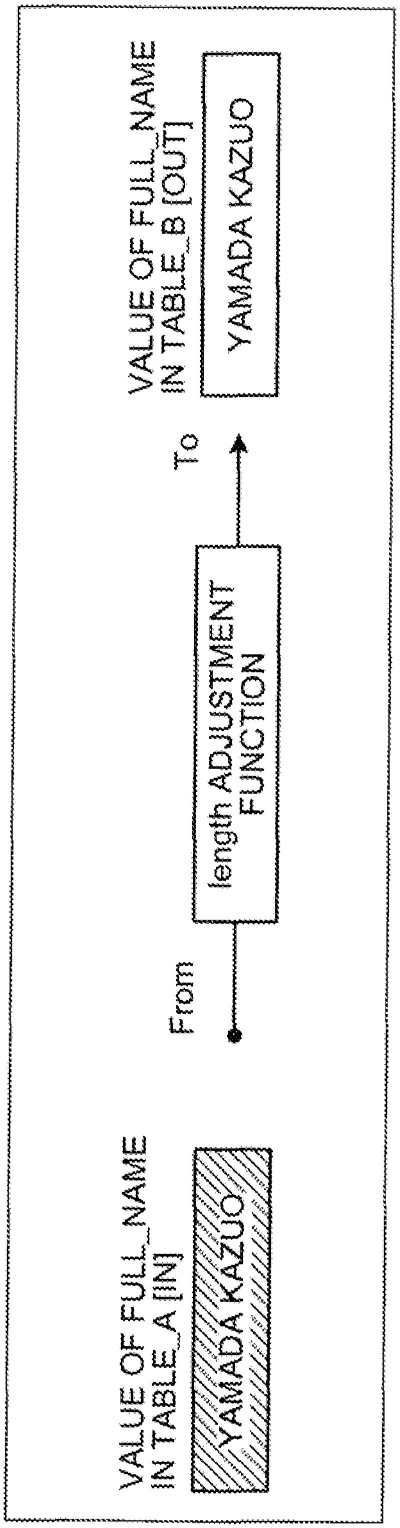
Figure 48:
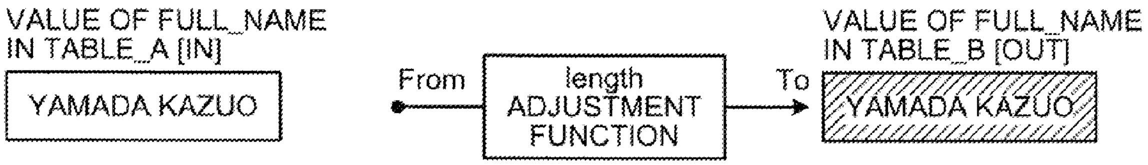
Figure 49:
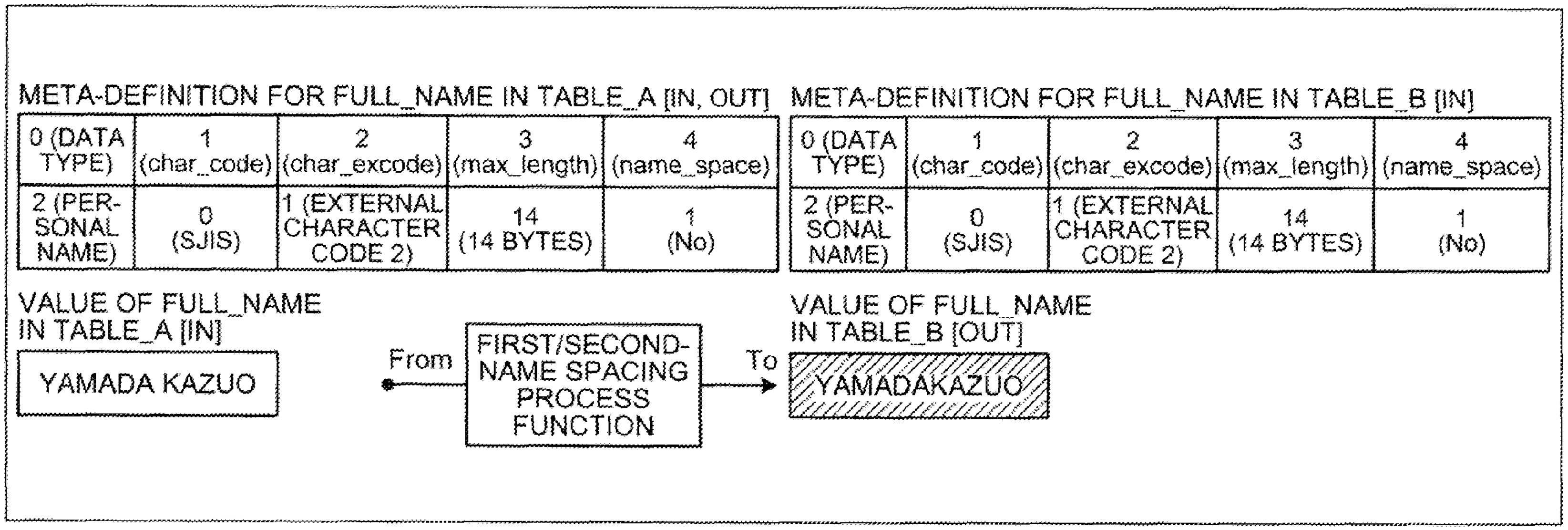

Specifically, the cleansing rule table is referenced for max_length 332 of the sequence number [3] in the conversion rule tables for personal name type 4302 currently compared. Since the cleansing rule table for max_length 332 (see FIG. 41) uses an arbitrary type attribute value, the "length adjustment" is specified as the cleansing function having "0" defined for both the From side and the To side. Therefore, the "length adjustment" is called. The To value of the previous process result is set as the From value to execute the "length adjustment". FIG. 47 depicts the execution of the "length adjustment" function and FIG. 48 depicts the result. Specifically, if the character string length of the From value exceeds 14 bytes, the length is adjusted to 14 bytes.

In FIG. 48, since the "length adjustment" is executed, the sequence number [3] of the From definition is updated with the type attribute value of the conversion result (value of the sequence number [3] of the To definition). Specifically, the value of the sequence number [3] of the meta-definition related to the FULL_NAME in the TABLE_A is updated from "20" to "14". Subsequently, the "first/second-name spacing process" is specified by performing the same operation for the next sequence number [4] and the value of the From definition is update with the type attribute value after the conversion (see FIG. 49).

As a result, the values of all the sequence numbers are matched in the encoded meta-definition related to the FULL_NAME in the TABLE_A that is the From definition and the encoded meta-definition related to the FULL_NAME in the TABLE_B that is the To definition. Since all are matched as above, the converting process is terminated. The high-speed data conversion may be implemented by repeatedly comparing the values of the From definition sequentially from the left to specify and execute the processes if the values are different.

The data converting process procedure of the data converting apparatus 300 according to the second embodiment will be described with reference to FIGS. 50 to 54.

Figure 50:
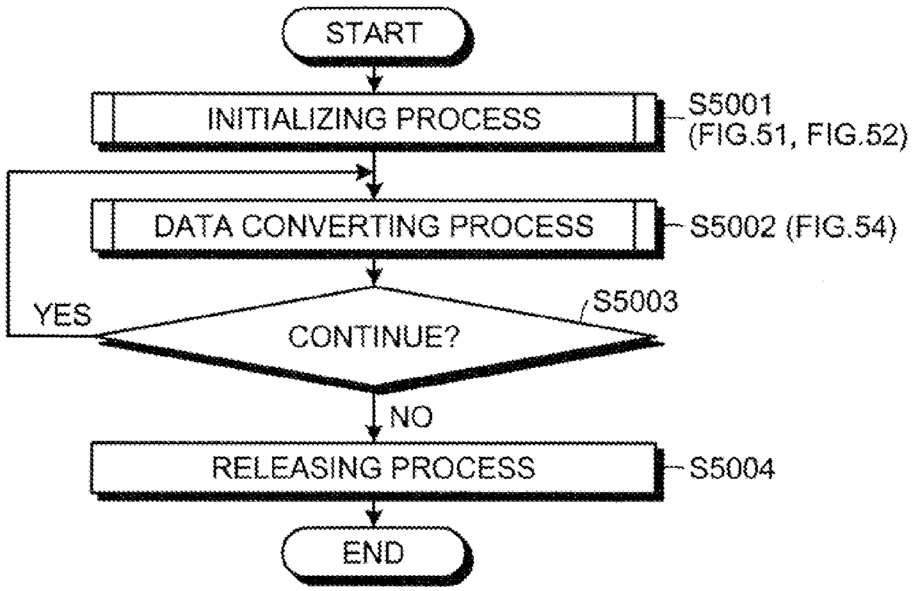
FIG. 50 is a flowchart of a data converting process procedure of the data converting apparatus 300 according to the first embodiment.

FIG. 50 is a flowchart of the data converting process procedure of the data converting apparatus 300 according to the first embodiment. First, the initializing unit 311 executes the initializing process (step S5001). Details of the initializing process (step S5001) will be described with reference to FIGS. 51 and 52.

The cleansing processing unit 312 executes the data converting process (step S5002). Details of the data converting process (step S5002) will be described with reference to FIG. 54. It is then determined whether the data conversion is to be continued (step S5003). The criterion may be operational input from a user or the presence of data to be converted.

If continued (step S5003: YES), the procedure proceeds to step S5002 to execute the data converting process. On the other hand, if not continued (step S5003: NO), a release process is executed (step S5004). In the release process, a resource on the memory obtained at the initializing process (step S5001) is released. This leads to termination of the data converting process.

Figure 51:
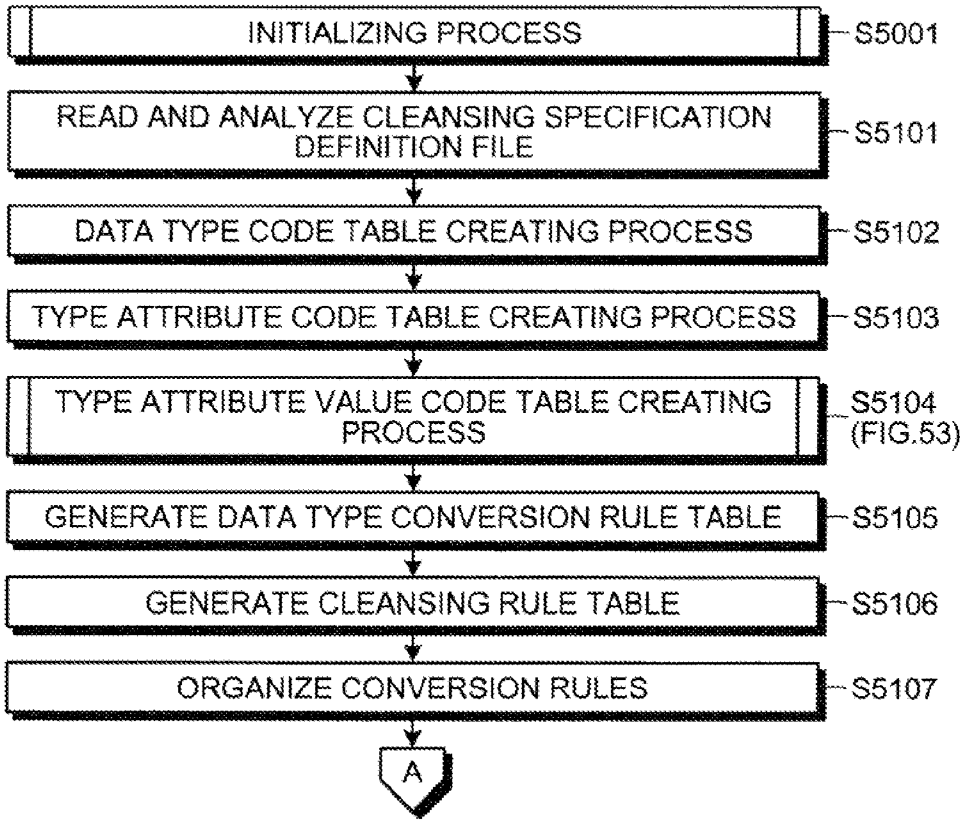
FIG. 51 is a flowchart of a process procedure (first half) of an initializing process (step S5001) executed by an initializing unit 311 depicted in FIG. 50.

FIG. 51 is a flowchart of a process procedure (first half) of the initializing process (step S5001) executed by the initializing unit 311 depicted in FIG. 50. As depicted in FIG. 51, the cleansing specification definition file 301 is read and analyzed (step S5101). A data type code table creating process is then executed (step S5102). Specifically, data type IDs are added to the data types. For example, as depicted in FIG. 26, entirely unique integers starting from one are added as the data type IDs consecutively without a skip in the order of definition.

A type attribute code table creating process is executed (step S5103). Specifically, type attribute IDs are added to the type attributes. For example, as depicted in FIGS. 27 to 29, integers unique within a data type starting from one consecutively without a skip in the order of definition are added as the type attribute IDs to all the type attributes in the order from the data type of the ancestor. Between the data types having the inheritance relationship, the type attribute IDs of common type attributes are controlled to be consistent in the entire system.

A type attribute value code table creating process is executed (step S5104). Specifically, as depicted in FIGS. 30 to 35, type attribute value IDs are added to the type attribute values. The details of the type attribute value code table creating process (step S5104) are described with reference to FIG. 53.

Figure 43:
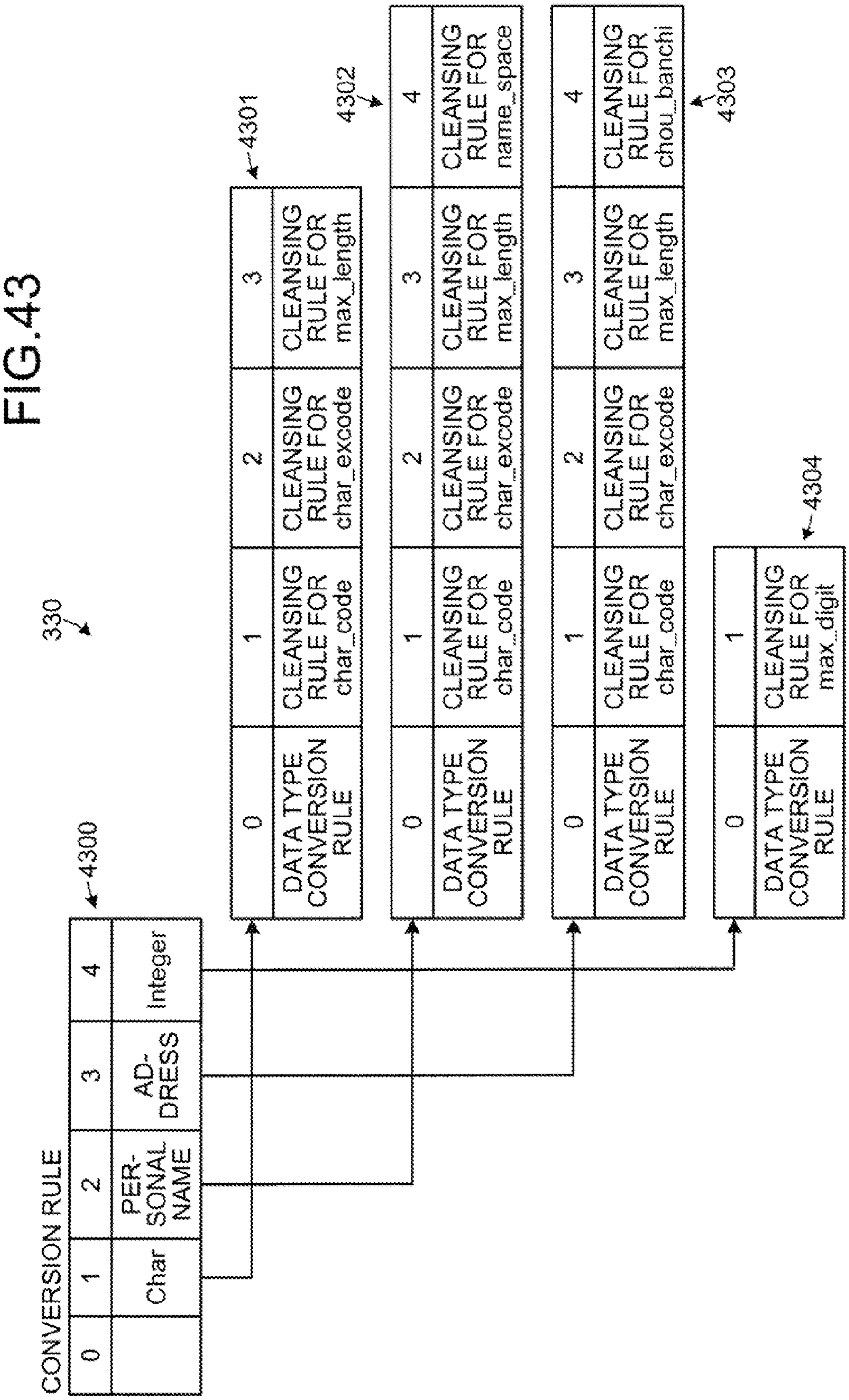
FIG. 43 is a diagram of a conversion rule set 330.

After the type attribute value code table creating process (step S5104), as depicted in FIG. 36, the data type conversion rule table 331 is generated (step S5105). As depicted in FIGS. 37 to 42, the cleansing rule table 332 is generated (step S5106). Subsequently, as depicted in FIG. 43, the conversion rule table 331 and the cleansing rule table 332 are combined as a conversion rule set 330 and the procedure proceeds to step S5201 of FIG. 52.

Figure 52:
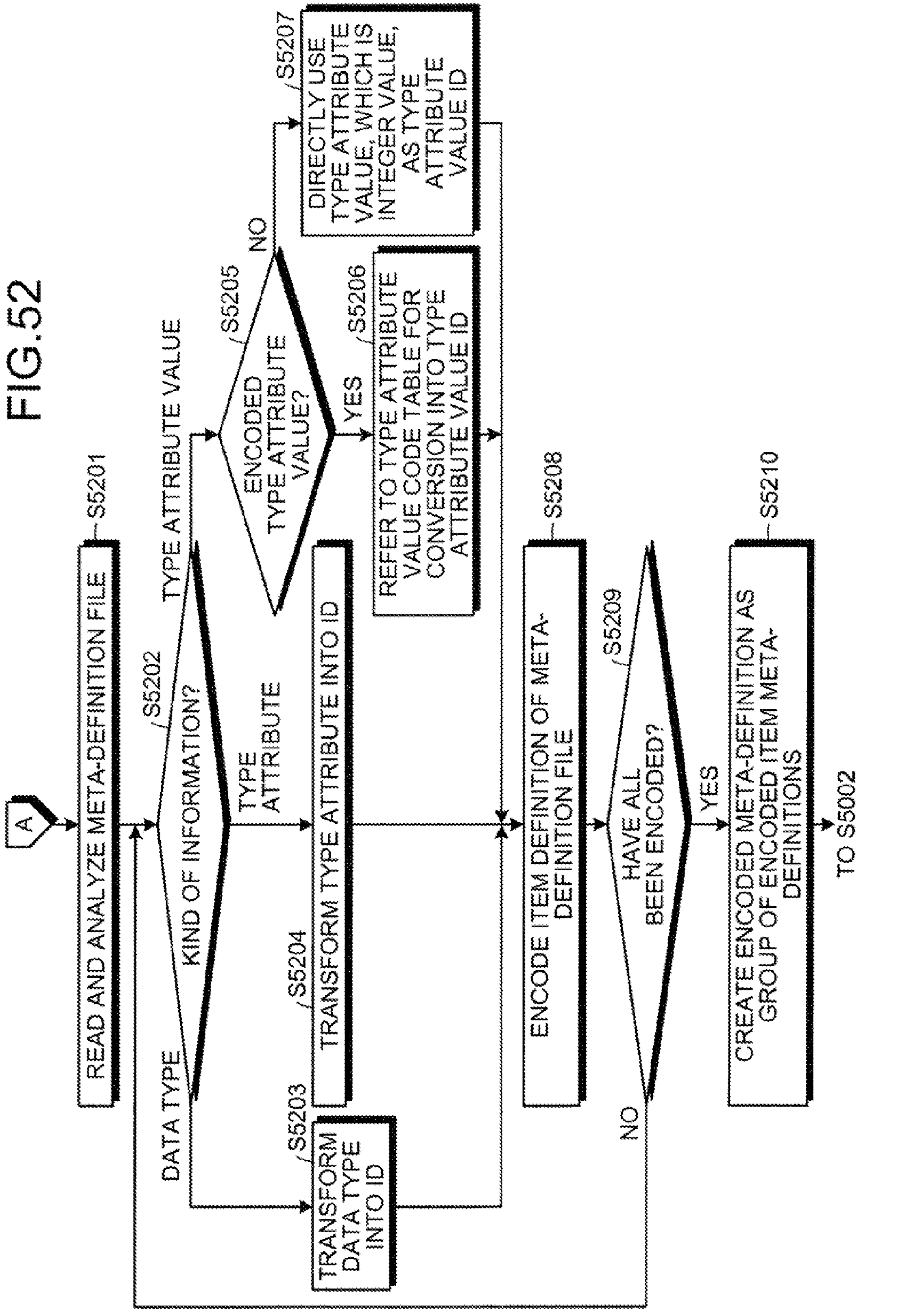
FIG. 52 is a flowchart of a process procedure (second half) of the initializing process (step S5001).

FIG. 52 is a flowchart of a process procedure (second half) of the initializing process (step S5001) executed by the initializing unit 311 depicted in FIG. 50. After the cleansing rule set 330 is built, in FIG. 52, the meta-definition file 304 is then read and analyzed (step S5201). The types of analyzed information are sequentially determined (step S5202). Specifically, it is determined whether the information is a data type, a type attribute, or a type attribute value. The determination is made according to the order of description in the meta-definition file 304.

In the case of the data type (step S5202: DATA TYPE), the data type is transformed into ID (step S5203). Specifically, the data type code table 321 (FIG. 26) is referenced for the transformation into the data type ID. The procedure proceeds to step S5208.

If the type of the information is a type attribute (step S5202: TYPE ATTRIBUTE), the type attribute is transformed into ID (step S5204). Specifically, the type attribute code table 322 (FIGS. 27 to 29) is referenced for the transformation into the type attribute ID. The procedure proceeds to step S5208.

If the type of the information is a type attribute value (step S5202: TYPE ATTRIBUTE VALUE), it is determined whether the type attribute value is encoded (step S5205). If the type attribute value is encoded (step S5205: YES), the type attribute value code table 323 (FIGS. 30 to 35) is referenced for the transformation into the type attribute value ID (step S5206). The procedure proceeds to step S5208.

If the type attribute value is not encoded (step S5205: NO), an integer value of the type attribute value is directly defined as the type attribute value ID (step S5207). The procedure proceeds to step S5208.

At step S5208, as depicted in FIG. 44, the item definition of data models in the meta-definition file 304 is encoded to create the item meta-definition table (step S5208). Specifically, the sequence number [0] is set for the data type ID and the sequence numbers [1], [2], [3], . . . are set for the type attribute value IDs or the type attribute values (if not encoded) of the type attribute having the type attribute IDs identical to the sequence numbers. For example, if the item meta-identification table having the data model related to the employee item of the TABLE_A is created, the sequence number [0] is set for the data type ID: 4 (see FIG. 26) indicative of the integer type that is the data type of the EMPLOYEE_NUMBER item and the sequence number [1] is set for the type attribute value: 12 (see FIG. 35) of the max_digit type attribute (see FIG. 29) that is the type attribute ID: 1 of the integer type as depicted in FIG. 44. Since the type attribute value of the max_digit type attribute is a type attribute value not encoded, the type attribute value: 12 specified in the meta-definition file 304 is directly used for the setting.

It is then determined whether all the data models in the meta-definition file 304 have been encoded (step S5209). If not all the data models are encoded (step S5209: NO), the procedure returns to step S5202 to encode the remaining data models. On the other hand, if all the data models are encoded (step S5209: YES), the encoded meta-definition information 340 is configured as a group of encoded item meta-definition as depicted in FIG. 44 (step S5210). Subsequently, a shift is made to the data converting process (step S5002).

Figure 53:
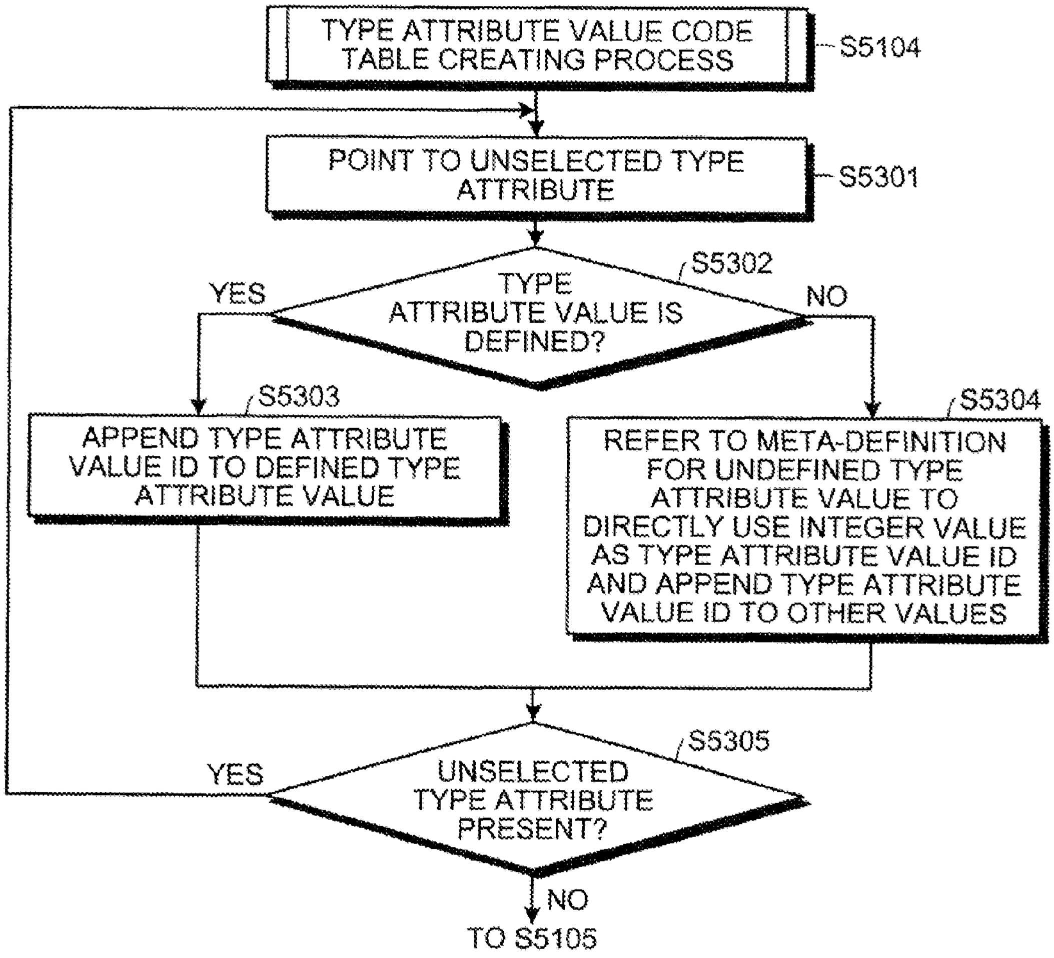
FIG. 53 is a flowchart of a process procedure of a type attribute value code table creating process (step S5104) depicted in FIG. 51.

FIG. 53 is a flowchart of a process procedure of the type attribute value code table creating process (step S5104) depicted in FIG. 51. An unselected type attribute is pointed to in the cleansing specification definition file 301 (step S5301).

It is determined whether a type attribute value is defined for the pointed type attribute (step S5302). If the type attribute value is defined (step S5302: YES), type attribute value IDs are added to all the type attribute values defined as the type attribute values of the pointed type attribute (step S5303). Specifically, integers unique within the type attribute are added as the type attribute value IDs starting from zero consecutively without a skip in the order of definition for each type attribute. The procedure proceeds to step S5305.

On the other hand, if no type attribute value is defined (step S5302: NO), the meta-definition file 304 for the undefined type attribute value is referenced and if all the type attribute values are integer values usable directly as the type attribute values for the relevant type attribute, the type attribute values defined in the meta-definition file 304 are directly used as the type attribute value IDs. If other values exist, integers unique within the type attribute are added as the type attribute value IDs starting from zero consecutively without a skip (step S5304). The procedure proceeds to step S5305.

At step S5305, it is determined whether an unselected type attribute is present (step S5305). If an unselected type attribute is present (step S5305: YES), the procedure returns to step S5301. On the other hand, if no unselected type attribute is present (step S5305: NO), the procedure proceeds to step S5105 of FIG. 51 to generate the data type conversion rule table 331.

Figure 54:
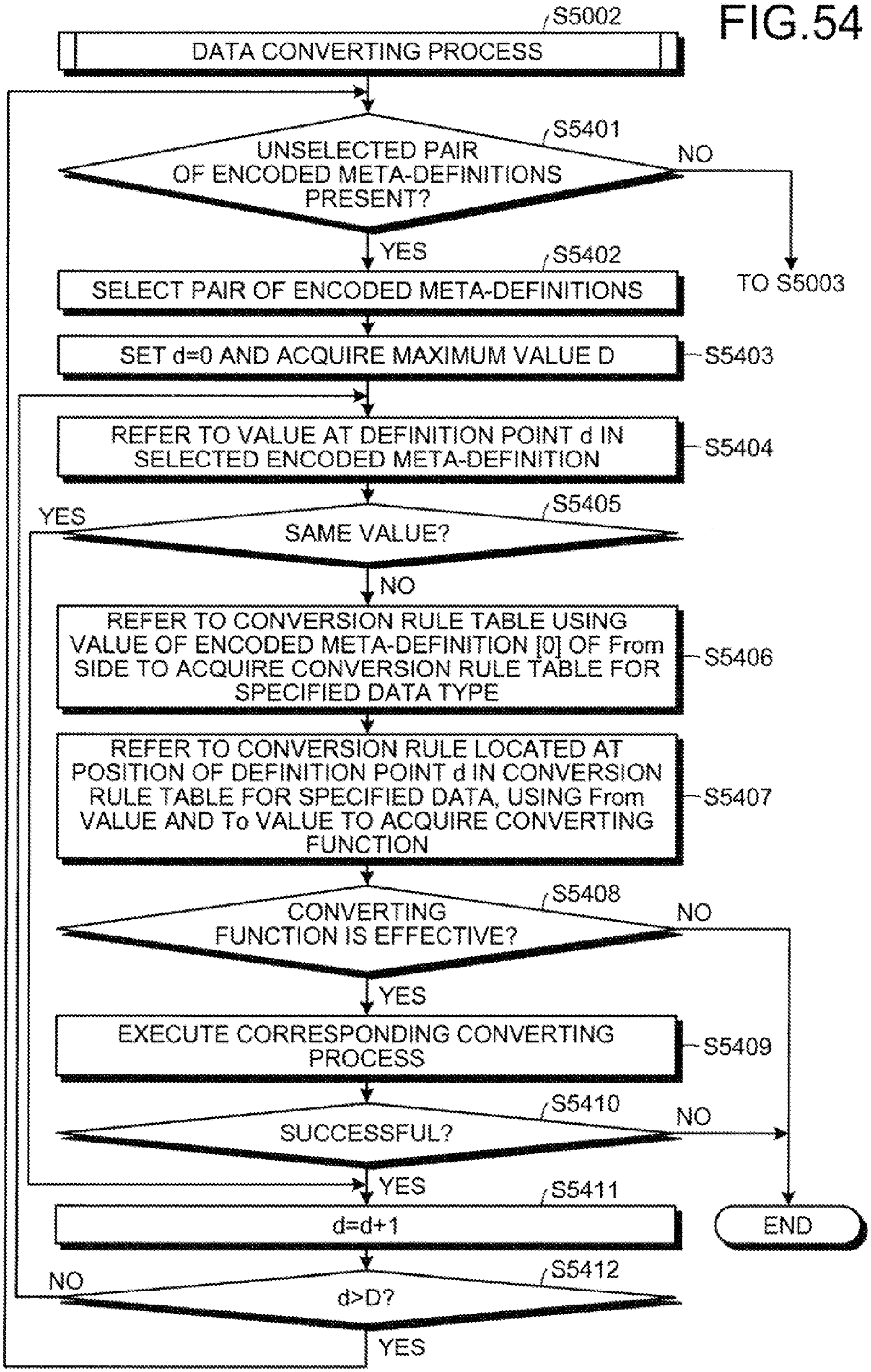
FIG. 54 is a flowchart of a process procedure of a data converting process (step S5002) depicted in FIG. 50.

FIG. 54 is a flowchart of a process procedure of the data converting process (step S5002) depicted in FIG. 50. It is determined whether an unselected pair of the encoded meta-definition information 340 is present (step S5401). If an unselected pair of the encoded meta-definition information 340 is present (step S5401: YES), the unselected pair of the encoded meta-definition information 340 is selected (step S5402).

A pair of the encoded meta-definition information 340 is a combination of the encoded meta-definition information 340 of the From side and the encoded meta-definition information 340 of the To side corresponding to the encoded meta-definition information 340. For example, in the example of FIG. 44, if it is assumed that the encoded meta-definition information 340 related to the FULL_NAME in the TABLE_A on the From side is the encoded meta-definition information 340 of the From side, the encoded meta-definition information 340 related to the FULL_NAME in the TABLE_B on the To side is the corresponding encoded meta-definition information 340 of the To side.

A definition point d is set to d=0, and the selected pair of the encoded meta-definition information 340 is referenced to acquire the maximum value D of the definition point d (step S5403). The definition point d is a variable for specifying a sequence number used when the selected encoded meta-definition information 340 is referenced. For example, in the case of d=0, the information (the data type ID in this case) is specified that is set for the sequence number [0] of the encoded meta-definition information 340 of the From side and the encoded meta-definition information 340 of the To side.

The maximum value D of the definition point d is the maximum value of the sequence number in the selected encoded meta-definition information 340. For example, in the case of the pair of the encoded meta-definition information 340 depicted in FIG. 44B, D=4 is set since the maximum value of the sequence number is "4".

Reference is made to the information having the definition point d set as the sequence number in the encoded meta-definition information 340 of the From side and the encoded meta-definition information 340 of the To side specified by the current definition point d (step S5404). It is determined whether the referenced information has the same values (step S5405). In the case of the same values (step S5405: YES), the procedure proceeds to step S5411.

On the other hand, if the referenced information does not have the same value (step S5405: NO), the sequence number [0] of the encoded meta-definition information 340 of the From side is referenced to acquire a data type ID and the conversion rule table 4300 is referenced by using the data type ID as a sequence number to acquire the conversion rule tables for data type 4301 to 4304 (step S5406). The acquired tables are referred to and stored as "conversion rule tables for specified data type". The procedure proceeds to step S5407.

For example, although the data type IDs set for the sequence number [0] are different (1 (Char) and 4 (Integer)) in the case of a pair of the encoded meta-definition information 340 depicted in (D) of FIG. 44, the data type ID: 1 (Char) is acquired which is set for the sequence number [0] of the encoded meta-definition information 340 related to TELEPHONE_NUMBER of the TABLE_A on the From side. This value (data type ID: 1) is used as the sequence number to reference the conversion rule table 4300 to acquire the conversion rule table for Char type 4301 and the conversion rule table for specified data type.

At step S5407, a necessary conversion rule (the type conversion rule table 331 and the cleansing rule table 332) is acquired by using the definition point d as the sequence number to make a reference to the conversion rule table for specified data type, and the converting function to be used is acquired by referring to From/To of the conversion rule according to the values of the encoded meta-definition information 340 of the From side and the To side acquired at step S5404 (step S5407).

Specifically, in the case of the encoded meta-definition information 340 depicted in FIG. 44D, the conversion rule table for the Char type 4301 is referenced according to the definition point d=0 to acquire the data type conversion rule table 331 (see FIG. 36), and a reference is made according to the data type ID: 1 (Char) as the From side and the data type ID: 4 as the To side to acquire the converting function "character-to-integer conversion". By giving the same structure to the data type conversion rule table 331 and the cleansing rule table as described, the acquisition of the converting function is realized without differentiation in the data converting process.

It is determined whether the acquired converting function is effective (step S5408). A criterion may be set in advance for determining whether effective or ineffective such as "operable when installed". If ineffective (step S5408: NO), the data converting process is a failure and therefore, the process is terminated. On the other hand, if effective (step S5408: YES), the converting process is executed by the acquired converting function (step S5409). Specifically, for example, the From value is converted and set as the To value. The processed definition contents are reflected on the From definition (see FIGS. 23 and 45 to 49).

It is then determined whether the converting process by the converting function is successful (step S5410). If not successful (step S5410: NO), the data converting process is a failure and therefore, the process is terminated. On the other hand, if successful (step S5410: YES), the procedure proceeds to step S5411.

At step S5411, the definition point d is incremented (step S5411). It is then determined whether d>D is satisfied (step S5412). If d>D is not satisfied (step S5412: NO), the procedure returns to step S5404 to process the next definition point d. On the other hand, if d>D is satisfied (step S5412: YES), since the process is to be completed for all the definition points, the procedure returns to step S5401. At step S5401, if an unselected pair of the encoded meta-definition information 340 does not exist (step S5401: NO), the data converting process (step S5002) is completed and a shift is made to step S5003 of FIG. 50.

According to the first embodiment, the data type, the data attribute, and the cleansing function may be expanded depending on purpose. Since the consistency is ensured when multiple data types, type attributes, and cleansing functions are used, consistency at the time of expansion is not impaired. Therefore, a reduction of the burden on developer is achieved.

The data types, the type attributes, the type attribute values, and the data type conversion functions, and the cleansing functions may be constrained to the requisite minimum to achieve a reduction in development costs and to facilitate management. By selectively using the cleansing functions in an efficient manner, the data conversion performance can be improved. By encoding the data types, the type attributes, and the type attribute values in the entire system, the data conversion performance may further be improved.

In the second embodiment, the following functions F1 to F7 are added to the first embodiment.

F1: A constraint (prerequisite) is set for an existing type attribute to enable the definition of a cleansing function operating within a range of the constraint.

F2: When a cleansing process is executed, a main process is executed after a converting process for keeping the constraint is executed in advance.

F3: A newly added function performs conversion of another type attribute by itself.

F4: The cleansing process for matching the type attribute is processed in a backward order (from more specialized type attributes).

F5: Expansion is performed such that all type attributes other than the subject may be handled as the constraint (prerequisite) of the cleansing process. Additionally, the converting process is repeatedly executed to process the type attributes in the order from the type attribute handled by the conversion executed last until coming full circle.

F6: The order of the process of the function F5 may not necessarily be from the rear side (more expansive type attributes) toward the front side (reverse order) and may be executed in normal order (sequentially processing more basic type attributes toward more expansive type attributes). Therefore, an efficient process direction may be selected.

F7: The functions F1 to F6 can be selected in a common processing system.

Combination patterns (hereinafter, "control pattern P#") of the functions F1 to F6 include the following control patterns P1 to P6.

P1: A constraint (prerequisite) is defined for the cleansing process to implement the process that keeps the prerequisite. However, the constraint condition is located before the subject (a more basic type attribute) (reverse order). This is implemented by a combination of the functions F1, F2, and F4.

P2: The cleansing function is given a conversion function for another type attribute. However, the type attribute to be converted is located before the subject (a more basic type attribute) (reverse order). This is implemented by a combination of the functions F3 and F4.

P3: A constraint (prerequisite) is defined for the cleansing process to implement the process that keeps the prerequisite. The type attribute used as the constraint condition may be any type attribute (reverse order). This is implemented by a combination of the functions F1, F2, and F5.

P4: The cleansing function is given a conversion function for another type attribute. The type attribute to be converted may be any type attribute (reverse order). This is implemented by a combination of the functions F3 and F5.

P5: A constraint (prerequisite) is defined for the cleansing process to implement the process that keeps the prerequisite. The type attribute used as the constraint condition may be any type attribute (forward order). This is implemented by a combination of the functions F1, F2, and F6.

P6: The cleansing function is given a conversion function for another type attribute. The type attribute to be converted may be any type attribute (forward order). This is implemented by a combination of the functions F3 and F6. Functions F1 to F7 are each described.

FIG. 55 is a diagram of an example of the cleansing specification definition file 301 having a constraint set by the function F1. The function F1 sets a constraint (prerequisite) for an existing type attribute operates within the range of thereof. The cleansing specification definition file 301 depicted in FIG. 55 is an example of adding the function F1 to the cleansing specification definition file 301 depicted in FIG. 25 with attention to the personal name type. This depicts an example of newly adding a data type definition description 5501 of a personal name to the cleansing specification definition file 301 already defined as the Char type.

In FIG. 55, in the data type definition description 5501 of a personal name, a first/second-name spacing process function is defined as a newly added cleansing function. In the first/second-name spacing process function (in the first embodiment) depicted in FIG. 49, the first/second-name spacing process is required to handle all the specifiable combinations of the type attributes (max_length, char_excode, and char_code) different from the type attribute (name_space) handled by the function itself as the From value (conversion source) and the To value (conversion destination). For example, a function is required that executes the first/second-name spacing process handling all the character code systems (SJIS, JEF, and UTF8) as the From value and the To value.

The function F1 is a function that declares an operable condition of the cleansing function for the type attributes (max_length, char_excode, and char_code) different from the type attribute (name_space) handled by the function itself. This function enables the operable condition of the first/second-name spacing process function to be specified and the first/second-name spacing process function may be simplified.

More specifically, for example, by setting a constraint of "rule="char_code=SJIS"" in the cleansing rule tag of the data type definition description 5501 of a personal name, the first/second-name spacing process function may simply be implemented to operate under the condition of the type attribute char_code=SJIS due to the constraint and may be simplified since it is not necessary to support other character codes and, additionally, the influence of addition of another function may effectively be minimized in such a case that UTF16 is added as a character code system.

Figure 56:
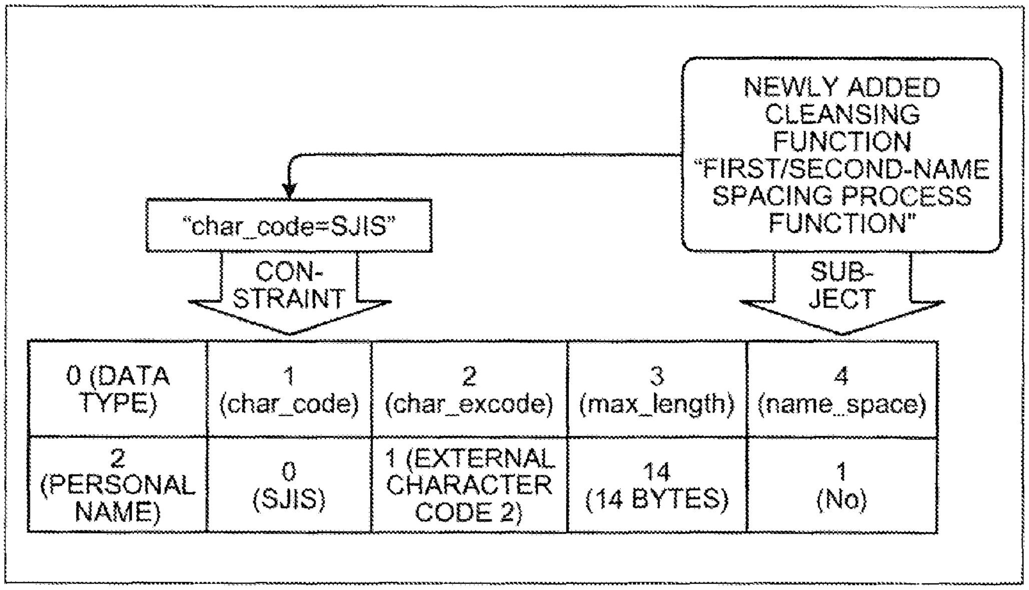
FIG. 56 is a diagram of an example of conversion by a function F2.

FIG. 56 is a diagram of an example of conversion by the function F2. In the function F2, when a cleansing process is executed, the cleansing processing unit executes a main cleansing process after a converting process for keeping the constraint specified by the function F1 is executed in advance. In FIG. 55, in the data type definition description of a personal name, the first/second-name spacing process function is defined as a newly added cleansing function and a constraint of "rule="char_code=SJIS"" is defined. In FIG. 56, by performing the character code system conversion for keeping the constraint of "char_code=SJIS" before the first/second-name spacing process is executed by the newly added first/second-name spacing process function, the first/second-name spacing process may be controlled such that the operation on the basis of the character code system "SJIS" is sufficient.

In the function F3, a newly added function has a function of performing necessary conversion of a type attribute other than the type attribute handled by the function and allows itself to change the type attribute. Since the definition of constraint of the function F1 and the function of the cleansing process for keeping the constraint of function F2 are not necessary in this case, the cleansing specification definition file 301 may be the same as the definition of the personal type. The function of converting another type attribute by the function F3 may be executed by the cleansing control unit on the request from the cleansing function to be added. When the function F3 is applied to the first/second-name spacing process, a function is provided that performs conversion for the type attribute char_code=SJIS by itself to change the type attribute value before the first/second-name spacing process.

The function F4 executes the cleansing process for matching the type attribute in the backward order (from more specialized type attributes). This is a function of executing the process in reverse order. In this case, the type attribute specifiable in the constraint in the function F1 or the type attribute changed by the function F3 is a type attribute located before the subject (more basic than the subject).

As a result, since a newly added type attribute (function) is executed in advance and the processed basic type attributes are changed at the same time, an existing function may be constrained from operating. The controlled return for preprocessing due to the constraint of the function F2 (forcible return to a changed portion for reprocessing) becomes unnecessary. Since a type attribute before the subject (more basic than the subject) is often used as a constraint as in the case of the constraint of the character code system in the first/second-name spacing process, the function F4 is useful.

The functions F5 to F7 are functions for handling all the type attribute as constraints. The function F4 limits the constraint (prerequisite) of the cleansing process to a (more basic) type attribute defined before the type attribute handled by the subject. Since this generally leads to higher process efficiency, the function F4 should be used for implementation in the case that this condition is sufficient. On the other hand, the function F5 may be used for implementation in the case that a (more expansive) type attribute defined after the type attribute handled by the subject must be used as a constraint condition.

Figure 57:
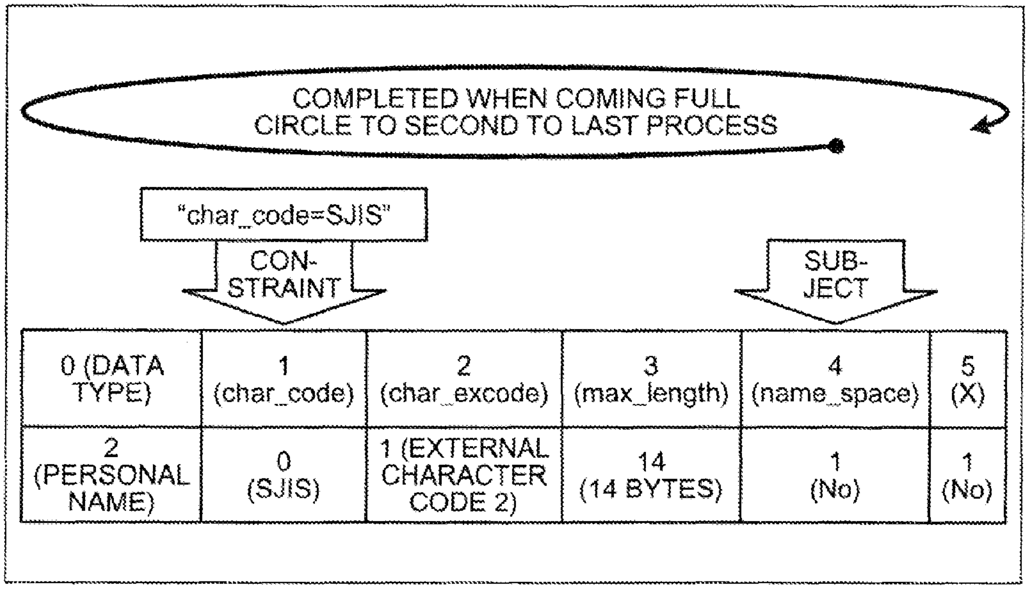
FIG. 57 is a diagram of an example of conversion by a function F5.

FIG. 57 is a diagram of an example of conversion by the function F5. In the function F5, expansion is performed such that all the type attributes other than the subject may be handled as the constraint (prerequisite) of the cleansing process. Additionally, the converting process is repeatedly executed to process the type attributes in the order from the type attribute handled by the conversion executed last until coming full circle.

Figure 58:
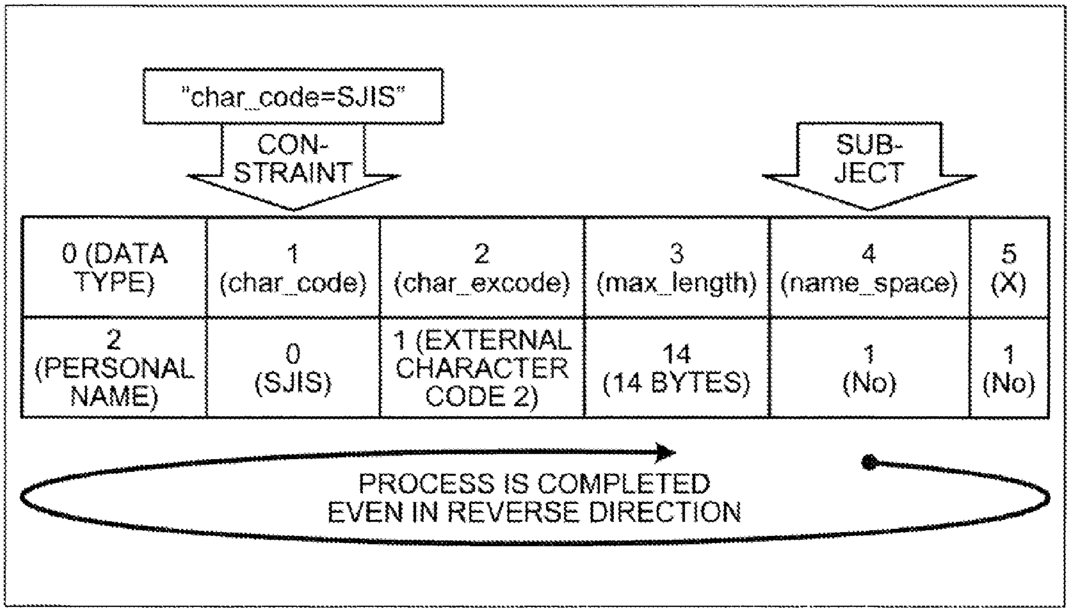
FIG. 58 is a diagram of an example of a function F6.

FIG. 58 is a diagram of an example of the function F6. The order of process of the Function F5 may not necessarily be from the rear side (more expansive type attributes) toward the front side (reverse order). Therefore, as in the function F6, the process is completed in normal order (sequentially processing more basic type attributes toward more expansive type attributes). Therefore, an efficient process direction may be selected.

One example of the second embodiment will hereinafter be described. The description will be made with an example of the first/second-name spacing process defined in the personal name data type definition description in the cleansing specification definition file 301 depicted in FIG. 55.

FIG. 59 is an exemplary diagram of an example of introduction of a constraint. In FIG. 59, a constraint of "char_code=SJIS" is declared in the first/second-name spacing process defined in the personal name data type definition description. As a result, the first/second-name spacing process is executed when the subject type attribute: name_space (type attribute ID=4) is different between the From side and the To side and is also executed on the basis that the type attribute value of the type attribute: char_code (type attribute ID=1) is SJIS (type attribute ID=0). Therefore, if additional implementation is desired, it is only necessary to declare a constraint in the cleansing rule and since it is not necessary to support the character code systems other than SJIS, the implementation of the cleansing function may considerably be simplified.

If a constraint is introduced, a constraint condition table is generated and deployed as a constraint such that the constraint condition may be referenced from the cleansing rule as well as the conversion rule at the time of initialization of the cleansing specification definition file 301 (FIG. 51). Specifically, an encoded constraint is set as a constraint condition table having a structure that may be reference together with the cleansing rule table 332 of the cleansing process with the constraint declared at the same location as a combination of From/To with the corresponding cleansing function set.

FIG. 60 is a diagram of an example of the constraint condition table. In the cleansing rule table 332 for the name_space type attribute handled by the first/second-name spacing process, the first/second-name spacing process function is called if From/To indicates (1,0) and (0,1). Therefore, for the constraint condition for the first/second-name spacing process, the constraint condition table for name_space 6000 depicted in FIG. 60 is created by similarly setting the encoded constraint condition "1 (char_code)=0 (SJIS)" at the positions having From/To of (1,0) and (0,1) in the same structure as the cleansing rule table 332.

Figure 61:
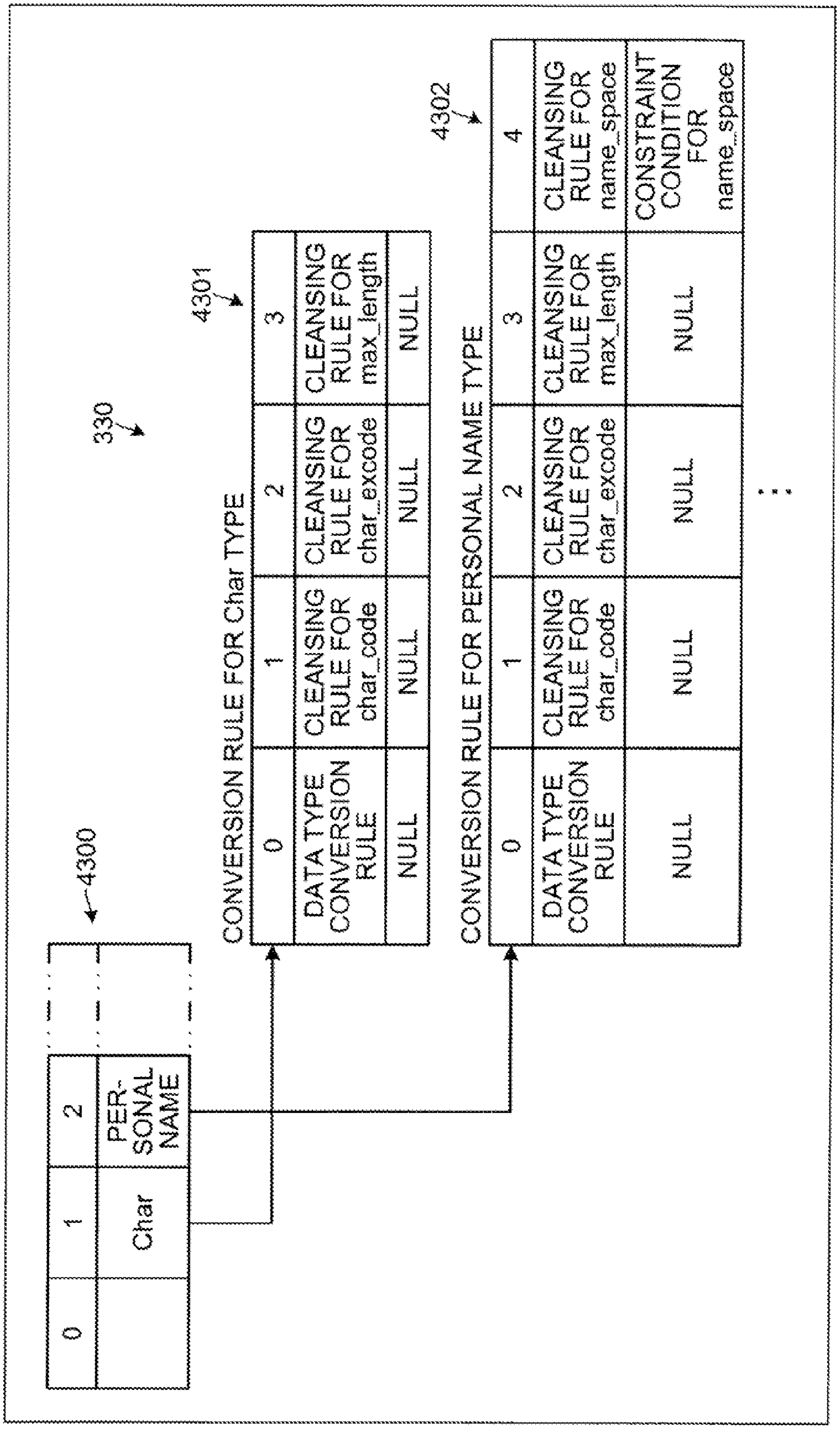
FIG. 61 is a diagram of the conversion rule set 330 when a constraint is added.

FIG. 61 is a diagram of the conversion rule set 330 when the constraint is added. The conversion rule set 330 of FIG. 61 depicts a state of deploying the constraint condition onto the conversion rule set 330 depicted in FIG. 43. In FIG. 61, a record for the constraint condition is added to the conversion rule tables for data type 4301 to 4304. In the record for the constraint condition, default is indicated by "null". If the constraint is introduced as depicted in FIG. 59, a pointer to the constraint condition table is set to a corresponding cleansing rule in the record for the constraint condition of the corresponding conversion rule tables for data type 4301 to 4304.

In FIG. 61, the calling pointer for the constraint condition table for name_space is set along with the calling pointer for the cleansing rule for name_space table 332 at the sequence number [4] of the conversion rule table for personal name type. Therefore, if the sequence number [4] of the conversion rule table for personal name type is specified, the cleansing rule table for name_space 332 is called and the constraint condition table for name_space also becomes referable. An example of the data converting process in the case of introducing a constraint will be described. An example of the data converting process using a control pattern P1 combining the functions F1, F2, and F4 will be described.

FIGS. 62 to 66 are explanatory diagrams of a second data conversion example using the encoded meta-definition information 340 related to the FULL_NAME in the TABLE_A and the TABLE_B depicted in FIG. 44. The encoding of the data types, the type attributes, and the type attribute values is performed in advance through the initializing process and the meanings of the codes are recognized in the processes. The cleansing control unit 351 is given the encoded meta-definition information 340 depicted in FIG. 62 and the information of values to start the converting process.

The cleansing control unit compares the data types between the From side and the To side. Specifically, the values of the sequence number [0] (data type) is compared between the encoded meta-definition information 340 of the From side and the encoded meta-definition information 340 of the To side. In this case, both values are "2" (personal name) and recognized as the same data type.

Since the data types are the same, the type attributes are then compared between the From side and the To side. Since the function F4 is employed in this example, a comparison is made between the values of the sequence number [4] (name_space), which is the type attribute at the end. Since the values are "0" (Yes) on the From side and "1" (No) on the To side in FIG. 62, the converting process is specified according to the conversion rule set 330 of FIG. 61.

Specifically, the conversion rule table 4300 is referenced by using the data type ID: 2 as the sequence number because of the data type ID: 2 (personal name) to acquire the conversion rule table for personal name type 4302.

A reference is then made to the cleansing rule table for name_space 332 (FIG. 39) of the sequence number [4] currently compared in the conversion rule table for personal name type 4302. A calling pointer for the first/second-name spacing process is specified by referring to the cleansing rule table for name_space 332 of FIG. 39 according to "1" (No) on the From side and the "0" (Yes) on the To side, i.e., the values of the encoded meta-definition 340 of interest. The first/second-name spacing process is executed after the following process for constraint condition is executed.

If reference is then made to the constraint condition of the sequence number [4] currently compared in the conversion rule table for personal name type 4302, since the constraint condition table for name_space (FIG. 60) is set, a shift is made to a process for the constraint condition using the constraint condition table for name_space. A constraint condition "1 (char_code)=0 (SJIS)" is specified by referring to the constraint condition table for name_space 6000 of FIG. 60 according to "1" (No) on the From side and the "0" (Yes) on the To side, i.e., the values of the encoded meta-definition 340 of interest.

Figure 63:
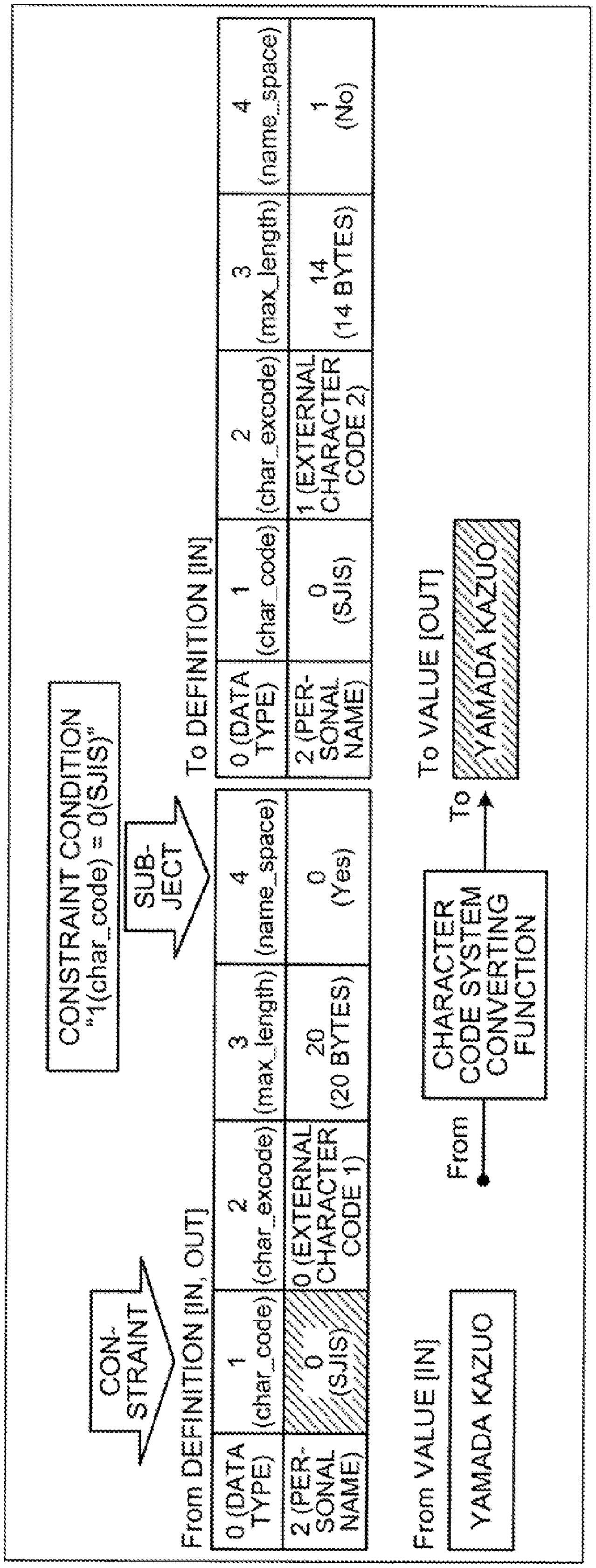

As depicted in FIG. 63, to comply with the specified constraint condition "1 (char_code)=0 (SJIS)", the process of converting the type attribute ID: 1 (character code system) from the value of the From side into the constraint condition is executed in advance before the first/second-name spacing process, based on the name_space type attribute. FIGS. 63 to 66 depict the states after the execution of the processes and the shaded portions indicate the updates of the values.

Specifically, a comparison is made for the type attribute ID: 1 specified by the constraint condition "1 (char_code)=0 (SJIS)" between the value of the From definition and the value of the constraint condition to check whether the constraint condition is satisfied. In this example, since the From definition value "1" (JEF) the constraint condition value "0" (SJIS) as depicted in FIG. 62, a process of matching the From side with the constraint condition is necessary in advance. Since the From definition is the data type ID: 2, the conversion rule table 4300 of FIG. 61 is referenced by using the data type ID: 2 as the sequence number to refer to the conversion rule table for personal name type 4302.

Reference is then made to the cleansing rule table for char_code 332 (FIG. 37) of the sequence number [1] currently compared in the conversion rule table for personal name type 4302. Since the From side is "1" (JEF) and the To side (constraint condition) is "0" (SJIS) as depicted in FIG. 62, the cleansing rule table for char_code 332 of FIG. 37 is referenced by From [1] and To [0] to specify the calling pointer to the character code system converting process. The character code system converting process is called by the specified calling pointer to execute the character code system converting process. As a result, as depicted in FIG. 63, the object character string "YAMADA KAZUO" of the From value having the character code system of JEF is converted into SJIS, i.e., the constraint condition, and the value of the item number [1] (char_code) of the From definition is updated with "0" (SJIS).

Figure 64:
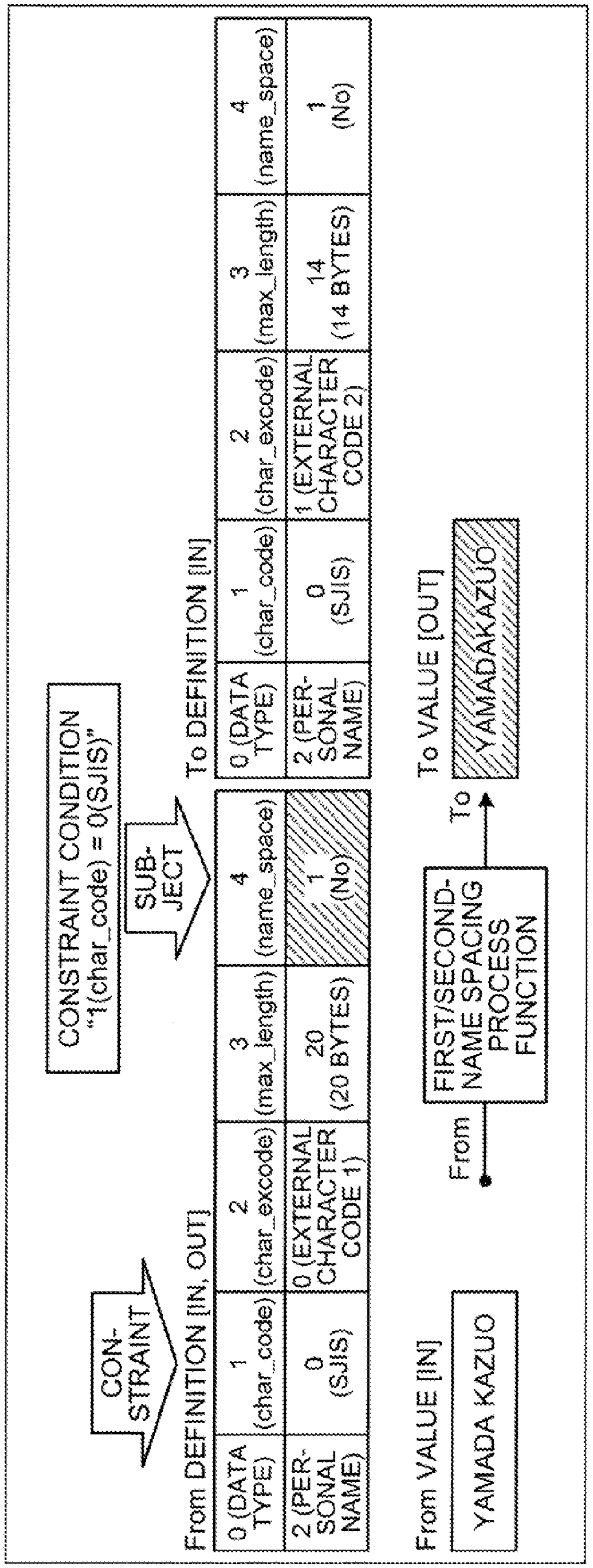

As depicted in FIG. 64, the suspended first/second-name spacing process is then executed. In the first/second-name spacing process, since the sequence number [4] (name_space) of the encoded meta-definition information 340 on the From side indicates "0" (Yes) and the sequence number [4] of the encoded meta-definition information 340 on the To side indicates "1" (No) as depicted in FIG. 63, the object character string "YAMADA KAZUO" converted into SJIS is used as the From value and a apace between the first and second names is deleted to set "YAMADAKAZUO" in SJIS as the To value as depicted in FIG. 64. The value of the sequence number [4] of the encoded meta-definition information 340 on the From side is updated from "0" (Yes) to "1" (No).

Figure 65:
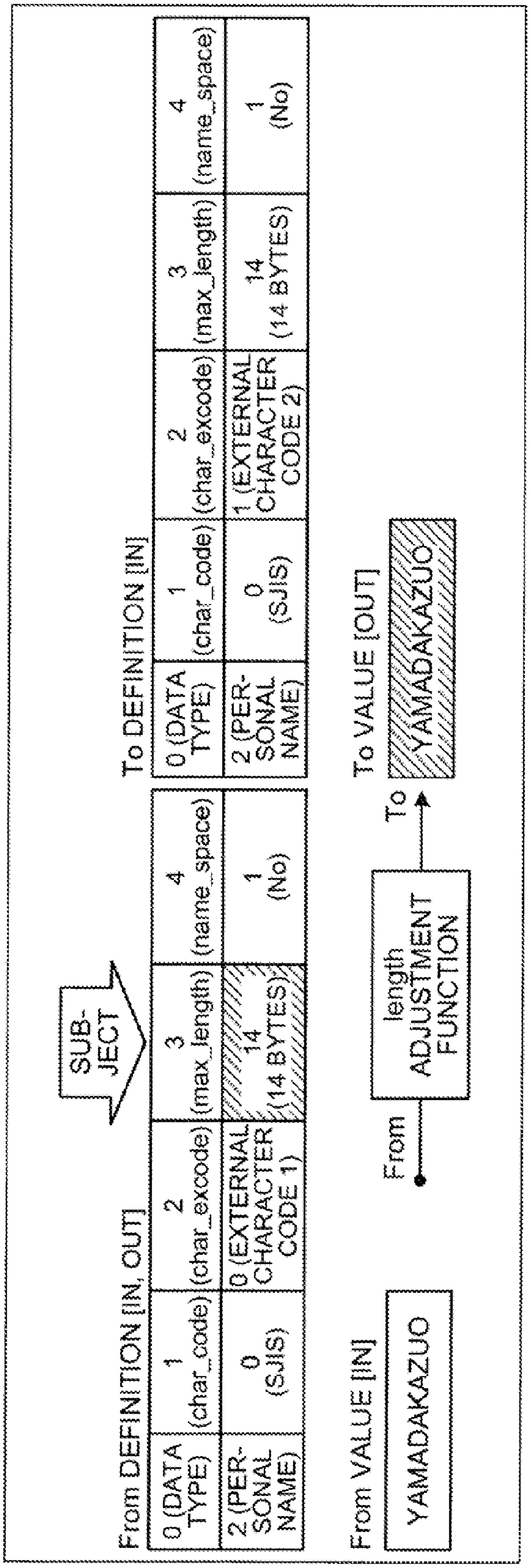

As depicted in FIG. 65, the process of the preceding sequence number [3] (max_length) is then executed. Specifically, the values of the sequence number [3] (max_length) depicted in FIG. 64 are compared between the From definition and the To definition. In this case, the values are "20" on the From side and "14" on the To side and since the values are different, a converting process is specified according to the conversion rule set 330 in FIG. 61.

More specifically, the conversion rule table 4300 is referenced by using the data type ID: 2 as the sequence number because of the data type ID: 2 (personal name) to acquire the conversion rule table for personal name type 4302.

Reference is then made to the cleansing rule table for max_length 332 (FIG. 41) according to the conversion rule of the sequence number [3] currently compared in the acquired conversion rule table for personal name type 4302. Since the max_length type attribute may have an arbitrary value, the calling pointer for the length adjusting process at From [0] and To [0] is specified regardless of values of From/To in the cleansing rule table for max_length 332 in FIG. 41.

Since the calling pointer of the constraint condition table is not set at the sequence number [3] in FIG. 61 and is defined as NULL, the length adjusting process is directly executed. As depicted in FIG. 65, since the From value character string "YAMADAKAZUO" in SJIS with a space between the first and second names deleted has only four characters, i.e., eight bytes, the To value is the same value as the From value even if the length adjusting process is executed. The value of the From definition [3] (max_length) is updated with "14" (14 bytes), i.e., the state after the conversion.

Figure 66:
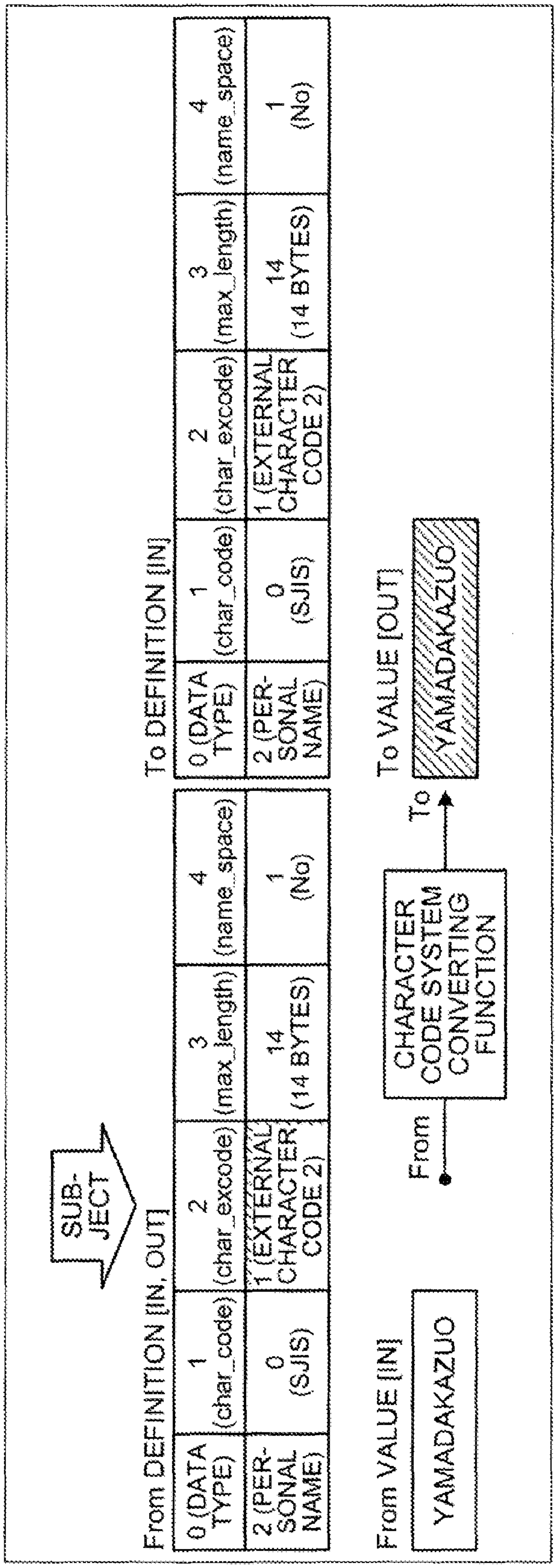

As depicted in FIG. 66, the process of the preceding sequence number [2] (char_excode) is then executed. Specifically, the values of the sequence number [2] (char_excode) depicted in FIG. 65 are compared between the From definition and the To definition. In this case, the values are "0" (external character code 1) in the From definition and "1" (external character code 2) in the To definition and since the values are different, a converting process is specified according to the conversion rule set 330 in FIG. 61.

More specifically, since the data type ID is 2 (personal name), the conversion rule table 4300 is referenced by using the data type ID: 2 as the sequence number to acquire the conversion rule table for personal name type 4302.

Reference is then made to the cleansing rule table for char_excode 332 (FIG. 38) of the sequence number [2] currently compared in the acquired conversion rule table for personal name type 4302. Since the From side is "0" (external character code 1) and the To side (constraint condition) is "1" (external character code 2) as depicted in FIG. 65, the cleansing rule table for char_excode 332 of FIG. 38 is referenced by From [0] and To [1] to specify the calling pointer to the character code system converting process.

The character code system converting process is called by the specified calling pointer to execute the character code system converting process. Although the character code system converting process processes are not only char_excode but also char_code, only char_excode is converted since the process has been executed for char_excode because of the constraint condition. As depicted in FIG. 66, "YAMADAKAZUO" in SJIS and the external character code 2 is set as the To value and the value of [2] of the From definition is updated with "1" (external character code 2) as the conversion result.

Since the data type and all the type attributes are consistent, the converting process is terminated. After the data type at the head, the values of definition are sequentially compared from the right and the process is specified and executed in the case of a different value. If the constraint condition is set, conversion for keeping the constraint condition is repeatedly performed in advance. This enables a data converting process complying with the constraint to be implemented at a minimum cost without impairing flexibility.

Since the type attributes are sequentially processed from the rear side (right side), a newly added type attribute is evaluated earlier and a new converting function is preferentially executed. For an old converting function conflicting with the new converting function, the new converting function may change the type attribute of the old converting function. Therefore, operation may be suppressed under the control of the new converting function.

For example, as depicted in FIG. 66, since the type attributes are sequentially processed from the rear side (right side), the newly added type attribute char_excode is evaluated earlier than the old type attribute char_code and the new converting function (character code system converting process) is preferentially executed. Since both the new converting function and the old converting function execute the character code system converting process in this case, the character code system converting process of the old converting function may be suppressed by converting the char_code type attribute by the character code system converting process executed first and a redundant process may be prevented.

The data converting process procedure of the data converting apparatus 300 according to the second embodiment will be described with reference to FIGS. 67 to 72.

Figure 67:
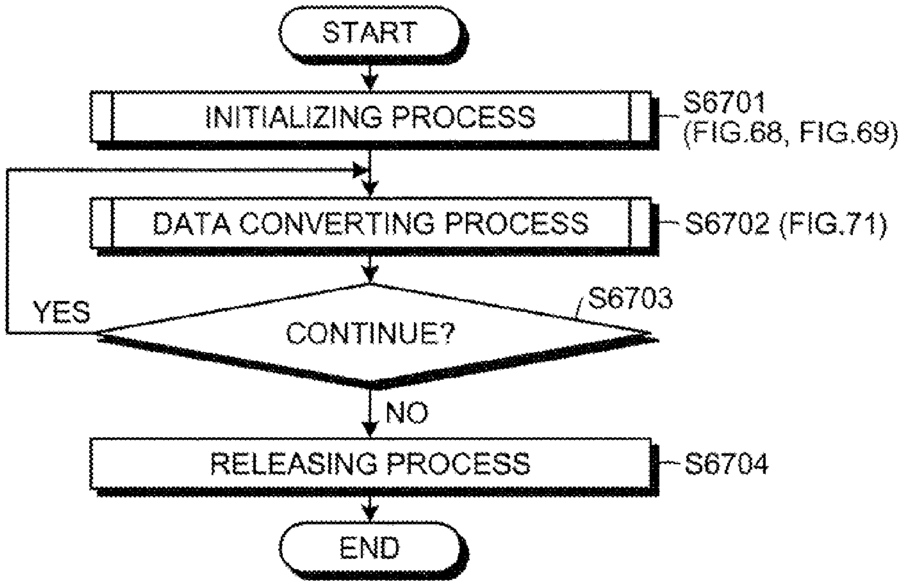
FIG. 67 is a flowchart of a data converting process procedure of the data converting apparatus 300 according to a second embodiment.

FIG. 67 is a flowchart of the data converting process procedure of the data converting apparatus 300 according to the second embodiment. First, the initializing unit 311 executes the initializing process (step S6701). Details of the initializing process (step S6701) will be described with reference to FIGS. 68 and 69.

The cleansing processing unit 312 executes the data converting process (step S6702). Details of the data converting process (step S6702) will be described with reference to FIG. 71. It is then determined whether the data conversion is to be continued (step S6703). The criterion may be operational input from a user or the presence of data to be converted.

If continued (step S6703: YES), the procedure proceeds to step S6702 to execute the data converting process. On the other hand, if not continued (step S6703: NO), a release process is executed (step S6704). In the release process, a resource on the memory obtained at the initializing process (step S6701) is released. This leads to termination of the data converting process.

Figure 68:
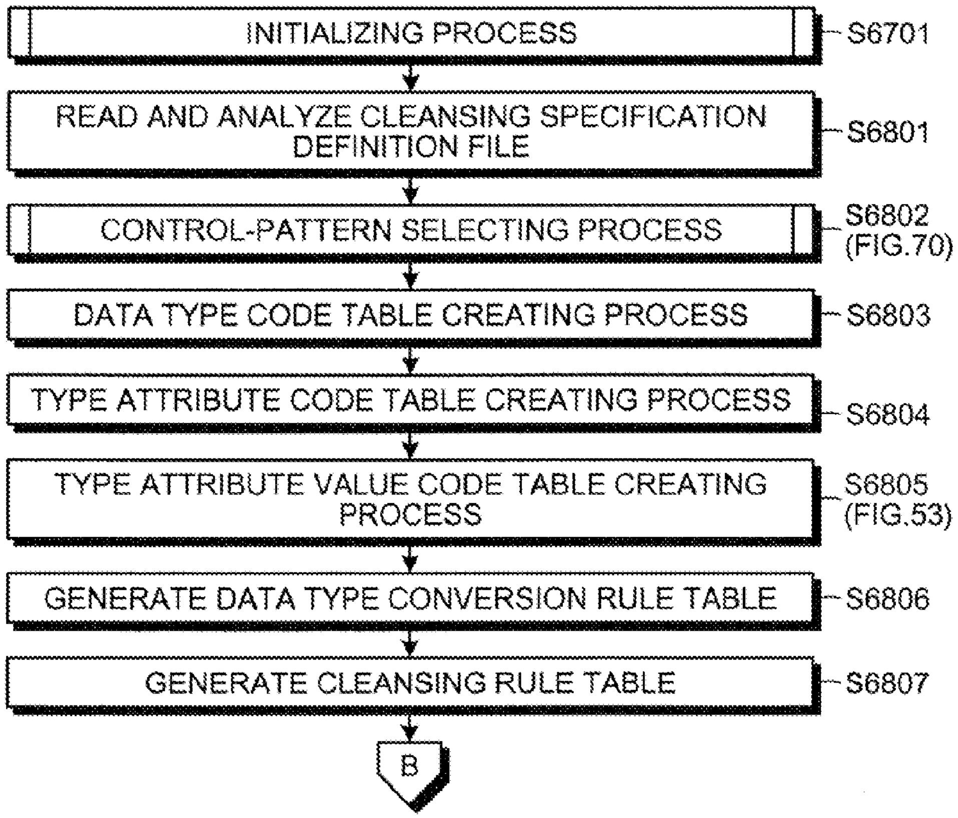
FIG. 68 is a flowchart of a process procedure (first half) of an initializing process (step S6701) executed by the initializing unit 311 depicted in FIG. 67.

FIG. 68 is a flowchart of a process procedure (first half) of the initializing process (step S6701) executed by the initializing unit 311 depicted in FIG. 67. As depicted in FIG. 68, the cleansing specification definition file 301 is read and analyzed (step S6801). A control-pattern selecting process is then executed (step S6802). In the control-pattern selecting process (step S6802), a corresponding control pattern is selected from the control patterns P1 to P6 and the control pattern P0 corresponding to the first embodiment. The details of the control-pattern selecting process (step S6802) will be described later with reference to FIG. 70.

If a control pattern P is selected by the control-pattern selecting process (step S6802), a data type code table creating process is executed (step S6803). Specifically, data type IDs are added to the data types. For example, as depicted in FIG. 26, entirely unique integers starting from one are added as the data type IDs consecutively without a skip in the order of definition.

A type attribute code table creating process is executed (step S6804). Specifically, type attribute IDs are added to the type attributes. For example, as depicted in FIGS. 27 to 29, integers unique within a data type starting from one consecutively without a skip in the order of definition are added as the type attribute IDs to all the type attributes in the order from the data type of the ancestor. Between the data types having the inheritance relationship, the type attribute IDs of common type attributes are controlled to be consistent in the entire system.

A type attribute value code table creating process is executed (step S6805). Specifically, as depicted in FIGS. 30 to 35, type attribute value IDs are added to the type attribute values. The details of the type attribute value code table creating process (step S6805) are the same as the process contents depicted in FIG. 53 and will not be described.

After the type attribute value code table creating process (step S6805), as depicted in FIG. 36, the data type conversion rule table 331 is generated (step S6806). As depicted in FIGS. 37 to 42, the cleansing rule table 332 is generated (step S6807). The procedure proceeds to step S6901 of FIG. 69.

Figure 69:
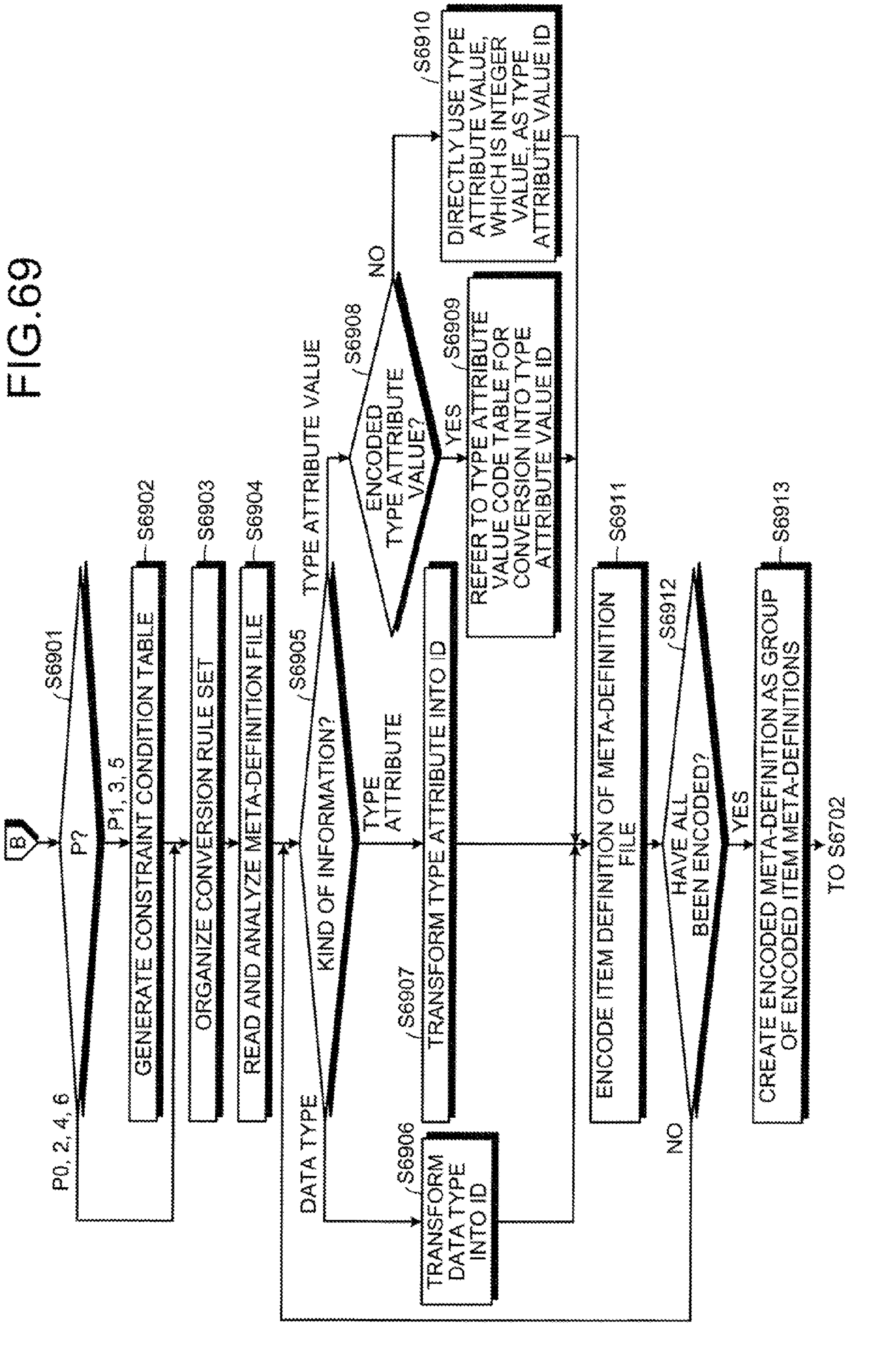
FIG. 69 is a flowchart of the process procedure (second half) of the initializing process (step S6701).

FIG. 69 is a flowchart of a process procedure (second half) of the initializing process (step S6701) executed by the initializing unit 311 depicted in FIG. 67. After the cleansing rule table 332 is generated, in FIG. 69, the selected control pattern is specified (step S6901). If the control pattern P is P0, P2, P4, or P6 (step S6901: P0, p2, P4, P6), the procedure proceeds to step S6903. On the other hand, if the control pattern P is P1, P3, or P5 (step S6901: P1, P3, P5), the constraint condition table is generated as depicted in FIG. 60 (step S6902). The procedure proceeds to step S6903.

At step S6903, as depicted in FIG. 61, the conversion rule set 330 is organized (step S6903). The meta-definition file 304 is then read and analyzed (step S6904). The types of analyzed information are sequentially determined (step S6905). Specifically, it is determined whether the information is a data type, a type attribute, or a type attribute value. The determination is made according to the order of description in the meta-definition file 304.

In the case of the data type (step S6905: DATA TYPE), the data type is transformed into ID (step S6906). Specifically, the data type code table 321 (FIG. 26) is referenced for the transformation into the data type ID. The procedure proceeds to step S6911.

If the type of the information is a type attribute (step S6905: TYPE ATTRIBUTE), the type attribute is transformed into ID (step S6907). Specifically, the type attribute code table 322 (FIGS. 27 to 29) is referenced for the transformation into the type attribute ID. The procedure proceeds to step S6911.

If the type of the information is a type attribute value (step S6905: TYPE ATTRIBUTE VALUE), it is determined whether the type attribute value is encoded (step S6908). If the type attribute value is encoded (step S6908: YES), the type attribute value code table 323 (FIGS. 30 to 35) is referenced for the transformation into the type attribute value ID (step S6909). The procedure proceeds to step S6911.

If the type attribute value is not encoded (step S6908: NO), an integer value of the type attribute value is directly defined as the type attribute value ID (step S6910). The procedure proceeds to step S6911.

At step S6911, as depicted in FIG. 44, the item definition of data models in the meta-definition file 304 is encoded to create the item meta-definition table (step S6911). Specifically, the sequence number [0] is set for the data type ID and the sequence numbers [1], [2], [3], . . . are set for the type attribute value IDs or the type attribute values (if not encoded) of the type attribute having the type attribute IDs identical to the sequence numbers. For example, if the item meta-identification table having the data model related to the employee item of the TABLE_A is created, the sequence number [0] is set for the data type ID: 4 (see FIG. 26) indicative of the integer type that is the data type of the EMPLOYEE_NUMBER item and the sequence number [1] is set for the type attribute value: 12 (see FIG. 35) of the max_digit type attribute (see FIG. 29) that is the type attribute ID: 1 of the integer type as depicted in FIG. 44. Since the type attribute value of the max_digit type attribute is a type attribute value not encoded, the type attribute value: 12 specified in the meta-definition file 304 is directly used for the setting.

It is then determined whether all the data models in the meta-definition file 304 are encoded (step S6912). If not all the data models have been encoded (step S6912: NO), the procedure returns to step S6905 to encode the remaining data models. On the other hand, if all the data models are encoded (step S6912: YES), the encoded meta-definition information 340 is configured as a group of encoded item meta-definition as depicted in FIG. 44 (step S6913). Subsequently, a shift is made to the data converting process (step S6702).

Figure 70:
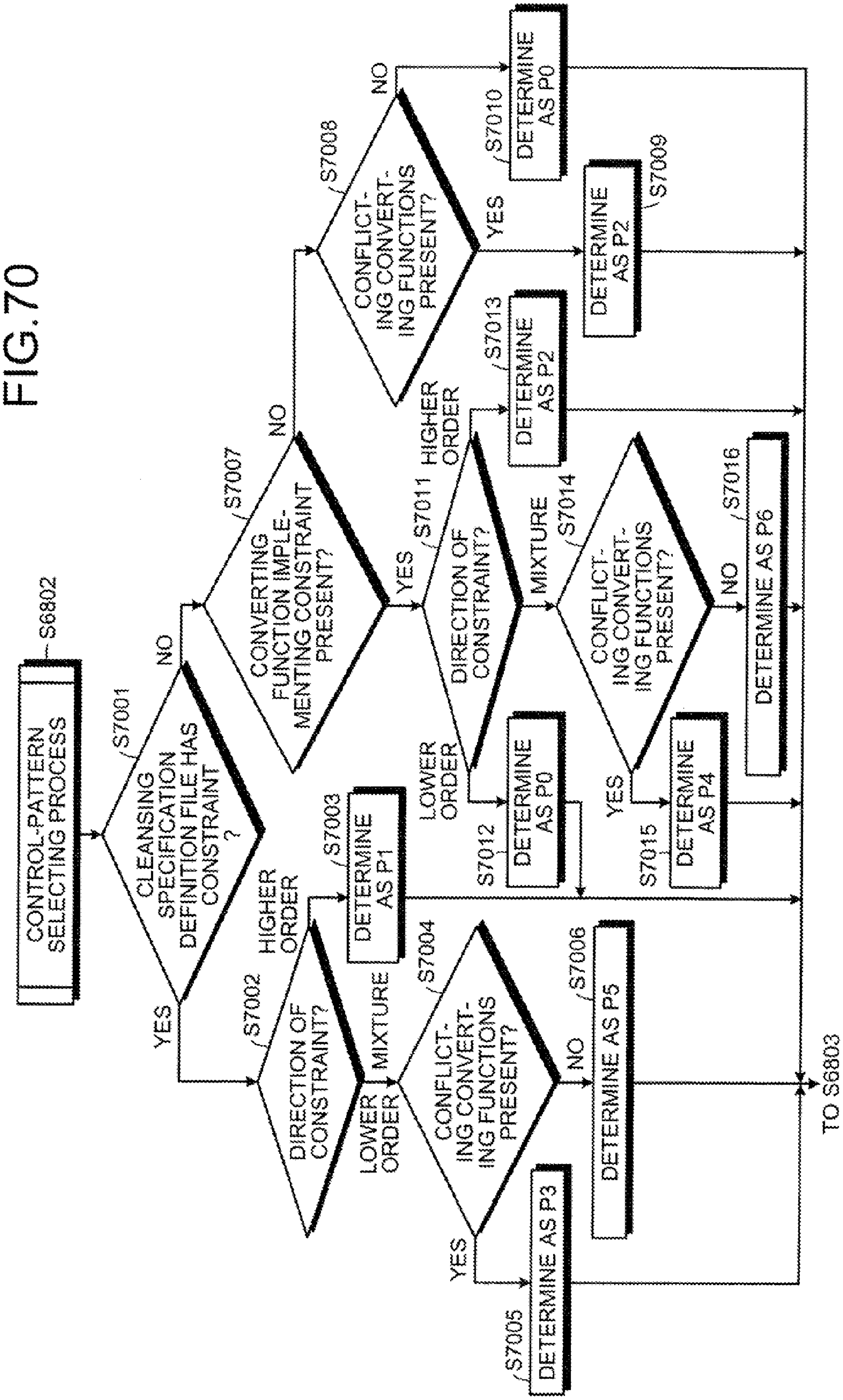
FIG. 70 is a flowchart of a process procedure of a control-pattern selecting process (step S6802) depicted in FIG. 68.

FIG. 70 is a flowchart of a process procedure of the control-pattern selecting process (step S6802) depicted in FIG. 68. It is determined whether the cleansing specification definition file 301 has a constraint (step S7001). Specifically, for example, it is determined whether a constraint is declared as described in the personal name data type definition description 5501 of FIG. 55.

If a constraint exists (step S7001: YES), the direction of constraint is determined (step S7002). The direction of constraint is determined based on, for example, whether all the type attributes to be restricted are located in a higher order than the subject (the type attribute having the cleansing definition with the constraint declared), whether all the type attributes to be restricted are located in a lower order than the subject, and whether the type attributes to be restricted are a mixture of the type attributes in lower and higher orders than the subject.

For example, since the constraint is "rule="char_code=SJIS"" in the example of FIG. 55, the type attribute to be restricted is "char_code". The subject (type attribute) is the type attribute "name_space" having the cleansing rule (<CL_RULE> tag) with the constraint "rule="char_code=SJIS"" declared. In this case, since "char_code" is defined higher than "name_space" (described in an upper line in the same data type definition or in the data type definition of the Supertype) in FIG. 55, the direction of constraint is the "higher order".

In the case of a higher order (step S7002: HIGHER ORDER), the control pattern P1 is selected (step S7003) and the procedure proceeds to step S6803. On the other hand, in the case of a lower order or mixture (step S7002: LOWER ORDER or MIXTURE), it is determined whether conflicting converting functions are present (step S7004). Conflicting converting functions will be described.

For example, when a character code system converting function (referred to as a character code system converting function 2) capable of converting a difference in external characters (capable of supporting the char_excode type attribute as well as the char_code type attribute) is added to an environment using a general character code system converting function (referred to as a character code system converting function 1) that performs character code system conversion for the char_code type attribute, it is desirable to use the efficient character code system converting function 1 for the conversion of data having the same external character systems and to use the highly-functional character code system converting function 2 for the conversion of data having different external character systems.

When converting functions having a converting function for the same type attribute value are allowed to be used at the same time, both are referred to as "conflicting converting functions". Since a highly-functional cleansing function such as the character code system converting function 2 is generally set as conversion for type attributes on the rear side, the conflict may be resolved by using a control pattern that first processes the type attributes on the rear side to realize efficient selective usage.

If conflicting converting functions are present (step S7004: YES), the control pattern P3 is selected (step S7005) and if no conflicting converting function is present (step S7004: NO), the control pattern P5 is selected (step S7006). The procedure proceeds to step S6803.

On the other hand, if the cleansing specification definition file 301 has no constraint at step S7001 (step S7001: NO), it is determined whether a converting function is present that has the function F3 applying a constraint by itself (step S7007). Specifically, as described in <Function F3>, since no constraint is defined in the cleansing specification definition file 301, for example, information indicative of the presence of the function applying a constraint and the specific type attribute to be restricted is described in a portion for defining the cleansing function in the cleansing specification definition file in advance, and the "presence of the function applying a constraint" is determined based on the information. The "specific type attribute to be restricted" is information necessary for the determination at step S7011 described later.

If no converting process applying a constraint is present (step S7007: NO), it is determined whether conflicting converting functions are present (step S7008). The process at step S7008 is the same process as that at step S7004. If conflicting converting functions are present (step S7008: YES), the control pattern P2 is selected (step S7009). On the other hand, if no conflicting converting function is present (step S7008: NO), the control pattern P0 is selected (step S7010). The procedure proceeds to step S6803.

If no converting process applying a constraint is present (step S7007: NO), the direction of constraint is determined (step S7011). Although the process at step S7011 is the same process as that at step S7002, the type attribute to be restricted requires a unit of separately acquiring information as described at step S7007. In the case of the lower order (step S7011: LOWER ORDER), the control pattern P0 is selected (step S7012).

In the case of the higher order (step S7011: HIGHER ORDER), the control pattern P2 is selected (step S7013). In the case of the mixture (step S7011: MIXTURE), it is determined whether conflicting converting functions are present (step S7014). The process at step S7014 is the same process as that at step S7004. If the conflicting converting functions are present (step S7014: YES), the control pattern P4 is selected (step S7015). On the other hand, if no conflicting converting function are present (step S7014: NO), the control pattern P6 is selected (step S7016). The procedure proceeds to step S6803.

Figure 71:
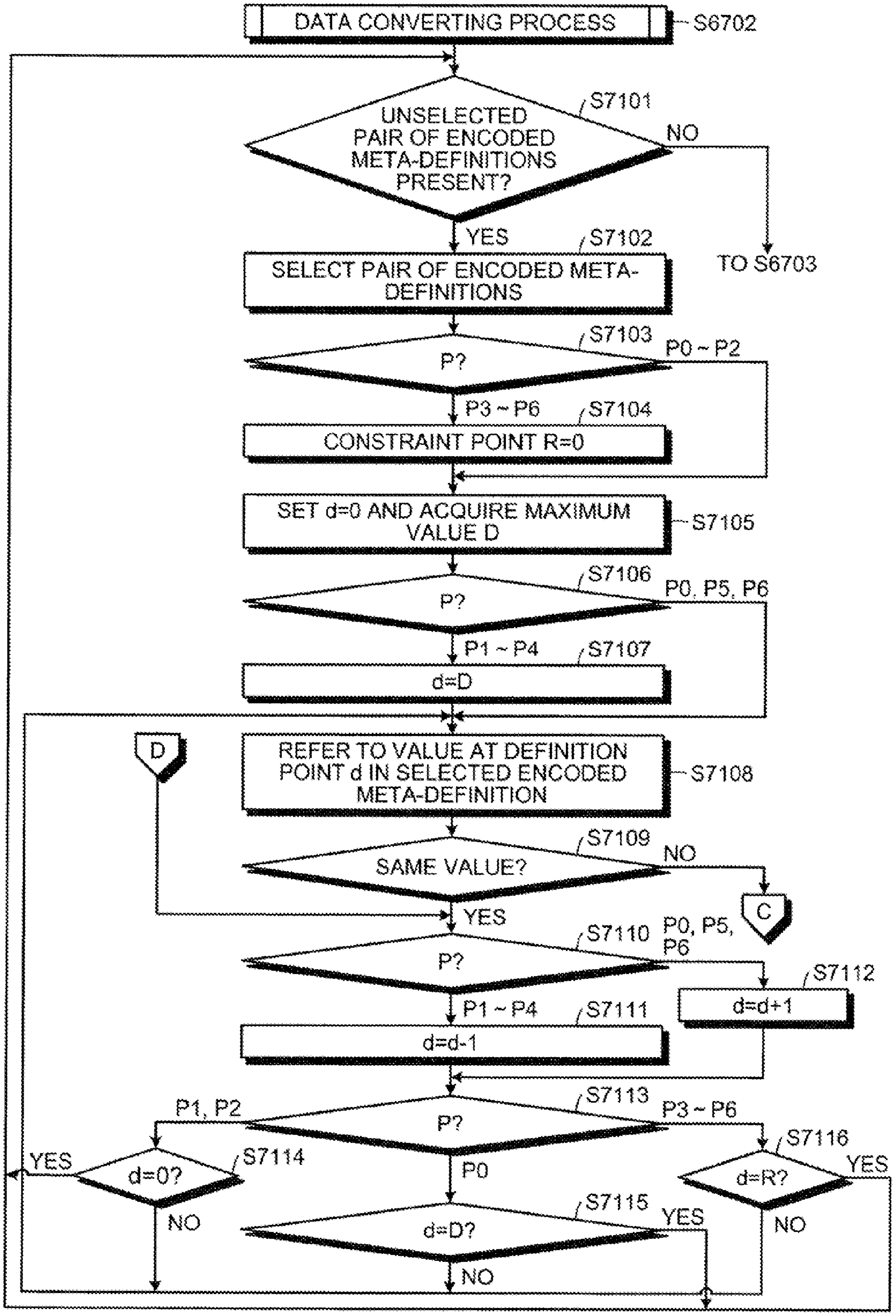
FIGS. 71 and 72 are flowcharts of a process procedure of a data converting process (step S6702) depicted in FIG. 67.

FIG. 71 is a flowchart of a process procedure of the data converting process (step S6702) depicted in FIG. 67. It is determined whether an unselected pair of the encoded meta-definition information 340 is present (step S7101). If no unselected pair of the encoded meta-definition information 340 is present (step S7101: NO), the procedure proceeds to step S6703. On the other hand, if an unselected pair of the encoded meta-definition information 340 is present (step S7101: YES), the unselected pair of the encoded meta-definition information 340 is selected (step S7102).

The control pattern P is specified (step S7103). If the control pattern P is P0 to P2 (step S7103: P0 to P2), the procedure proceeds to step S7105. On the other hand, if the control pattern P is P3 to P6 (step S7103: P3 to P6), the control point R is set to R=0 (step S7104) and the procedure proceeds to step S7105.

At step S7105, the definition point d is set to d=0, and the selected pair of the encoded meta-definition information 340 is referenced to acquire the maximum value D of the definition point d (step S7105).

The control pattern P is then specified (step S7106). If the control pattern P is P0, P5, or P6 (step S7106: P0, P5, P6), the procedure proceeds to step S7108. On the other hand, if the control pattern P is P1 to P4 (step S7106: P1 to P4), the definition point d is set to the maximum value D (step S7107) and the procedure proceeds to step S7108. Reference is made to the information having the current definition point d set as the sequence number in the specified encoded meta-definition information 340 of the From side and the encoded meta-definition information 340 of the To side (step S7108). It is determined whether the referenced information has the same values (step S7109).

In the case of the same values (step S7109: YES), the control pattern P is specified (step S7110). If the control pattern P is P1 to P4 (step S7110: P1 to P4), the definition point d is decremented (step S7111) and the procedure proceeds to step S7113. On the other hand, if the control pattern P is P0, P5, or P6 (step S7110: P0, P5, P6), the definition point d is incremented (step S7112) and the procedure proceeds to step S7113.

At step S7113, the control pattern P is specified again (step S7113). If the control pattern P is P1 or P2 (step S7113: P1, P2), it is determined whether the definition point d is d=0 (step S7114). If d=0 is not satisfied (step S7114: NO), the procedure returns to step S7108 and if d=0 is satisfied (step S7114: YES), the procedure returns to step S7101.

If the control pattern P is P0 (step S7113: P0), it is determined whether the definition point d is d=D (step S7115). If d=D is not satisfied (step S7115: NO), the procedure returns to step S7108 and if d=D is satisfied (step S7115: YES), the procedure returns to step S7101.

If the control pattern P is P3 to P6 (step S7113: P3 to P6), it is determined whether the definition point d is d=R (step S7116). If d=R is not satisfied (step S7116: NO), the procedure returns to step S7108 and if d=R is satisfied (step S7116: YES), the procedure returns to step S7101.

At step S7109, if the information referenced at S7108 does not have the same values (step S7109: NO), the procedure proceeds to step S7201 of FIG. 72.

Figure 72:
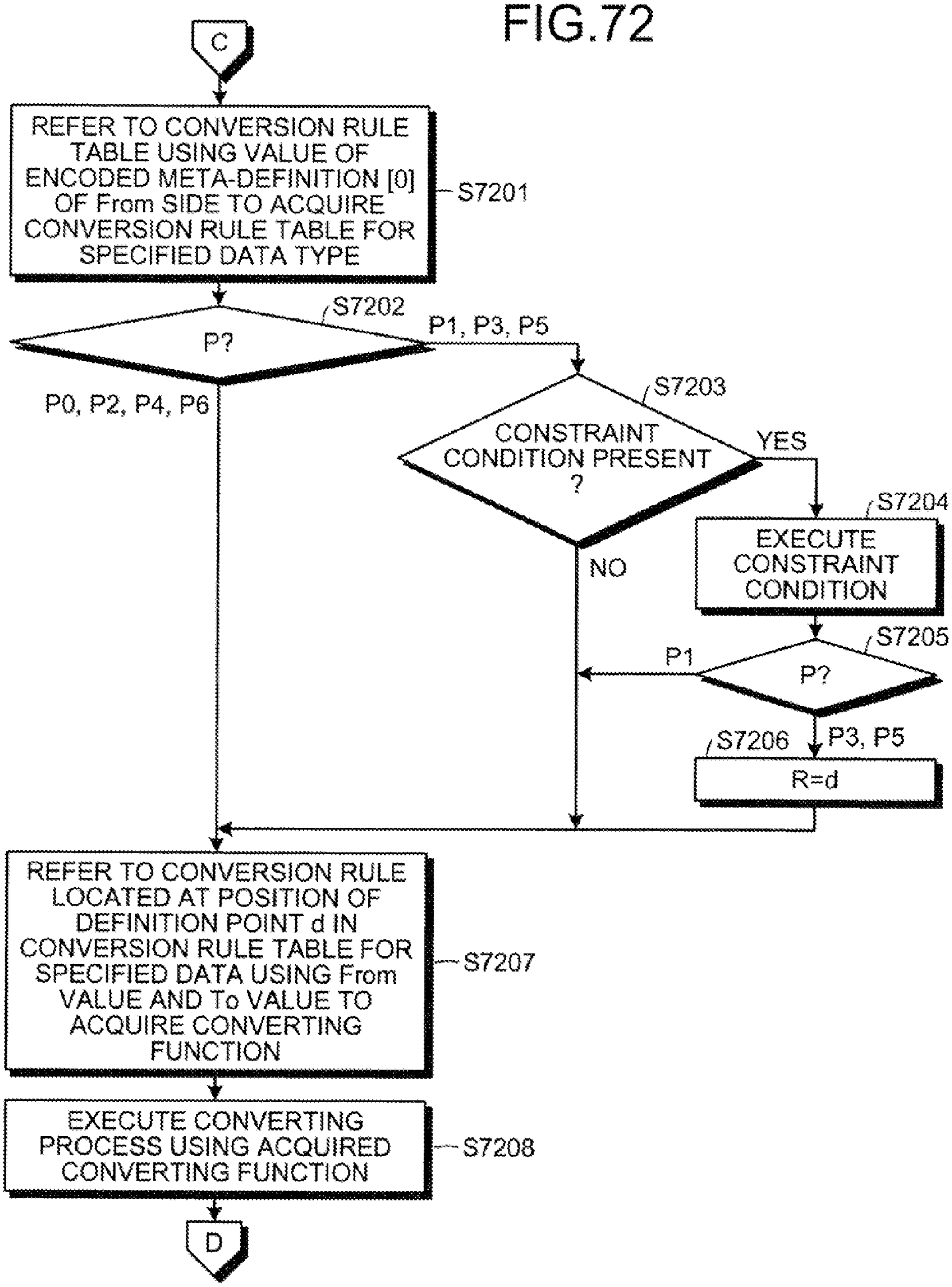

FIG. 72 is another flowchart of the data converting process (step S6702) depicted in FIG. 67.

The encoded meta-definition information 340 of the From side is referenced according to the sequence number [0] to acquire a data type ID of the From side, and the conversion rule table 4300 is referenced by using the acquired data type ID as the sequence number to acquire the corresponding conversion rule tables for data types 4301 to 4304 (step S7201). The acquired tables are referred to as "conversion rule tables for specified data type".

The control pattern P is then specified (step S7202). If the control pattern P is P0, P2, P4, or P6 (step S7202: P0, P2, P4, P6), the procedure proceeds to step S7207. On the other hand, if the control pattern P is P1, P3, or P5 (step S7202: P1, P3, P5), it is determined whether a constraint condition exists (step S7203).

In the process at step S7203, the conversion rule tables for specified data type is referenced by using the definition point d as the sequence number to acquire the conversion rule table (the data type conversion rule table 331 or the cleansing rule table 332); the conversion rule table for a constraint condition is referenced by using the values of the encoded meta-definition pair referenced at step S7108 as the sequence numbers of From/To; it is determined that no constraint condition exists in the case of NULL; and it is determined that a constraint condition exists in the case of other than NULL to store a pointer to the constraint condition table.

If the values of the encoded meta-definition pair referenced at step S7108 are arbitrary values that are not encoded, the conversion rule table is referenced by setting both of the sequence numbers of From/To as [0] to refer to a constraint condition. If no constraint condition is present (step S7203: NO), the procedure proceeds to step S7207.

On the other hand, if a constraint condition is present (step S7203: YES), the constraint condition is executed (step S7204). The execution of the constraint condition is a process conforming to a normal cleansing process except that a state of the current value is used as the From definition and the constraint condition as the To definition, as described with reference to FIGS. 62 to 64. The control pattern P is specified again (step S7205). If the control pattern P is P1 (step S7205: P1), the procedure proceeds to step S7207. If the control pattern P is P3 or P5 (step S7205: P3, P5), a constraint point R is set as the current definition point d (step S7206) and the procedure proceeds to step S7207.

At step S7207, the conversion rule tables for specified data type is referenced by using the definition point d as the sequence number to acquire the conversion rule table (the data type conversion rule table 331 or the cleansing rule table 332) and a converting function to be executed is acquired by using the values of the encoded meta-definition pair referenced at step S7108 as the sequence numbers of From/To for the conversion rule table (step S7207). If the values of the encoded meta-definition pair referenced at step S7108 are arbitrary values that are not encoded, the conversion rule table is referenced by setting both of the sequence numbers of From/To as [0] to acquire the converting function to be executed (step S7207).

The converting process is executed by the acquired converting function (step S7208). Specifically, for example, the From value is converted and set as the To value. The processed definition contents are reflected on the From definition (see FIGS. 45 to 49). The procedure returns to step S7110 of FIG. 71.

In the second embodiment, the cleansing function operating under various conditions may be developed with less burden as described. The addition of a new cleansing function can be flexibly supported without affecting existing functions. Even if the cleansing function is executed from various functions including a real-time process, higher performance can be achieved.

The functional configuration of the data converting apparatus described in the first and second embodiments will be described.

Figure 73:
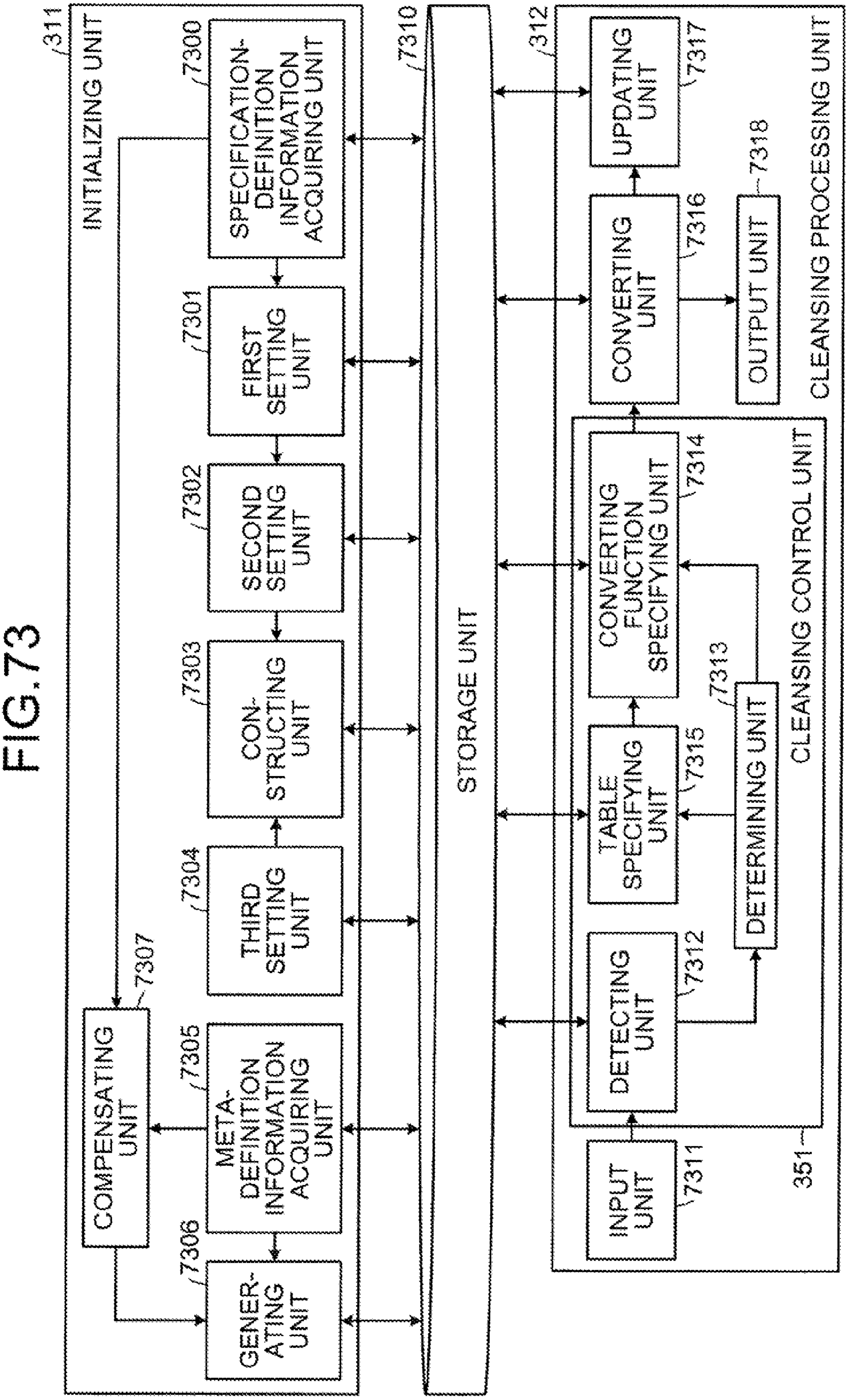
FIG. 73 is a block diagram of a functional configuration of a functional configuration of the data converting apparatus according to the embodiments.

FIG. 73 is a block diagram of a functional configuration of the data converting apparatus according to the embodiments. FIG. 73 depicts functional configurations of the initializing unit 311 and the cleansing processing unit 312. The functional configuration of the initializing unit 311 will first be described. It is assumed that a storage unit 7310 stores the cleansing specification definition file 301, the type converting function library 302, the cleansing function library 303, and the meta-definition file 304.

The initializing unit 311 includes a specification-definition information acquiring unit 7300, a first setting unit 7301, a second setting unit 7302, an constructing unit 7303, a third setting unit 7304, a meta-definition information acquiring unit 7305, a generating unit 7306, and a compensating unit 7307.

The specification-definition information acquiring unit 7300 has a function of acquiring specification definition information that defines specification (such as data types, type attributes, and type attribute values) of metadata handled by the data converting apparatus usable as the metadata of the conversion source (From side) and the metadata of the conversion destination (To side) and a data converting function achievable as a combination thereof.

The specification definition information is information that defines specification of data conversion and may be cleansing specification definition file 301, for example. The metadata is not data to be converted and includes information related to the property of the data to be converted and relevant information between object data. In the cleansing specification definition file 301, the metadata corresponds to data types, type attributes, and type attribute values representative of the property of data, tables, columns, and mapping representative of the structure of data, etc.

The data converting function is a function of converting a data value of the conversion source (From value) having the property defined by the metadata of the conversion source (From definition) into a data value (To value) defined by the metadata of the conversion destination (To definition). Specifically, the data converting function corresponds to the type converting function or the cleansing function depicted in FIGS. 3A to 3C. In the cleansing specification definition file 301, in the case of the type converting function, the definition is achieved with the DTCV_RULE tag 411 along with a combination of convertible data types. In the case of the cleansing function, the definition is achieved with the cleansing rule definition tag (CL_RULE tag) 414 along with a combination of convertible type attributes and type attribute values.

The first setting unit 7301 has a function of determining the specification of metadata usable in the data converting apparatus, based on the specification definition information acquired by the specification-definition information acquiring unit 7300 and transforming the metadata specification prescribed in external expression into IDs (numeric values) as much as possible to create the metadata specification in internal expression for the determined specification of metadata. A metadata code is a numeric code corresponding to the external expression of the metadata specification. A metadata encoding table is created as an administration table for correlating the external expression of the metadata specification with the metadata code.

For example, as depicted in FIG. 26, if the metadata specification is a data type, the metadata code is a data type ID. The first setting unit 7301 sets the data type code table 321 as the metadata encoding table.

As depicted in FIGS. 27 to 29, if the metadata specification is a type attribute, the metadata code is a type attribute ID. The first setting unit 7301 sets the type attribute code table 322 as the metadata encoding table. As depicted in FIGS. 30 to 33, if the metadata specification is a type attribute value, the metadata code is a type attribute value ID. The first setting unit 7301 sets the type attribute value code table 323 as the metadata encoding table.

If the metadata specification is able to have an arbitrary value, the external expression of the metadata specification is directly used as the metadata code. For example, as depicted in FIG. 34, the type attribute value of the type attribute: max_length may be an arbitrary value, the metadata encoding table is set as the type attribute value code table 323 that records information indicative of "directly using a value".

If description is defined such that a first metadata specification defined by the specification definition information is inherited by a second metadata specification, the metadata encoding table may be set such that the metadata code of the metadata specification in a lower hierarchy of the first metadata specification in the specification definition information is imported as the metadata specification in a lower hierarchy of the second metadata specification.

Specifically, the inheritance of the data type depicted in FIG. 9 may be prescribed. For example, if the first metadata specification is the char type and the second metadata specification is the personal name type, the type attribute and the type attribute value in the lower hierarchies of the personal type may inherit the type attribute and the type attribute value of the char type to set the type attribute code table 322 depicted in FIG. 27.

Since the inheriting function unifies the common portion of the metadata specification in the lower hierarchies, the contradiction in the processing system overall is resolved and redundant data conversion can be prevented.

The second setting unit 7302 has a function of setting the data conversion rule table by correlating a data converting function according to a combination of a metadata code of the conversion source and a metadata code of the conversion destination by reference to the metadata encoding table set by the first setting unit 7301. The data conversion rule table is a table that specifies a data converting function according to a combination of a metadata code of the conversion source and a metadata code of the conversion destination. The data conversion rule table corresponds to the data type conversion rule table and the cleansing rule table in the embodiments.

For example, if the metadata specification is a data type, the data conversion rule table is the data type conversion rule table as depicted in FIG. 36 and if the metadata specification is a type attribute, the data conversion rule table is the cleansing rule table for performing the data conversion (cleansing) based on the type attribute value as depicted in FIGS. 37 to 42.

The constructing unit 7303 has a function of constructing a conversion rule by correlating a higher-order conversion rule code with each conversion rule table set by the second setting unit 7302. The conversion rule code is a code assigned to a higher-order metadata specification to which the conversion rule table is applied.

Specifically, for example, if the highest-order metadata specification is a data type, the highest-order conversion rule code is the data type ID as depicted in FIG. 43. To the highest-order data type conversion rule table, zero is assigned as a conversion rule code in the hierarchy located immediately below. If the metadata specification is a type attribute, a type attribute ID is assigned to the cleansing rule table 332 applied to each type attribute as depicted in FIG. 43.

The constructing unit 7303 organizes the tables to construct the conversion rule tables for data type 4301 to 4304 as a conversion rule. If multiple data types are present, the conversion rule tables for data type 4301 to 4304 are organized to construct the conversion rule set 330 as depicted in FIG. 43.

The third setting unit 7304 has a function of copying the conversion rule table with the data converting function set to assign a constraint condition instead of the data converting function to set a constraint condition table, if the constraint condition is set for the data converting function. Specifically, for example, in the second embodiment, the cleansing table 332 is copied and the constraint condition corresponding to the data converting function is set to create the constraint condition table 6000 as described with reference to FIG. 60. The constructing unit 7303 configures the constraint condition table 6000 to be referable along with the data converting function as depicted in FIG. 61.

The meta-definition information acquiring unit 7305 has a function of acquiring meta-definition information that defines metadata of the conversion source and the conversion destination. The meta-definition information is information that defines metadata representative of the property and structure of the data of the conversion source and the conversion destination and that defines the correlation between the conversion source and the conversion destination. For example, the meta-definition information corresponds to the meta-definition file 304.

The generating unit 7306 has a function of generating encoded meta-definition information by encoding each of the metadata in the meta-definition information acquired by the meta-definition information acquiring unit 7305 by using the conversion rule code of the metadata assigned by the first setting unit 7301. Specifically, for example, for a data type, a type attribute, and a type attribute value in the meta-definition file 304, the data type, the type attribute, and the type attribute value are encoded by a data type ID, a type attribute ID, and a type attribute value ID. This enables efficient checking of the conversion rule set 330 by performing the standardized encoding in the whole processing system.

The compensating unit 7307 has a function of compensating skipped metadata by utilizing the default value assignment of the metadata specification acquired from the specification-definition information acquiring unit 7300 and stored in the compensating unit, if the skipped metadata is present in the meta-definition information acquired by the meta-definition information acquiring unit 7305. Specifically, for example, as depicted in FIG. 16, if "char_code: JEF", "max_length: 20", and "name_space: Yes" are assigned as default attribute values of the type attributes in the cleansing specification definition file 301, when the meta-definition information acquiring unit acquires the meta-definition file 304 with the type attributes skipped as depicted in the lower portion of FIG. 17, the stored type attributes and the default values are used to compensate and correct the encoded meta-definition information equivalent to the meta-definition file 304 depicted in the upper portion of FIG. 17.

Therefore, simplification may be achieved in the meta-definition file 304 while maintaining the definitions. The functional configuration of the cleansing processing unit 312 will then be described.

As depicted in FIG. 73, the cleansing processing unit 321 includes an input unit 7311, a detecting unit 7312, a determining unit 7313, a converting function specifying unit 7314, a table specifying unit 7315, a converting unit 7316, an updating unit 7317, and an output unit 7318. The detecting unit 7312, the determining unit 7313, the converting function specifying unit 7314, and the table specifying unit 7315 are functions making up the cleansing control unit 351 depicted in FIG. 3A.

The input unit 7311 has a function of receiving the input of data to be converted. Specifically, for example, the input unit 7311 receives the data to be converted having the metadata of the conversion source defined by the meta-definition file 304. If the metadata of the conversion source of the data to be converted is identified by specifying the information identifying the metadata of the conversion source along with the input of the data to be converted, the data conversion may be executed according to the meta-definition file 304 since the conversion destination is defined by the meta-definition file 304. The information identifying the metadata of the conversion destination may be configured to be specified at this point.

The detecting unit 7312 has a function of detecting the metadata codes of the conversion source and the conversion destination having the matching conversion rule code in the conversion source and the conversion destination by reference to the encoded meta-definition information 340. Specifically, for example, as depicted in FIG. 44, the data type ID/type attribute value ID of the conversion source (TABLE_A) and the data type ID/type attribute value ID of the conversion destination (TABLE_B) having the matching sequence number corresponding to the conversion rule code are detected in the conversion source (TABLE_A) and the conversion destination (TABLE_B).

For example, in FIG. 44B, for the matching identical sequence number: 0 (data type) of the conversion source (FULL_NAME in the TABLE_A) and the conversion destination (FULL_NAME in the TABLE_B), the data type ID: 2 (personal name type) of the conversion source (FULL_NAME in the TABLE_A) and the data type ID: 2 (personal name type) of the conversion destination (FULL_NAME in the TABLE_B) are detected.

If the conversion rule code (sequence number) is assigned as a consecutive number in order of priority of the metadata as depicted in FIG. 44 in the encoded meta-definition information 340, the metadata codes (data type ID/type attribute ID) of the conversion source (TABLE_A) and the conversion destination (TABLE_B) may be detected in descending order of priority to determine the matching. As a result, since the cleansing is sequentially executed in the order from a more important type attribute, the occurrence of useless processes can be prevented and the cleansing process can be simplified.

The determining unit 7313 has a function of determining whether the metadata code of the conversion source detected by the detecting unit 7312 matches the metadata code of the conversion destination. In the case of matching, since properties the same as the conversion source is required as the conversion destination, it is not necessary to convert the property prescribed by the metadata code of the conversion source into the property prescribed by the metadata code of the conversion destination. Therefore, more efficient data conversion can be achieved by detecting the matching of the metadata codes and not delivering the metadata codes to the converting process.

In the case of no matching, the table specifying unit 7315 specifies a converting rule table. The table specifying unit 7315 has a function of specifying a corresponding conversion rule table from the data type conversion rule table 331 (in the case of the conversion rule code=0) or the cleansing rule table 332 (in the case of the conversion rule code≠0) by referring to the conversion rule, based on the conversion rule code of the conversions source, if mismatch is determined by the determining unit 7313.

In the identification of the conversion rule table, the corresponding conversion rule tables for data type 4301 to 4304 are specified by referring to the conversion rule set 330 depicted in FIG. 43 and using the value of the item number [0] of the encoded meta-definition of the conversion source as the item number to refer to the conversion rule 4300, and the conversion rule table (the data type conversion rule table 331 or the cleansing rule table 332) is specified by using the mismatched conversion rule code (the item number of the encoded meta-definition) as the item number to refer to the conversion rule tables for data type.

For example, in the case of the conversion rule code: 1 in (B) of FIG. 44, the sequence number [1] (char_code) indicates the type attribute value ID: 1 (JEF) in the conversion source (FULL_NAME in the TABLE_A) and the type attribute value ID: 0 (SJIS) in the conversion destination (FULL_NAME in the TABLE_B) and the type attribute value IDs are mismatched. In this case, the sequence number [0] (data type) of the conversion source (FULL_NAME in the TABLE_A) is used as the sequence number to refer to the conversion rule 4300 to specify the conversion rule table for data type 4301 for the Char type, and the conversion rule code: 1 to be processed is used as the sequence number to refer to the specified conversion rule table for data type 4301 to specify the cleansing rule table 332 for char_code. If the conversion rule code to be processed is [1], the conversion rule table for data type 4301 is referenced by using the sequence number [0] to specify the data type conversion rule table 331 for the Char type.

The converting function specifying unit 7314 has a function of specifying a data converting function according to a combination of the metadata code of the conversion source and the metadata code of the conversion destination by referring to the conversion rule table, based on the determination result determined by the determining unit 7313. Specifically, for example, the conversion rule table (data type conversion rule table 331 or the cleansing rule table 332) specified by the table specifying unit 7315 is referenced by using the metadata code of the conversion source as the sequence number of the From side and the metadata code of the conversion destination as the sequence number of the To side to specify the data converting function corresponding to a combination of the metadata code of the conversion source and the metadata code of the conversion destination.

For example, in the example of the conversion rule code: 1 in (B) of FIG. 44, the cleansing rule table for char_code 332 (see FIG. 37) is referenced by using the type attribute value ID: 1 (JEF) of the conversion source (FULL_NAME in the TABLE_A) as the sequence number of the From side and the type attribute value ID: 0 (SJIS) of the conversion destination (FULL_NAME in the TABLE_A) as the sequence number of the To side. As a result, the "character code system converting function" may be specified as the data converting function.

In the conversion rule table (the data type conversion rule table 331 or the cleansing rule table 332), if the metadata codes of the conversion source and the conversion destination are the same, the data conversion function is not assigned (see FIGS. 36 to 40). If the metadata codes of the conversion source and the conversion destination are identical, the determining unit 7313 determines that the conversion is unnecessary and the combination is not used so as not to execute the subsequent converting process. The control may be performed without relying on the determining unit such that the conversion by the converting unit is not performed, if the data converting function is not assigned to the conversion rule table. Therefore, useless data conversion can be prevented.

The converting unit 7316 has a function of converting the object data of the conversion source having the property prescribed by the metadata of the conversion source into the property prescribed by the metadata of the conversion destination by using the data converting function specified by the converting function specifying unit 7314. Specifically, for example, the data to be converted is converted by giving the metadata of the conversion source, the metadata of the conversion destination, and the data to be converted together to the data converting function.

For example, in the example of the conversion rule code: 1 in (B) of FIG. 44, the data to be converted expressed in JEF is converted into data expressed in SJIS by giving the type attribute value: 1 (JEF) of the conversion source, the type attribute value: 0 (SJIS) of the conversion destination, and the data to be converted (e.g., a character string) to the character code system converting function.

The updating unit 7317 has a function of updating the metadata code of the conversion source converted by the converting unit 7316 into the metadata code of the conversion destination in the encoded meta-definition information 340 before the next execution of the detecting process by the detecting unit 7312, if the converting unit 7316 performs conversion. Specifically, for example, in comparison of the type attribute value ID at the sequence number [1] (char_code) of the conversion source (FULL_NAME in the TABLE_A) between FIGS. 45 and 46, the type attribute value ID: 1 (JEF) of FIG. 45, i.e., before the conversion is update in FIG. 46, i.e., after the conversion, with the type attribute value ID: 0 (SJIS) at the sequence number [1] of the conversion destination (FULL_NAME in the TABLE_B) of FIG. 45, i.e., before the conversion (Char_excode is converted at the same time by the converting function in FIGS. 45 and 46).

As a result, the past conversion is subsequently reflected and both the conversion source (FULL_NAME in the TABLE_A) and the conversion destination (FULL_NAME in the TABLE_B) have the type attribute value of SJIS, which eliminates the need for the data conversion. Therefore, the data to be converted (the conversion source) is processed by the encoded meta-definition information 340 in the latest state and the efficient data conversion may be achieved.

As depicted in the second embodiment, if the constraint condition table 6000 exists, the data conversion is performed for the conversion rule code specified by the constraint condition according to the constraint condition before the data converting function corresponding to the conversion rule code with the constraint condition set. Therefore, since the data converting function with the constraint condition set can be implemented to operate based only on the constraint condition and does not have to support other metadata, the implementation can be considerably simplified.

The output unit 7318 has a function of outputting the data after the conversion. Specifically, for example, the data is transmitted to a computer that is the conversion destination or is stored to the storage unit 7310. The data may be displayed on a display or printed by a printer.

The first and second embodiments effect improved usability and reduce developer burden along with the higher process efficiency.

The data converting method described in the present embodiments may be implemented by executing a prepared program on a computer such as a personal computer and a workstation. The program is stored on a non-transitory, computer-readable recording medium such as a hard disk, a flexible disk, a CD-ROM, an MO, and a DVD, read out from the recording medium, and executed by the computer. The program may be a transmission medium that can be distributed through a network such as the Internet.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A data converting apparatus comprising:

a memory;

a processor coupled to the memory, the processor configured to execute a procedure, the procedure comprising:

acquiring specification definition information that defines a specification related to metadata for a conversion source and for a conversion destination and defines a data converting function that converts conversion source data, which has a property prescribed by the metadata for the conversion source, to have a property prescribed by the metadata for the conversion destination;

setting a metadata encoding table that correlates with the metadata, a metadata code specifying the metadata in the specification definition information acquired;

setting the conversion rule table by correlating the data converting function, according to a combination of the metadata code for the conversion source and the metadata code for the conversion destination; and constructing a conversion rule by correlating a unique conversion rule code with each conversion rule table set, wherein when the metadata is a specific metadata that do not include predetermined type attribute and when a first type attribute related to the specific metadata for the conversion source and a second type attribute related to the specific metadata for the conversion destination is different, the second setting unit sets a conversion rule table by correlating the data conversion function according to the first type attribute and the second type attribute; and copying a conversion rule table having the data converting function set and assigns a constraint condition instead of the data converting function to set a constraint condition table, when the constraint condition is set for the data converting function, wherein the constructing constructs the conversion rule by correlating, with a conversion rule code correlated with a data conversion function having a converting process restricted by the constraint condition, the constraint condition table.

2. The data converting apparatus according to claim 1, the procedure further comprising setting the specific metadata encoding table that directly uses the metadata as the metadata code.

3. The data converting apparatus according to claim 1, the procedure further comprising a metadata encoding table configured such that the second metadata in the specification definition information includes, as is, metadata in a lower hierarchy defined in the first metadata, when a second metadata in the same hierarchy as a first metadata defined in the specification definition information has description defined to inherit the first metadata.

4. The data converting apparatus according to claim 3, the procedure further comprising setting the metadata encoding table only for the second metadata.

5. The data converting apparatus according to claim 1, further comprising:

acquiring meta-definition information that defines metadata for the conversion source and for the conversion destination; and generating, for each of the metadata in the meta-definition information acquired, encoded meta-definition information by assigning and encoding a conversion rule code specific to the conversion rule table related to the metadata.

6. The data converting apparatus according to claim 5, further comprising compensating skipped metadata specified as default in the meta-definition information, when metadata in a lower hierarchy of given metadata defined in the specification definition information is specified as default, wherein the generating generates, for each metadata in the meta-definition information compensated, encoded meta-definition information by assigning and encoding a conversion rule code specific to the conversion rule table related to the metadata.

7. The data converting apparatus according to claim 5, the procedure further comprising:

receiving input of data to be converted;

detecting, by referring to the encoded meta-definition information generated by the generating unit, the metadata code for the conversion source and the metadata code for the conversion destination for which the conversion rule codes match;

determining whether the metadata code detected for the conversion source and the metadata code detected for the conversion destination match;

specifying, based on the determination result and by referring to a conversion rule constructed, the data converting function, according to a combination of the metadata code for the conversion source and the metadata code for the conversion destination; and converting the data to be converted by using the data converting function specified.

* * * * *